(12) United States Patent
Aoki

(10) Patent No.: US 11,364,545 B2
(45) Date of Patent: Jun. 21, 2022

(54) POWER TOOL

(71) Applicant: MAKITA CORPORATION, Anjo (JP)

(72) Inventor: Yonosuke Aoki, Anjo (JP)

(73) Assignee: MAKITA CORPORATION, Anjo (JP)

( * ) Notice: Subject to any disclaimer, the term of this patent is extended or adjusted under 35 U.S.C. 154(b) by 0 days.

(21) Appl. No.: 17/122,500

(22) Filed: Dec. 15, 2020

(65) Prior Publication Data

US 2021/0197290 A1 Jul. 1, 2021

(30) Foreign Application Priority Data

Dec. 26, 2019 (JP) .............................. JP2019-236373

(51) Int. Cl.
*B23B 31/10* (2006.01)
*B27B 5/30* (2006.01)
(Continued)

(52) U.S. Cl.
CPC ............ *B23B 31/10* (2013.01); *B24B 45/006* (2013.01); *B27B 5/30* (2013.01); *B27B 19/006* (2013.01);
(Continued)

(58) Field of Classification Search
CPC ..... B23B 2231/12; B23B 31/10; B23B 31/18; B25F 5/00; B24B 45/006; B24B 23/04;
(Continued)

(56) References Cited

U.S. PATENT DOCUMENTS 3,233,908 A   2/1966   Walter et al.
3,622,170 A   11/1971  Sedgwick
(Continued)

FOREIGN PATENT DOCUMENTS

DE       29605728 U1    9/1996
DE    102005047400     12/2006
(Continued)

OTHER PUBLICATIONS

Unpublished U.S. Appl. No. 16/953,733.
Unpublished U.S. Appl. No. 16/953,796.

*Primary Examiner* — Boyer D Ashley
*Assistant Examiner* — Reinaldo A Vargas Del Rio
(74) *Attorney, Agent, or Firm* — J-Tek Law PLLC; Jeffrey D. Tekanic; Scott T. Wakeman

(57) ABSTRACT

A power tool includes a housing (10), a spindle (4) supported in the housing to be pivotable or rotatable about a driving axis, a clamping shaft (60) that is selectively movable in the up-down direction relative to the spindle, a biasing member (70), a release member (71) and an actuating member (50). The release member is selectively movable in the up-down direction relative to the spindle and is configured to selectively interrupt transmission of upward biasing force from the biasing member to the clamping shaft. The release member is also configured to be locked to the spindle in a locked position while transmission of the biasing force is being interrupted. The actuating member is movable upward in the up-down direction relative to the spindle in response to being pressed upward by a clamping part (64) or by a tool accessory (91) to thereby unlock the release member from the spindle.

20 Claims, 32 Drawing Sheets

(51) Int. Cl.
    *B27B 19/00*     (2006.01)
    *B24B 45/00*     (2006.01)
    *B23B 31/18*     (2006.01)
    *B23B 31/103*     (2006.01)
    *B24B 23/04*     (2006.01)
    *B23D 61/00*     (2006.01)

(52) U.S. Cl.
    CPC .............. *B23B 31/103* (2013.01); *B23B 31/18* (2013.01); *B23D 61/006* (2013.01); *B24B 23/04* (2013.01); *Y10T 279/33* (2015.01)

(58) Field of Classification Search
    CPC ....... B27B 5/30; B27B 19/006; B23D 61/006; Y10T 279/33
    See application file for complete search history.

(56) References Cited

U.S. PATENT DOCUMENTS

| | | | |
|---|---|---|---|
| 3,998,467 | A | 12/1976 | Petkovich |
| 4,205,572 | A | 6/1980 | Weiner |
| 4,237,659 | A | 12/1980 | Welsch et al. |
| 4,597,227 | A | 7/1986 | Gentischer et al. |
| 4,747,607 | A | 5/1988 | Emter |
| 4,989,374 | A | 2/1991 | Rudolf et al. |
| 5,031,361 | A | 7/1991 | MacKay, Jr. |
| 5,157,873 | A | 10/1992 | Rudolf et al. |
| 5,263,283 | A | 11/1993 | Rudolf et al. |
| 5,423,358 | A | 6/1995 | Rautio |
| 5,468,176 | A | 11/1995 | Udert et al. |
| 5,573,255 | A | 11/1996 | Salpaka |
| 5,575,071 | A | 11/1996 | Phillips et al. |
| 5,601,483 | A | 2/1997 | Rudolf et al. |
| 5,639,273 | A | 6/1997 | Sjolander et al. |
| 5,658,193 | A | 8/1997 | McCambridge |
| 5,727,994 | A | 3/1998 | Sjolander et al. |
| 5,759,093 | A | 6/1998 | Rodriguez |
| 5,919,085 | A | 7/1999 | Izumisawa |
| 5,946,810 | A | 9/1999 | Hoelderlin et al. |
| 6,142,858 | A | 11/2000 | Luedeke |
| 6,244,943 | B1 | 6/2001 | Bohler et al. |
| 6,569,001 | B2 | 5/2003 | Rudolf et al. |
| 6,612,039 | B2 | 9/2003 | Kakiuchi et al. |
| 6,623,202 | B2 | 9/2003 | Hansson et al. |
| 6,735,876 | B2 | 5/2004 | Hirabayashi |
| 6,796,888 | B2 | 9/2004 | Jasch |
| 6,860,792 | B2 | 3/2005 | Krondorfer et al. |
| 6,887,142 | B2 | 5/2005 | Rupprecht et al. |
| 6,910,694 | B2 | 6/2005 | Hartmann et al. |
| 7,344,435 | B2 | 3/2008 | Pollak et al. |
| 7,497,860 | B2 | 3/2009 | Carusillo et al. |
| 7,537,065 | B2 | 5/2009 | Gallagher et al. |
| 7,719,146 | B2 | 5/2010 | Takahashi et al. |
| 7,789,737 | B2 | 9/2010 | Liersch |
| 7,997,586 | B2 | 8/2011 | Ziegler et al. |
| 8,042,437 | B2 | 10/2011 | Maier et al. |
| 8,113,520 | B2 | 2/2012 | Zaiser et al. |
| 8,181,973 | B2 | 5/2012 | Dezheng et al. |
| 8,182,316 | B2 | 5/2012 | Peisert |
| 8,187,058 | B2 | 5/2012 | Blickle et al. |
| 8,272,135 | B2 | 9/2012 | Zhou |
| 8,317,574 | B2 | 11/2012 | Blickle et al. |
| 8,641,049 | B2 | 2/2014 | Marini et al. |
| 8,851,960 | B2 | 10/2014 | Ikuta |
| 8,895,880 | B2 | 11/2014 | Mizutani et al. |
| 9,073,563 | B2 | 7/2015 | Middleton et al. |
| 9,108,255 | B2 | 8/2015 | Li |
| 9,120,216 | B2 | 9/2015 | Zhang et al. |
| 9,221,156 | B2 | 12/2015 | Bachman et al. |
| 9,555,554 | B2 | 1/2017 | Thorson et al. |
| 9,737,969 | B2 | 8/2017 | Bek et al. |
| 10,213,852 | B2 | 2/2019 | Qian et al. |
| 2002/0035882 | A1 | 3/2002 | Hartmann |
| 2002/0070037 | A1 | 6/2002 | Jasch |
| 2002/0170408 | A1 | 11/2002 | Hartmann et al. |
| 2003/0100251 | A1 | 5/2003 | Besch |
| 2005/0075059 | A1 | 4/2005 | Kausch et al. |
| 2005/0095966 | A1 | 5/2005 | Jasch et al. |
| 2005/0156390 | A1 | 7/2005 | Marini et al. |
| 2006/0172669 | A1 | 8/2006 | Hesse et al. |
| 2007/0060030 | A1 | 3/2007 | Pollak et al. |
| 2007/0082590 | A1 | 4/2007 | Kraenzler et al. |
| 2007/0295156 | A1 | 12/2007 | Ziegler et al. |
| 2009/0023371 | A1 | 1/2009 | Blickle et al. |
| 2009/0273146 | A1 | 11/2009 | Dezheng et al. |
| 2010/0197208 | A1 | 8/2010 | Blickle et al. |
| 2010/0236806 | A1 | 9/2010 | Heilig et al. |
| 2011/0074122 | A1 | 3/2011 | Marini et al. |
| 2011/0086552 | A1 | 4/2011 | Takemura et al. |
| 2011/0316241 | A1 | 12/2011 | Zhang et al. |
| 2011/0316242 | A1 | 12/2011 | Zhang et al. |
| 2012/0067607 | A1 | 3/2012 | Weber et al. |
| 2012/0139196 | A1 | 6/2012 | Zhou |
| 2012/0169018 | A1 | 7/2012 | Lu et al. |
| 2013/0047762 | A1 | 2/2013 | Hecht et al. |
| 2013/0193653 | A1 | 8/2013 | Marini et al. |
| 2014/0084552 | A1 | 3/2014 | Zieger et al. |
| 2014/0191481 | A1 | 7/2014 | Kawakami et al. |
| 2014/0290072 | A1 | 10/2014 | Brown et al. |
| 2015/0042052 | A1* | 2/2015 | Furusawa ............... B23B 31/10 279/141 |
| 2016/0184956 | A1 | 6/2016 | Klabunde et al. |
| 2016/0199919 | A1 | 7/2016 | Klabunde et al. |
| 2016/0221175 | A1 | 8/2016 | Aoki |
| 2016/0271711 | A1 | 9/2016 | Qian et al. |
| 2016/0288288 | A1 | 10/2016 | Klabunde et al. |
| 2017/0050291 | A1 | 2/2017 | Aoki |
| 2017/0050292 | A1* | 2/2017 | Aoki ........................ B27B 5/32 |
| 2017/0080545 | A1 | 3/2017 | Furusawa et al. |
| 2017/0239802 | A1 | 8/2017 | Aoki |
| 2017/0259348 | A1* | 9/2017 | Scott ...................... B23B 31/19 |
| 2018/0243894 | A1 | 8/2018 | Wang et al. |
| 2018/0319001 | A1 | 11/2018 | Zhong et al. |
| 2019/0030616 | A1 | 1/2019 | Hess et al. |
| 2019/0299387 | A1 | 10/2019 | Kotsuji et al. |

FOREIGN PATENT DOCUMENTS

| | | | |
|---|---|---|---|
| DE | 102005031802 A1 | 1/2007 | |
| DE | 102011005021 A1 | 9/2012 | |
| DE | 102011005818 A1 | 9/2012 | |
| EP | 1790434 A1 | 5/2007 | |
| EP | 1790434 B1 | 3/2008 | |
| EP | 1737616 B1 | 12/2011 | |
| JP | 2016144862 A | 8/2016 | |
| JP | 2016529118 A | 9/2016 | |
| JP | 2017039180 A | 2/2017 | |
| JP | 2017144538 A | 8/2017 | |
| WO | WO-2006101014 A1 * | 9/2006 | ........... B24B 23/022 |
| WO | 2012007203 A1 | 1/2012 | |

* cited by examiner

POWER TOOL

CROSS-REFERENCE TO RELATED APPLICATIONS

The present application claims priority to Japanese patent application No. 2019-236373 filed on Dec. 26, 2019, the contents of which is hereby fully incorporated herein by reference.

TECHNICAL FIELD

The present disclosure relates to a power tool that is configured to drive a tool accessory to perform a processing operation on a workpiece.

BACKGROUND

Known power tools are configured to perform a processing operation on a workpiece by transmitting an output of a motor to a spindle and thereby driving a tool accessory that is fixed to a lower end of the spindle. In some of these power tools, the user can attach (mount) the tool accessory to the spindle without having to use an auxiliary tool, such as a wrench (spanner), a hex wrench (hex key), an Allen key, etc.

SUMMARY

In one aspect of the present disclosure, a power tool (e.g., an oscillating multi-tool, a rotary tool (e.g., a grinder, a sander, a polisher), etc.) is configured to perform a processing operation on a workpiece by driving a tool accessory. The power tool includes a housing, a spindle, a clamping shaft, a biasing member (e.g., a spring), a release member (e.g., a spring seat) and an actuating member (e.g., an actuator, an actuating shaft). The spindle is supported in (or by) the housing to be pivotable or rotatable around about a driving axis, which defines an up-down direction of the power tool. A tool mounting part, to which the tool accessory is removably attachable, is defined at or on a lower end portion of the spindle. The clamping shaft is movable in the up-down direction relative to the spindle. The clamping shaft includes a shaft part and a clamping part (e.g., a clamping head, a flange). The shaft part extends coaxially with the spindle in the up-down direction. The clamping part is connected to the shaft part below the tool mounting part. The biasing member generates a biasing force that is transmitted to the clamping shaft to bias the clamping shaft upward, and/or may be configured to bias the clamping shaft upward. The release member is selectively movable in the up-down direction relative to the spindle. The release member is configured to, either by itself or in conjunction with one or more other structural elements, release or interrupt transmission of the biasing force of the biasing member to the clamping shaft. The release member is also configured to be (selectively) locked to (engaged with) the spindle in (at) a locked position while releasing the biasing force (i.e. in the state that the transmission of the biasing force from the biasing member to the clamping shaft is released or interrupted). The actuating member is (selectively) movable in the up-down direction relative to the spindle. The actuating member is configured to be moved upward in response to being pressed upward by the clamping part or by the tool accessory and thereby disengage (unlock) the release member from the spindle.

In such a power tool, e.g., during a processing operation, the tool accessory is clamped between the tool mounting part and the clamping part owing to the upward biasing force of the biasing member. To replace the tool accessory, the release member is locked to (engaged with) the spindle to permit the tool accessory to be unclamped and removed from the tool mounting part. Then, after another tool accessory has been placed between the tool mounting part and the clamping part, the release member is disengaged (unlocked) from the spindle by the actuating member, thereby restoring the transmission of biasing force, which had been released (interrupted) by the release member, to the clamping shaft. Therefore, the user can cause the tool accessory to be clamped between the tool mounting part and the clamping part by simply pressing the clamping part or the tool accessory upward, which thereby causes the actuating member to be pressed upward (i.e. with a simple single manual action). Further, in order to disengage (unlock) the release member from the spindle, the user needs to apply pressure (upward pressure) to the actuating member, which is separate from the clamping shaft. In other words, the transmission of the biasing force to the clamping shaft is restored only when the actuating member detects (receives, is subjected to) an upward pressing force that is being applied to the clamping part or by the tool accessory. Therefore, the risk of unintentional actuation (re-clamping) of the clamping shaft can be reduced.

DETAILED DESCRIPTION OF THE EMBODIMENTS

An oscillating multi-tool 1 according to a non-limiting, representative embodiment of the present disclosure will now be described, with reference to the drawings. The oscillating multi-tool 1 is an exemplary example of an electric power tool that is configured to perform a processing operation on a workpiece (not shown) by driving (pivoting) a tool accessory 91 in an oscillating manner within a specified angular range, e.g., that is less than 5°.

Figure 1:
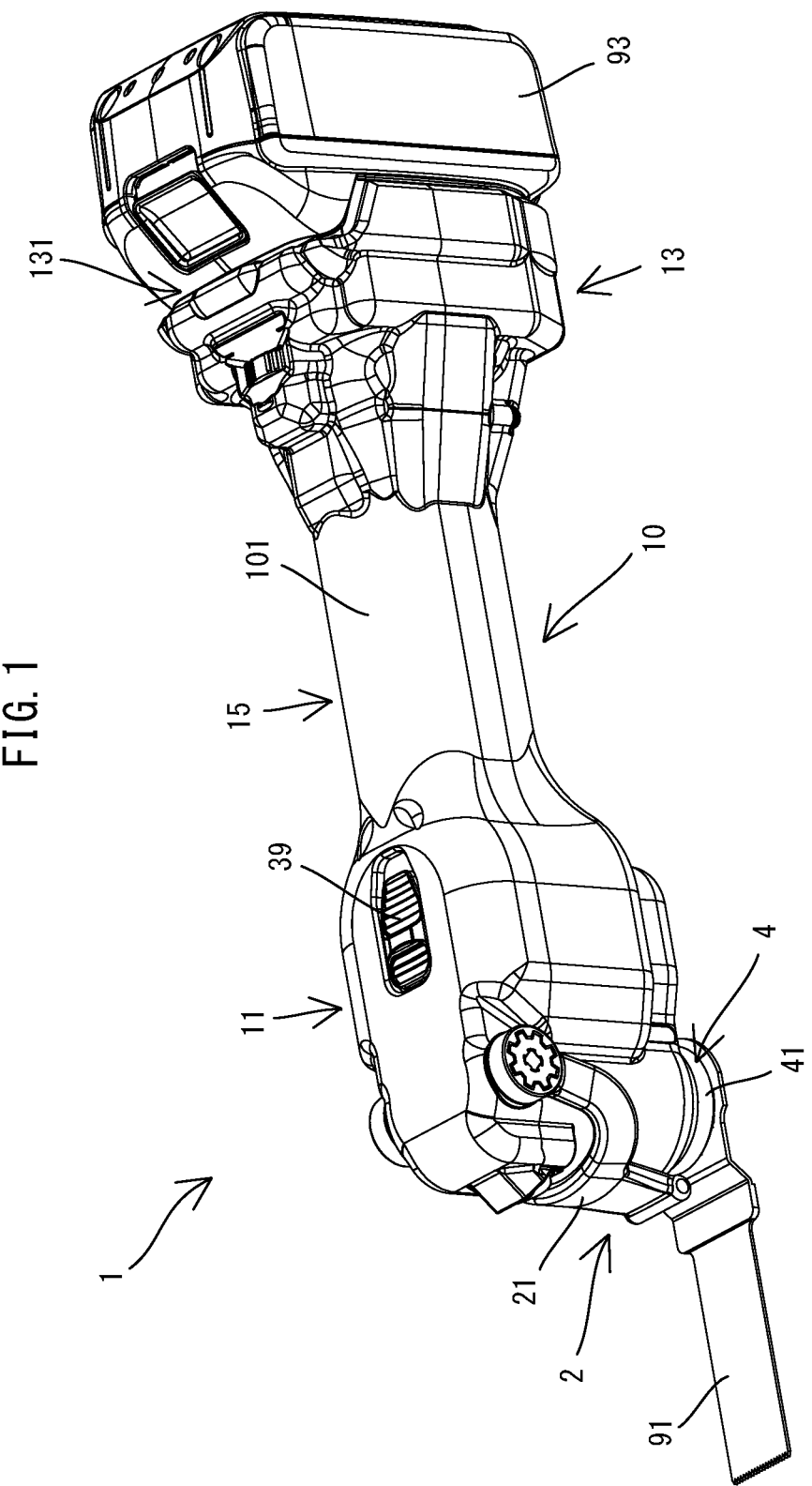
FIG. 1 is a perspective view showing a representative, non-limiting oscillating multi-tool (multi-tool) according to one exemplary embodiment of the present teachings, wherein a lever is in an initial position.
Figure 2:
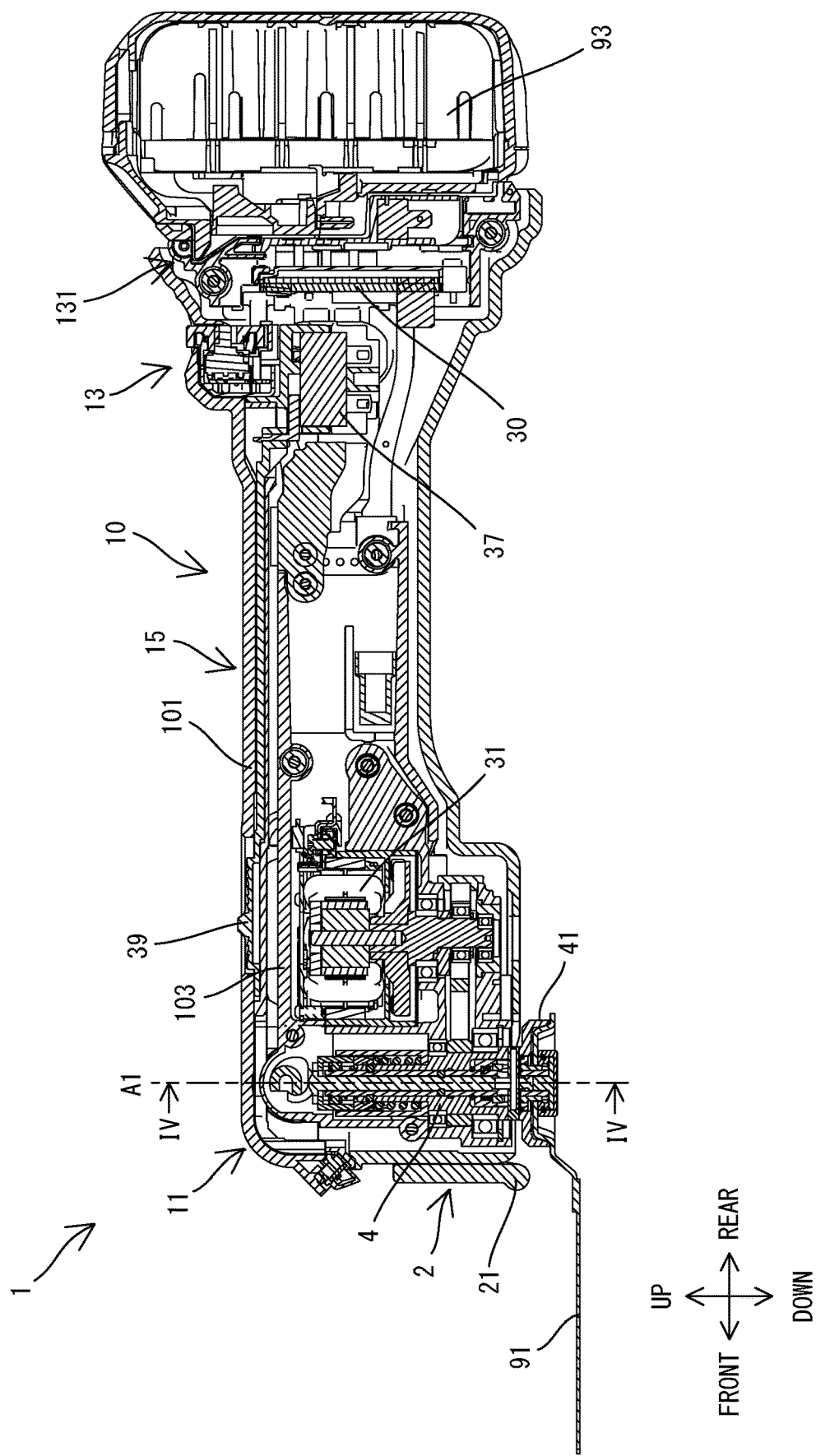
FIG. 2 is a sectional view of the oscillating multi-tool.

First, the general structure of the oscillating multi-tool 1 is described. As shown in FIGS. 1 and 2, the oscillating multi-tool 1 has an elongate housing (also referred to as a tool body) 10. A spindle 4 and a motor 31, which serves as a driving source (source of motive power), are housed in one end portion of the housing 10 in its longitudinal direction. The spindle 4 is arranged such that its longitudinal axis (a driving axis A1) intersects (more specifically, at least substantially orthogonally intersects) a longitudinal axis of the housing 10. One (lower) axial end portion of the spindle 4 protrudes from the housing 10 and is exposed outside of the housing 10. This end portion (lower axial end portion) forms (defines) a tool mounting part 41 to (on) which the tool accessory 91 is removably mounted. Further, a battery (also referred to as a battery pack or battery cartridge) 93 for supplying electric power (current) to the motor 31 is removably mounted to (on) the other end portion of the housing 10 in the longitudinal direction. A central (longitudinally intermediate) portion of the housing 10 in its longitudinal direction has a tubular shape that has a smaller (narrower) diameter than the axial end portions of the housing 10. The central portion of the housing 10 forms (defines) a grip part 15 that is configured to be held by a user. In the oscillating multi-tool 1, the spindle 4 is configured to be driven about the driving axis A1 with a rotary (pivotal) oscillating motion within a specified angle range, using power generated by the motor 31, to thereby oscillate the tool accessory 91.

For the sake of convenience in the following description, the directions of the oscillating multi-tool 1 are related in the following manner. An extension direction of the driving axis A1 is defined as an up-down direction. In the up-down direction, the side on which the tool mounting part 41 of the spindle 4 is located is defined as a lower side of the oscillating multi-tool 1, while the opposite side is defined as an upper side of the oscillating multi-tool 1. A direction that is orthogonal to the driving axis A1 and that corresponds to the longitudinal direction of the housing 10 is defined as a front-rear direction. In the front-rear direction, the side of one end portion of the housing 10 in which the spindle 4 is housed is defined as a front side of the oscillating multi-tool 1, while the side of the other end portion to (on) which the battery 93 is mounted is defined as a rear side of the oscillating multi-tool 1. Further, a direction that is orthogonal to both the up-down direction and the front-rear direction is defined as a left-right direction.

The detailed structure of the oscillating multi-tool 1 is now described.

First, the housing 10 is described. As shown in FIG. 2, the housing 10 of this embodiment is configured as a so-called vibration-isolating housing. The housing 10 includes an outer housing 101 and an inner housing 103 that is elastically connected to the outer housing 101. The outer housing 101 is an elongate hollow body that extends in the front-rear direction. The outer housing 101 forms an outer shell of the oscillating multi-tool 1. The inner housing 103 is an elongate hollow body that extends in the front-rear direction. The inner housing 103 is housed in the outer housing 101. The inner housing 103 houses the motor 31 and the spindle 4. Although not shown in detail, the outer housing 101 is connected to the inner housing 103 via a plurality of elastic members, and is thus movable relative to the inner housing 103 in all directions, including the front-rear, left-right and up-down directions, via the elastic members. This elastic connection can reduce transmission of vibration from the inner housing 103 to the outer housing 101.

As shown in FIGS. 1 and 2, a lever 2 is supported at an upper portion of a front part 11 of the housing 10 (the outer housing 101). The lever 2 is configured to be externally manipulated by a user. The lever 2 is pivotable (rotatable) about an axis that extends in the left-right direction. In this embodiment, the lever 2 includes a generally Y-shaped manipulation part 21 that is disposed outside the housing 10 and is configured to be manipulated by a user. The lever 2 is pivotable (rotatable), in a clockwise direction (or upward) as viewed from the left, from an initial position (shown in FIGS. 1 and 2) in (at) which the manipulation part 21 abuts on a front surface of the front part 11. When the manipulation part 21 is pivoted upward from the initial position, the tool accessory 91 is unclamped. Accordingly, the direction, in which the manipulation part 21 is pivoted upward from the initial position, is hereinafter referred to as an unclamping direction. Further, the act of manually pivoting the manipulation part 21 in this unclamping direction is hereinafter referred to as an unclamping operation. Unclamping of the tool accessory 91 in response to the unclamping operation performed on the lever 2 will be described in detail below.

A manipulation part (slide switch or switch knob) 39 is disposed in an opening that is formed in an upper wall of the front part 11 of the housing 10. The manipulation part 39 is configured to slide in the front-rear direction in response to sliding manipulation (pressing) performed by the user. The manipulation part 39 is configured to switch ON and OFF a switch 37 (see FIG. 2), which is housed within the housing 10, by sliding in the front-rear direction.

The structures (elements) disposed on or within the housing 10 is now described.

As shown in FIG. 2, a battery mounting part 131 is provided (defined) in (at, on) a rear part 13 of the housing 10. The battery mounting part 131 is configured such that the battery 93 is removably mounted thereto. The battery mounting part 391 has an engagement structure (e.g., parallel slide rails) for sliding engagement with the battery 93, and terminals that are electrically connectable to corresponding terminals of the battery 93 when the battery 93 is engaged with the engagement structure. The structures of the battery mounting part 391 and the battery 93 themselves are well known and therefore not described herein. Further, the rear part 13 of the housing 10 houses the switch 37, which is connected to the manipulation part 39, and a controller 30 that is configured to control driving of the motor 31. In this embodiment, the controller 30 is configured to drive (energize) the motor 31 when the switch 37 is turned ON.

Figure 3:
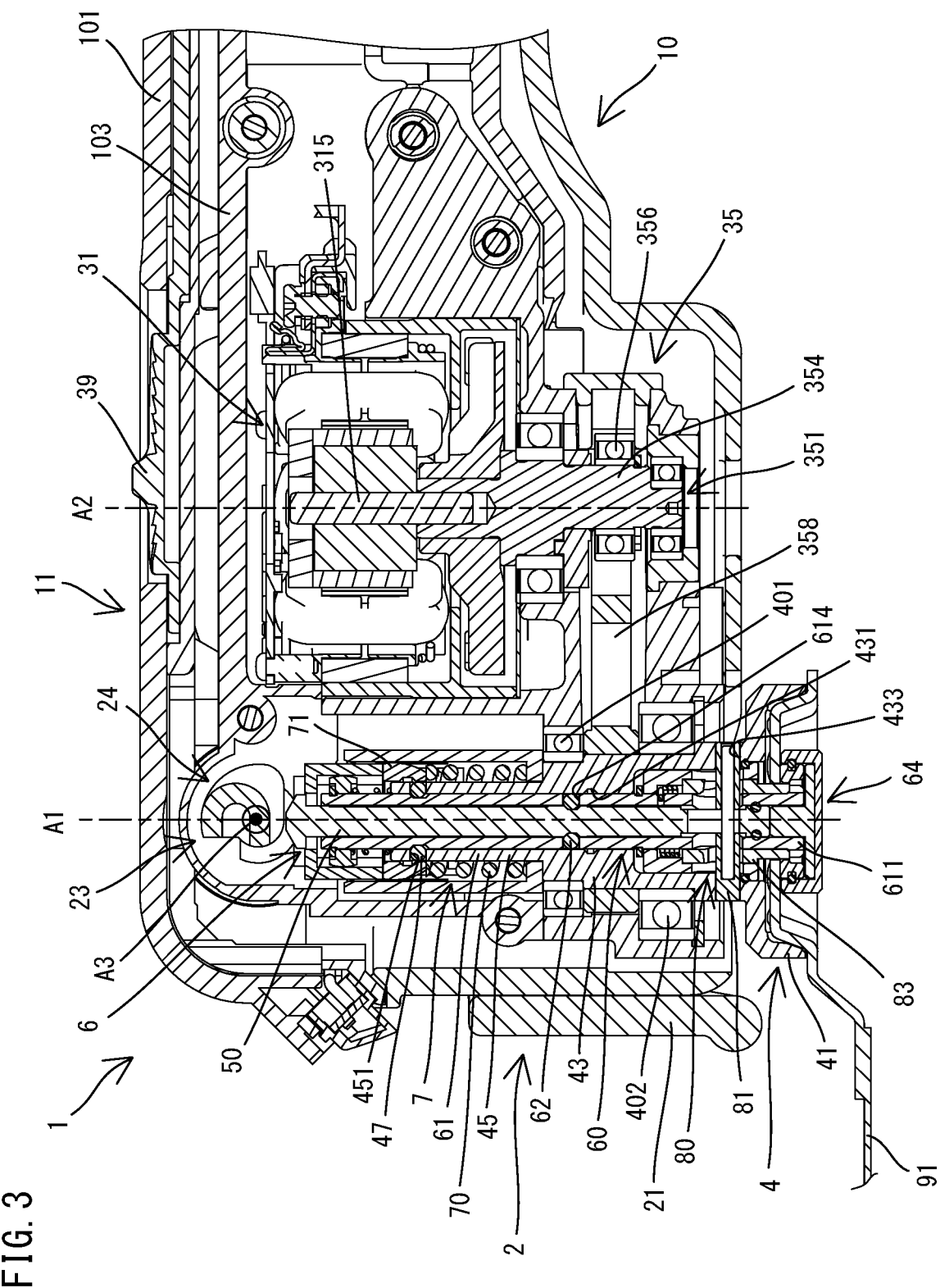
FIG. 3 is a partial, enlarged view of FIG. 2.

As shown in FIG. 3, the front part 11 of the housing 10 houses (accommodates, surrounds) the spindle 4, the motor 31, a transmitting mechanism (motion transmitting mechanism or first motion converting mechanism) 35 and a clamping mechanism 6, whose structures are now described in this order.

Figure 4:
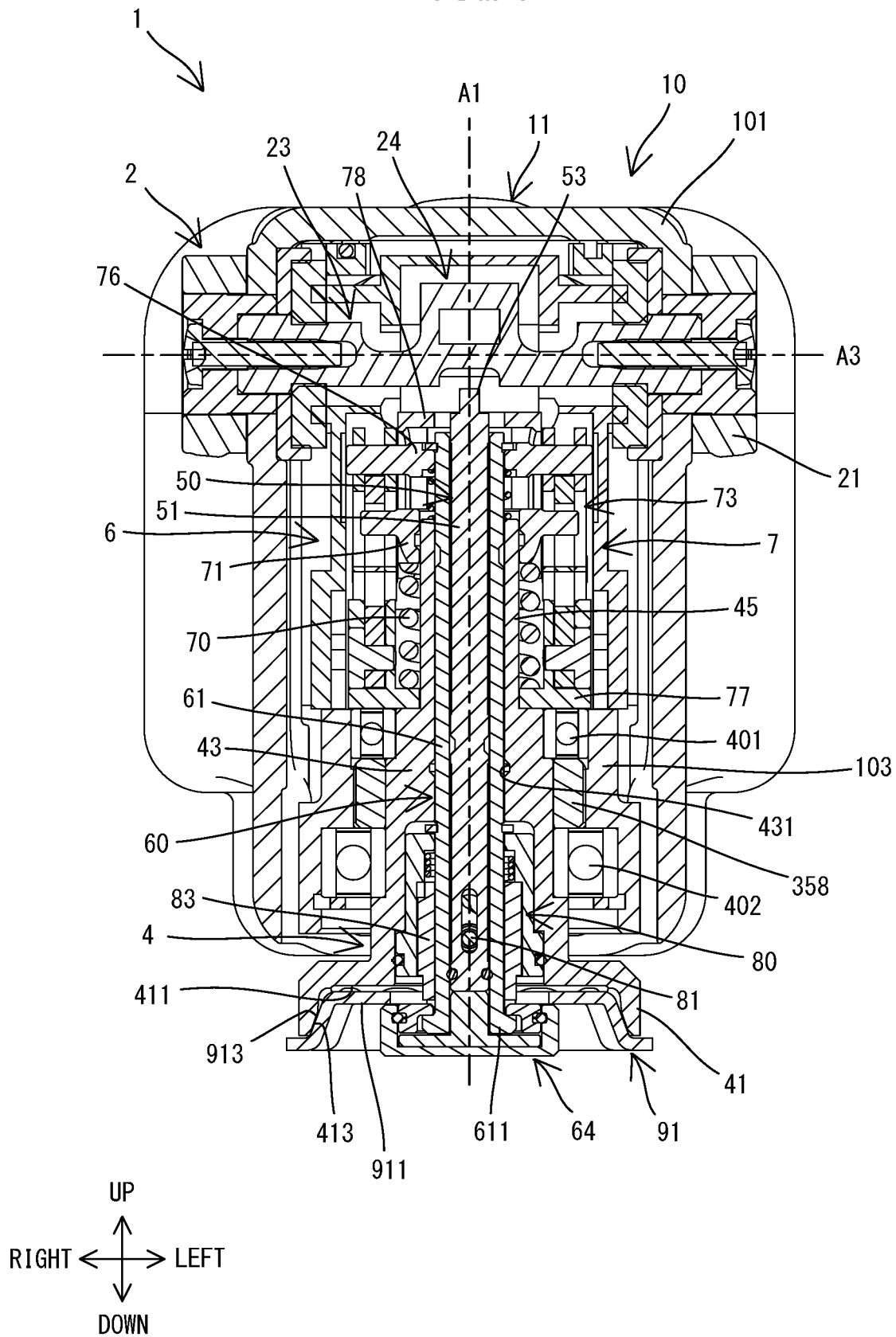
FIG. 4 is a sectional view taken along line IV-IV in FIG. 2.
Figure 5:
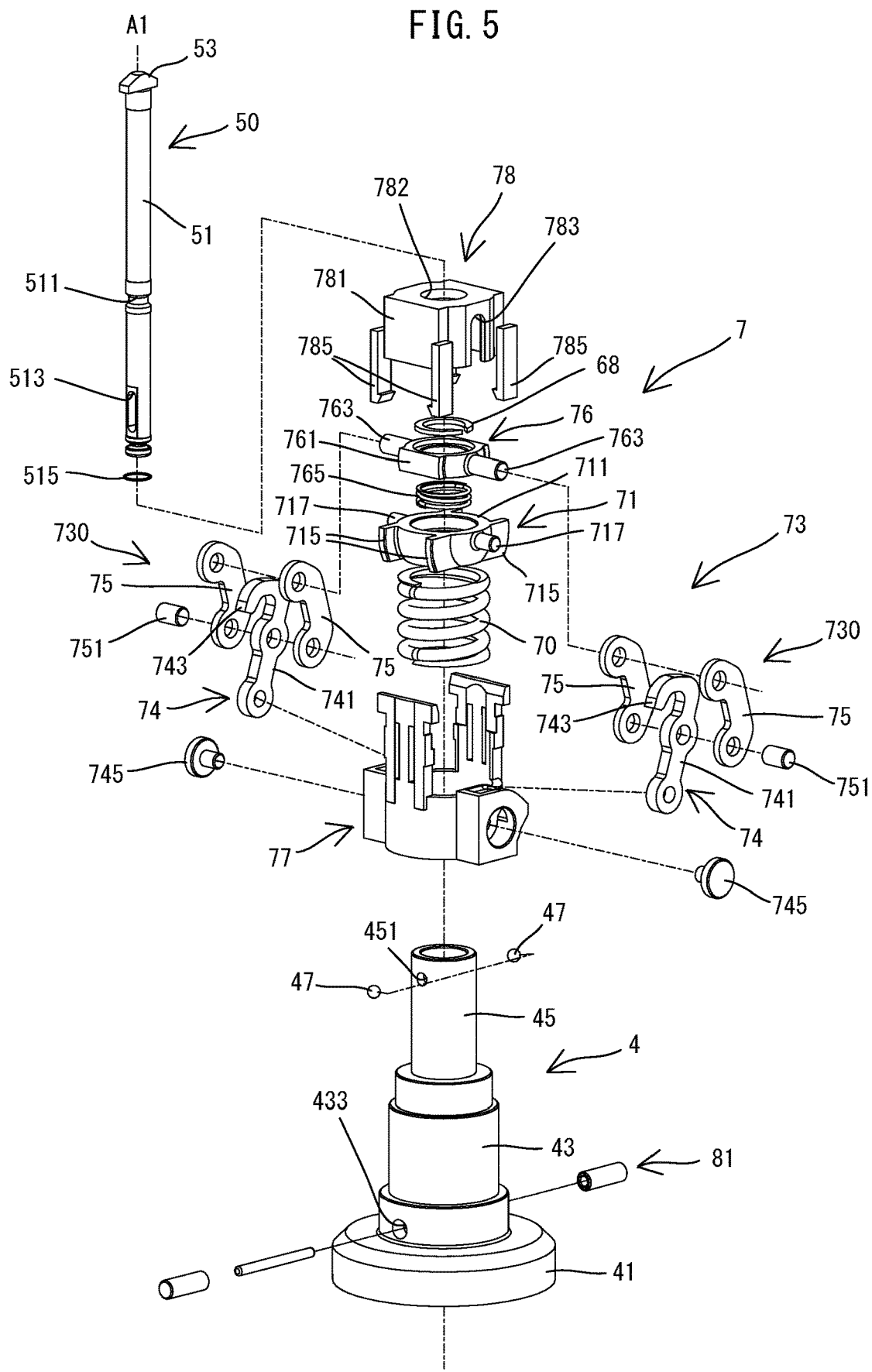
FIG. 5 is an exploded perspective view of structures (mechanisms) disposed in an interior of the oscillating multi-tool.

First, the spindle 4 is described. As shown in FIGS. 3 to 5, the spindle 4 is a hollow stepped cylindrical member. In this embodiment, the spindle 4 includes a small-diameter part 45, a large-diameter part 43 having a larger outer diameter than the small-diameter part 45, and the tool mounting part 41 having a larger outer diameter than the large-diameter part 43, in this order from the top.

An inner diameter of both the small-diameter part 45 and an upper portion of the large-diameter part 43 is substantially equal to (slightly larger than) the outer diameter of a shaft part 61 of a clamping shaft 60, which will be described below. The small-diameter part 45 and the upper portion of the large-diameter part 43 are configured to guide sliding movement of the shaft part 61 and to hold the shaft part 61 such the shaft part 61 is coaxial with the spindle 4. A lower portion of the large-diameter part 43 has a larger inner diameter. A motion converting mechanism (i.e. a second motion converting mechanism) 80, which will be described below, is disposed within the internal space of the lower portion of the large-diameter part 43.

Two ball-holding holes (circular through holes) 451 are formed in (extend through) an upper end portion of the small-diameter part 45. The two ball-holding holes 451 are formed to extend radially through a wall that forms (defines) the small-diameter part 45, such that they diametrically (mirror symmetrically) oppose each other across the driving axis A1. Each of the ball-holding holes 451 is configured to rollably hold a ball 47. The diameter of each ball-holding hole 451 is substantially equal to (slightly larger than) the diameter of the ball 47, and the thickness of the wall of the small-diameter part 45 is smaller (less) than the diameter of the ball 47. Therefore, a portion of the ball 47 (while being held in the respective ball-holding hole 451) can protrude to the inner peripheral side (interior) of the small-diameter part 45 and/or a (another) portion of the ball 47 can protrude to the outer peripheral side (exterior) of the small-diameter part 45. Thus, the spindle 4 is selectively engageable with a clamping shaft 60 (disposed within the spindle 4) or with a spring receiving part 71 (disposed exterior the spindle 4) via the balls 47, as will be described in detail below.

An annular engagement groove 431 is formed in (on, around) an inner (interior) peripheral surface of an upper end portion of the large-diameter part 43. The engagement groove 431 is engageable with two balls 62 that are respectively held in two ball-holding holes 614 of the clamping shaft 60, as will be described below. The depth of the engagement groove 431 is set such that when the balls 62 are engaged with (disposed in) the engagement groove 431, the balls 62 do not protrude radially inward from an inner peripheral surface of the clamping shaft 60. The spindle 4 is engageable (selectively engageable) with the clamping shaft 60 via the balls 62, as will be described in detail below.

Two pin-holding holes (circular through holes) 433 are formed in a lower end portion (a portion above the tool mounting part 41) of the large-diameter part 43. The pin-holding holes 433 diametrically (mirror symmetrically) oppose each other across the driving axis A1. The pin-holding holes 433 are formed to extend radially through a wall that forms (defines) the large-diameter part 43. A pin 81 is inserted through the pin-holding holes 433 and is rotatably supported by the spindle 4. In this embodiment, the pin 81 is formed by multiple separate (discrete) members (elements) that are connected together, but it may be formed as a single (integral) solid or hollow cylindrical member. The pin 81 is a part of the motion converting mechanism (second motion converting mechanism) 80, and serves to rotate (pivot) a rotary sleeve 83.

The tool mounting part 41 is a portion of the spindle 4 on which the tool accessory 91 is removably mounted (attached, fixed or secured), as described above. In this embodiment, as shown in FIGS. 4 and 5, the tool mounting part 41 is shaped like a flange that protrudes radially outward from the large-diameter part 43 relative to the driving axis A1. An interior surface of the tool mounting part 41 includes an inclined surface (oblique surface) 413 that is inclined (oblique) in a direction that intersects the driving axis A1. More specifically, a recess 411, which is indented upwardly, is formed in (on) a lower end portion of the tool mounting part 41 and defines the interior surface of the tool mounting part 41. The inclined surface 413 is a portion of the interior surface that defines (or is defined by) the recess 411, and is inclined downward and away from the driving axis A1 (i.e. radially outward). The portion of the tool mounting part 41 having the inclined surface 413 optionally may be formed, e.g., as a truncated cone or in another manner, such as, e.g., will be described below in the possible modifications of the present embodiment.

All of the tool accessories 91 (e.g., a blade, a scraper, a grinding pad, a polishing pad, etc.) that are attachable to the oscillating multi-tool 1 of this embodiment have a protruding part 911 that is configured to be fitted in (mated with) the recess 411. A central portion of the protruding part 911 has a through hole that allows the shaft part 61 to be inserted therethrough. Further, a portion of an upper surface of the tool accessory 91 that defines the protruding part 911 is formed as an inclined surface (oblique surface) 913, which conforms to (which is complementary to) the inclined surface 413. That is, the portion of the tool accessory 91 having the inclined surface 913 may also be formed, e.g., as a truncated cone that is complementary (matching) to the truncated cone of the tool mounting portion 41 so that the two truncated cones can be fitted or mated together to form a line contact (circular line contact or annular/ring contact) between the two mated parts. In this embodiment, the tool accessory 91 is clamped between the tool mounting part 41 and a clamping head 64 of the clamping shaft 60, in a state in which the inclined surface 913 is in abutment (circumferentially-extending (circular) abutment) with the inclined surface 413, and is thereby secured (fixed) to the spindle 4. Fixing the tool accessory 91 to the spindle 4 will be described in further detail below.

The spindle 4 having the above-described structure is supported to be rotatable (pivotable) around the driving axis A1 by two bearings 401, 402, which are held in or by the housing 10 (specifically, in or by the inner housing 103). The bearings 401, 402 support upper and lower end portions of the large-diameter part 43, respectively.

The motor 31 is now described. As shown in FIG. 3, in this embodiment, a brushless DC motor is employed as the motor 31. The motor 31 includes a stator, a rotor disposed within the stator, and an output shaft 315 that is configured to rotate together with the rotor. The motor 31 is arranged such that a rotational axis A2 of the output shaft 315 extends in parallel to the driving axis A1 (i.e. in the up-down direction). The output shaft 315 protrudes downward from the rotor.

The transmitting mechanism (first motion converting mechanism or rotary-to-pivotal oscillating converting mechanism) 35 is now described. The transmitting mechanism 35 is configured to receive (input) rotary motion of the output shaft 315 to the spindle 4 and to convert the rotary motion to cause the spindle 4 pivotally oscillate within a specified angle range around the driving axis A1. As shown in FIG. 3, the transmitting mechanism 35 basically includes an eccentric shaft 351, a drive bearing 356, and an oscillating arm 358.

The eccentric shaft 351 is coaxially connected to the output shaft 315 of the motor 31. Furthermore, the eccentric shaft 351 is fixed to an outer periphery of the output shaft 315 and extends downward. The eccentric shaft 351 is rotatably supported by two bearings that are held by the housing 10. The eccentric shaft 351 has an eccentric part (cam) 354 that is eccentric to the rotational axis A2 and is located between the two bearings that rotatably support the eccentric shaft 351. An inner ring of the drive bearing 356 is fixed around the eccentric part 354. The oscillating arm 358 operably couples the drive bearing 356 to the spindle 4. More specifically, although not shown in detail because it is a well-known structure, one end portion of the oscillating arm 358 is annular-shaped and fixed around an outer periphery of the spindle 4 between the bearings 401, 402. The other end portion of the oscillating arm 358 is bifurcated (forked) and its two ends are disposed to abut on the left side and the right side, respectively, of an outer peripheral surface of an outer ring of the drive bearing 356.

Therefore, when the motor 31 is driven, the eccentric shaft 351 rotates together with the output shaft 315. In response to rotation of the eccentric shaft 351, a center of the eccentric part 354 moves (orbits) around the rotational axis A2 and thus the drive bearing 356 also moves eccentrically around the rotational axis A2, which causes the oscillating arm 358 to pivotally oscillate within a specified angle range about the driving axis A1 of the spindle 4. The spindle 4 is thus driven with a rotary (pivotal) oscillating motion within the specified angle range around the driving axis A1 in response to oscillating movement of the oscillating arm 358. As a result, the tool accessory 91 fixed to the spindle 4 (specifically, to the tool mounting part 41) is driven (pivoted) about the driving axis A1 in an oscillating manner, which enables a processing operation to be performed on a workpiece using the oscillating tool accessory 91.

The clamping mechanism 6 is now described. The clamping mechanism 6 is configured to secure (fix) the tool accessory 91 to the tool mounting part 41 such that the tool accessory 91 pivots (oscillates) together with the spindle 4. In this embodiment, the clamping mechanism 6 includes the clamping shaft 60 and a biasing mechanism 7.

Figure 6:
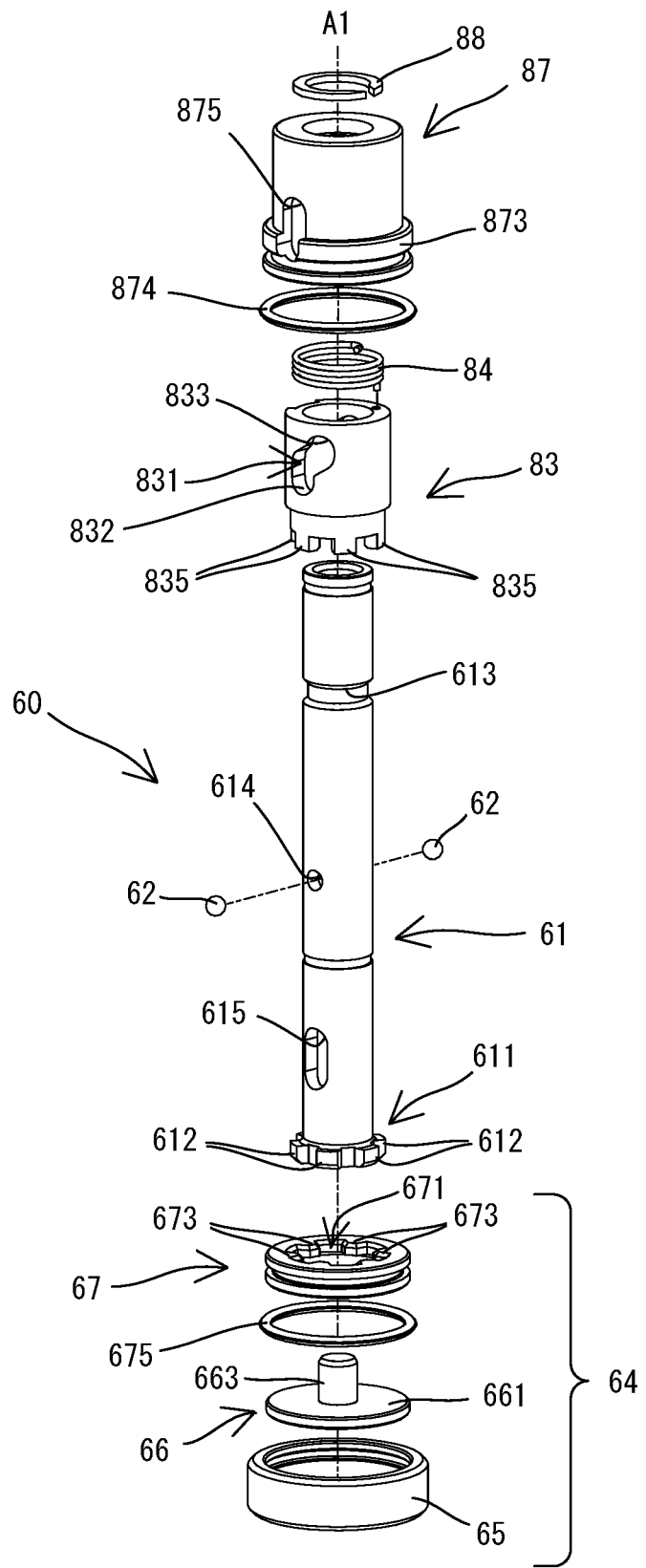
FIG. 6 is another exploded perspective view of the structures (mechanisms) disposed in the interior of the oscillating multi-tool.
Figure 7:
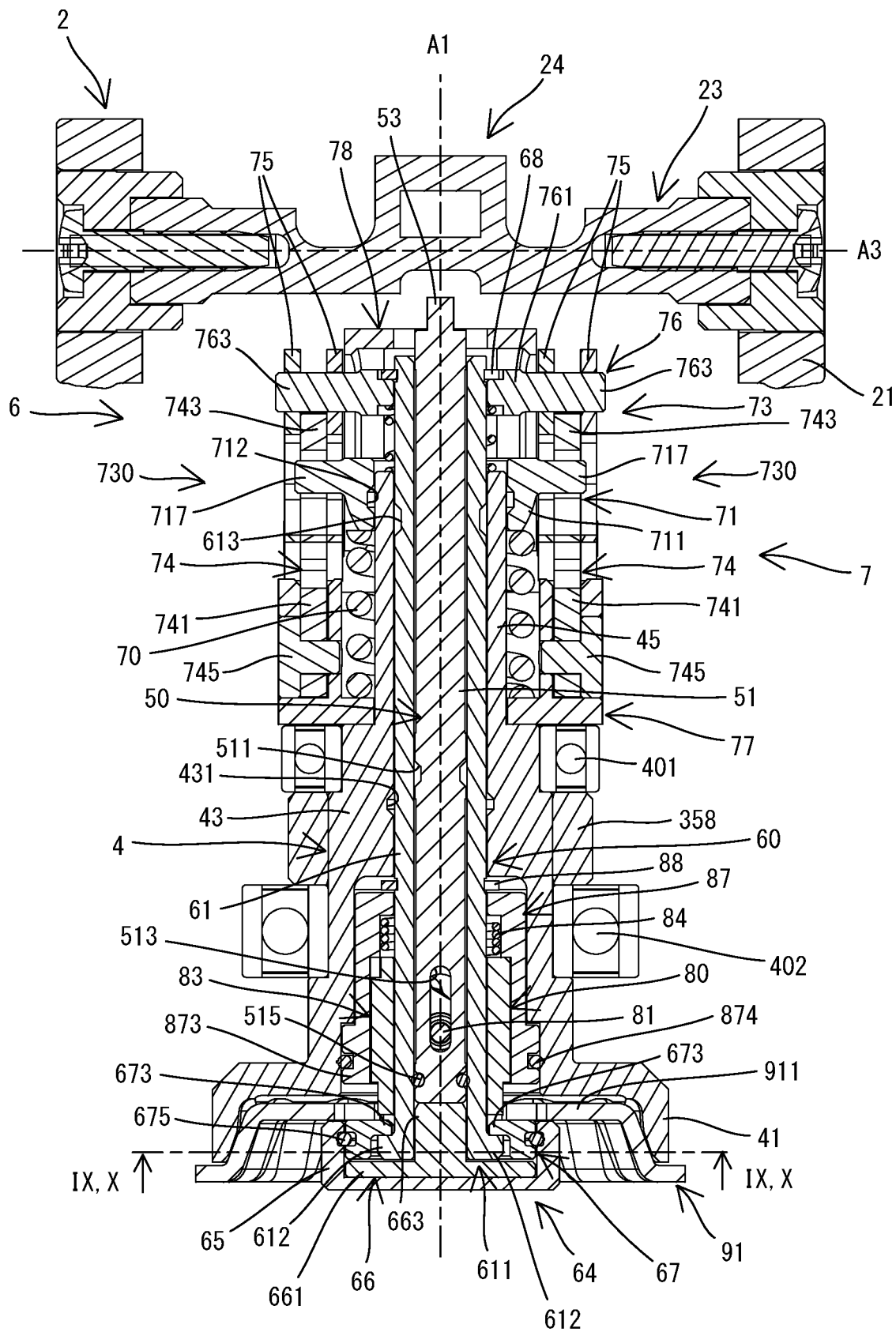
FIG. 7 is a partial, enlarged view of FIG. 4, wherein a housing is omitted for the purposes of clarity.
Figure 8:
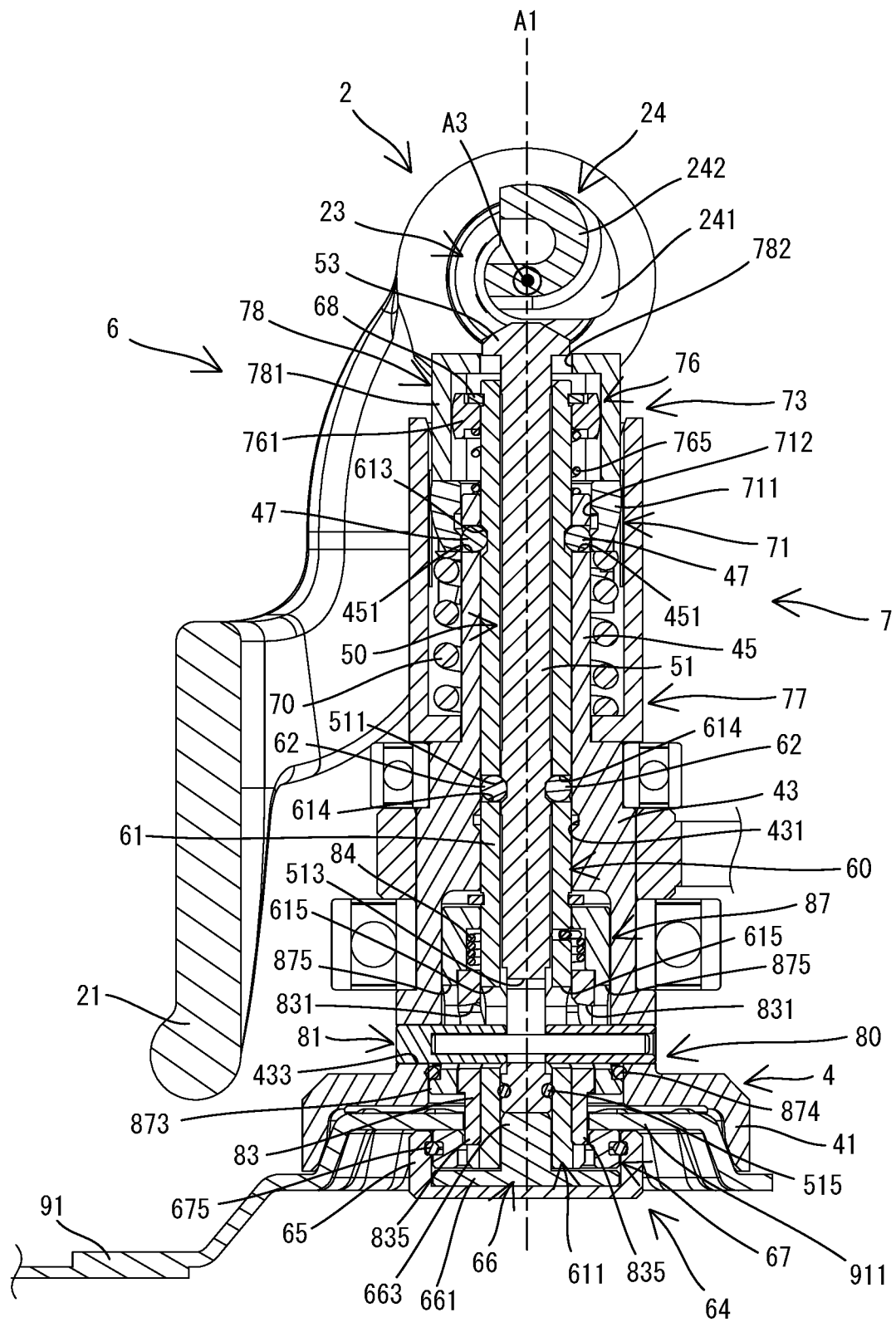
FIG. 8 is a partial, enlarged view of FIG. 3, wherein the housing is omitted for the purposes of clarity.

First, the clamping shaft 60 is described. The clamping shaft 60 is configured to fixedly (securely) hold the tool accessory 91 by pressing the tool accessory 91 against the tool mounting part 41. The clamping shaft 60 is disposed to be selectively movable in the up-down direction relative to the spindle 4, as will be explained below. Referring now to FIGS. 6 to 8, the clamping shaft 60 of this embodiment includes the above-mentioned shaft part 61 and clamping head 64.

The shaft part 61 as a whole is an elongate hollow cylindrical member (i.e. a sleeve). The shaft part 61 is coaxially arranged with the spindle 4. More specifically, the shaft part 61 is inserted in the spindle 4, and upper and lower end portions of the shaft part 61 protrude from upper and lower ends of the spindle 4, respectively. The shaft part 61 has substantially uniform outer and inner diameters. The shaft part 61 is selectively slidable in the up-down direction along the inner peripheral surface of the small-diameter part 45 and the inner peripheral surface of the upper portion of the large-diameter part 43 of the spindle 4. A lower end portion of the shaft part 61 is configured as a head mounting part 611, to which the clamping head 64 is detachably attachable (connectable). The head mounting part 611 has projections 612 that protrude radially outward. The projections 612 are disposed at equal intervals in a circumferential direction.

An annular engagement groove 613 is formed in (on, around) an upper portion (more specifically, a portion that is disposed within the small-diameter part 45 of the spindle 4) of the shaft part 61. The balls 47, which are held in the respective ball-holding holes 451 of the spindle 4, are engageable with the engagement groove 613 with play (a clearance) in the up-down direction, i.e. the width of the engagement groove 613 in the up-down direction is greater than the diameter of the balls 47. The depth of the engagement groove 613 is set such that when the balls 47 that are engaged with (disposed in) the engagement groove 613, the balls 47 do not protrude radially outward from an outer peripheral surface of the spindle 4.

Two ball-holding holes (circular through holes) 614 are formed in a central portion of the shaft part 61 in the up-down direction. The two ball-holding holes 614 diametrically (mirror symmetrically) oppose each other across the driving axis A1. The ball-holding holes 614 are formed to extend radially through a wall that forms (defines) the shaft part 61. Each of the ball-holding holes 614 is configured to rollably hold one of the balls 62. The diameter of each of the ball-holding holes 614 is substantially equal to (slightly larger than) the diameter of the balls 62, and the thickness of the wall of the shaft part 61 is smaller (less) than the diameter of the balls 62. Therefore, a portion of the ball 62 (while being held in the ball-holding hole 614) can protrude to the inner peripheral side of and/or a (another) portion of the ball 62 can protrude to the outer peripheral side of the shaft part 61. The clamping shaft 60 is selectively engageable with an actuating shaft 50 or with the spindle 4 via the balls 62, as will be described in detail below.

Further, two guide holes 615 are formed in a lower portion (a portion above the projections 612) of the shaft part 61. The two guide holes 615 diametrically (mirror symmetrically) oppose each other across the driving axis A1. Each of the guide holes 615 is a slot (slotted hole) that is formed to extend radially through the wall of the shaft part 61 and that is elongated in the up-down direction. The pin 81 that is supported by the spindle 4 is also inserted through the guide holes 615. The width of the guide holes 615 is substantially equal to (slightly larger than) the diameter of the pin 81. The clamping shaft 60 is selectively movable in the up-down direction relative to the spindle 4 within a range in which the pin 81 is movable within the guide hole 615, as will be described in detail below.

The clamping head 64 is connected to the head mounting part 611 of the shaft part 61 and radially protrudes outward of the shaft part 61 like a flange. The clamping head 64 is disposed under (below) the tool mounting part 41 and configured to abut on a lower surface of the tool accessory 91 (specifically, on a lower surface of the protruding part 911) and to press the tool accessory 91 upward. In this embodiment, the clamping head 64 is formed separately from the shaft part 61. Further, the clamping head 64 is configured to be detachable (removable) from the head mounting part 611. The clamping head 64 includes a case 65, a pressing part 66 and a lock ring 67.

The case 65 is a short hollow cylindrical member having a bottom wall and an open top. The case 65 has a circular bottom wall and a circular cylindrical peripheral wall that protrudes upward from an outer edge of the bottom wall. The case 65 has an inner diameter that is larger than the maximum diameter of the head mounting part 611 of the shaft part 61. The case 65 is configured to house the pressing part 66 and the lock ring 67.

The pressing part 66 includes a circular base plate 661 and a circular columnar projection 663 that protrudes from the center of the base plate 661. The base plate 661 has a diameter that is substantially equal to the inner diameter of the case 65. The pressing part 66 is housed in the case 65 such that the projection 663 protrudes upward. The projection 663 has an outer diameter that is substantially equal to the inner diameter of the shaft part 61 so as to be inserted into the shaft part 61. The pressing part 66 presses the actuating shaft 50 upward when the user mounts (attaches, couples) the clamping head 64 to the shaft part 61, as will be described in detail below.

The lock ring 67 is configured to engage with the head mounting part 611 of the shaft part 61. The lock ring 67 has a circular outer periphery (circumference). The lock ring 67 has projections 673 formed on its upper end portion. The projections 673 are disposed at equal intervals in the circumferential direction and protrude radially inward. The shape of each space defined between two adjacent ones of the projections 673 conforms to (matches) the shape of one of the projections 612 of the head mounting part 611 in a top view or in a bottom view (i.e. when viewed from above or below). The projections 673 define a lock hole 671 in the upper end portion of the lock ring 67.

The lock ring 67 is disposed on top of the base plate 661 of the pressing part 66 within the case 65. The distance between an upper surface of the base plate 661 and lower surfaces of the projections 673 is set to allow the projections 612 of the head mounting part 611 to be disposed between the upper surface of the base plate 661 and the lower surfaces of the projections 673 (see FIG. 7). Further, annular grooves are respectively formed in an inner periphery of the case 65 and the circular outer periphery (circumference) of the lock ring 67. The lock ring 67 is held to be rotatable around its axis (center) relative to the case 65 via an annular elastic member (e.g., an O-ring) 675 disposed in (between) these annular grooves.

Figure 9:
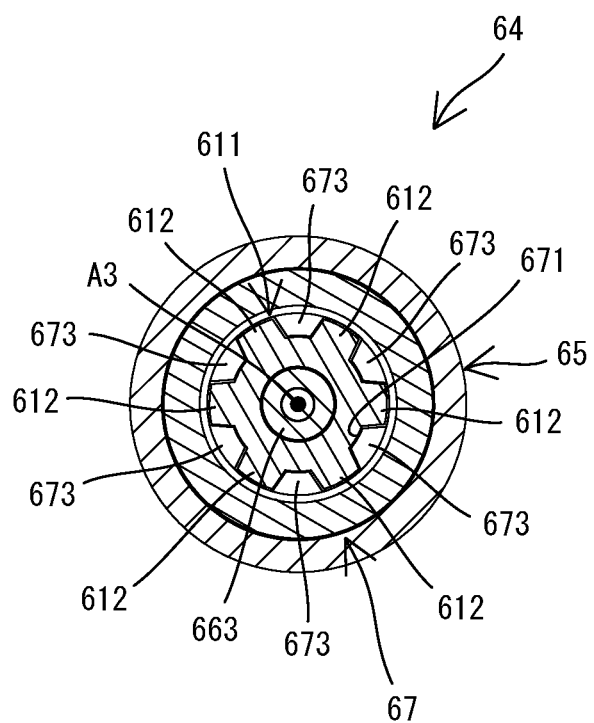
FIG. 9 is a sectional view taken along line IX-IX in FIG. 7, wherein a lock ring is located in an unlocking position.

Owing to the above-described structure, the head mounting part 611 is allowed to pass through the lock hole 671 in the up-down direction only when the head mounting part 611 is located in a specific position (relative rotational position) in the circumferential direction in (at) which the head mounting part 611 of the shaft part 61 is aligned with the lock hole 671 as shown in FIG. 9.

Figure 10:
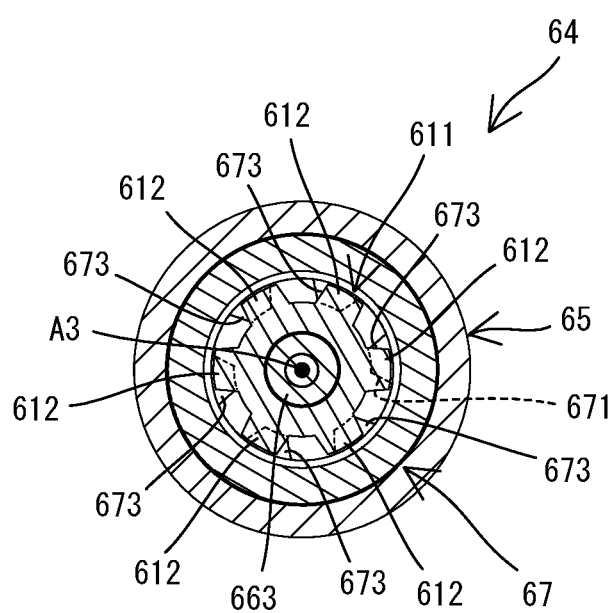
FIG. 10 is a sectional view taken along line X-X in FIG. 7, wherein the lock ring is located in a locking position.

Then, when the projections 612 are inserted through the lock hole 671 to be disposed inside the clamping head 64 and the head mounting part 611 and the lock ring 67 are rotated (pivoted) relative to each other within a specific angle range, the projections 612 of the head mounting part 611 and the projections 673 of the lock ring 67 partially overlap each other in the top view or in the bottom view (i.e. when viewed from above or below) as shown in FIG. 10. Therefore, because the head mounting part 611 is prevented from passing through the lock hole 671 at this time, the head mounting part 611 becomes engaged (interlocked) with the lock ring 67. Specifically, the projections 612 of the head mounting part 611 engage with the projections 673 of the lock ring 67, in a state in which upper surfaces of the projections 612 are partially in contact with the lower surfaces of the projections 673. The clamping head 64 is thus fixedly (securely) connected (coupled) to the shaft part 61 by engagement between the projections 612 and the projections 673.

The two specific circumferential positions (relative rotational positions) of the lock ring 67 relative to the shaft part 61 (i.e. relative to the head mounting part 611) are hereinafter referred to as follows: the position (shown in FIG. 9) in (at) which the head mounting part 611 is allowed to pass through the lock hole 671 is referred to as an unlocking position (or aligned position); and the position (shown in FIG. 10) in (at) which the head mounting part 611 is prevented from passing through the lock hole 671 and engages with the lock ring 67 is referred to as a locking position (or overlapping position). In this embodiment, the positional relation between the shaft part 61 (the projections 612) and the lock ring 67 (the projections 673) changes in response to manipulation (pivoting) of the lever 2 or in response to insertion of the projection 663 of the pressing part 66 into the shaft part 61, as will be described in further detail below.

The biasing mechanism 7 is now described. The biasing mechanism 7 is configured to bias the clamping shaft 60 upward relative to the housing 10. In this embodiment, the biasing mechanism 7 mainly includes a clamp spring 70, the above-mentioned spring receiving part (spring seat) 71, a force amplifying mechanism 73 and a support member 77 that supports these structures (components).

As shown in FIGS. 5, 7, 8, 11 and 12, the support member 77 as a whole is a rectangular box-like member (frame) having an open top. The support member 77 includes a rectangular bottom wall having a circular through hole and a peripheral wall protruding upward from an outer edge of the bottom wall. The peripheral wall includes front and rear wall portions and side wall portions (left and right wall portions). The front and rear wall portions protrude further upward than the side wall portions. Each of the side wall portions has a recess that is open upward. The support member 77 is mounted in the housing 10 above an upper surface of the large-diameter part 43 of the spindle 4, with the small-diameter part 45 being inserted through the circular through hole in the bottom wall of the support member 77. The top of the support member 77 is covered by a cover member 78. The support member 77 is disposed within the housing 10 (see FIGS. 3 and 4) such that the support member 77 is prevented (blocked) from rotating (moving) around the driving axis A1 relative to the housing 10.

The clamp spring 70 generates a biasing force that is used to bias the clamping shaft 60 upward such that a clamping force is applied to the clamping shaft 61 in order to clamp the tool accessory 91 between the tool mounting part 41 and the clamping head 64. In this embodiment, a compression coil spring is employed as the clamp spring 70. The clamp spring 70 is disposed in the support member 77 and is disposed radially outside (around) the small-diameter part 45 of the spindle 4.

The spring receiving part (spring seat) 71 includes an annular member, i.e. a portion defining at least a circular through hole. The spring receiving part 71 is disposed to be selectively movable in the up-down direction relative to the spindle 4. Furthermore, the spring receiving part 71 is disposed directly above the clamp spring 70 and is fitted around the upper end portion of the small-diameter part 45 such that the small-diameter part 45 is rotatable (pivotable) relative to the spring receiving part 71. An upper end portion of the clamp spring 70 is in abutment with a lower end (lower surface) of the spring receiving part 71. The spring receiving part 71 includes a body 711, two pairs of (four in total) projection pieces (projections) 715 and a pair of (i.e. two) pins 717.

The body 711 is annular-shaped (i.e. formed as a collar). The body 711 has an inner diameter that is substantially equal to (slightly larger than) the outer diameter of the small-diameter part 45 of the spindle 4. The body 711 is selectively slidable in the up-down direction along (relative to) an outer peripheral surface of the small-diameter part 45. In this embodiment, the spring receiving part 71 is configured to be selectively locked to (engaged with) the spindle 4 at a specific position in the up-down direction. For this purpose, an annular engagement groove 712 (see FIG. 8) is formed in (on, around) an inner periphery (inner circumferential surface) of the body 711. The engagement groove 712 is configured to be engageable with the balls 47 that are held in the ball-holding holes 451 of the spindle 4. The depth of the engagement groove 712 is set such that when the balls 47 engage with (are disposed in) the engagement groove 712, the balls 47 do not protrude radially inward from the inner peripheral (circumferential) surface of the spindle 4.

Two of the four projection pieces 715 protrude forward from the body 711. The two front projection pieces 715 are respectively in contact with left and right vertically-extending edges of the front wall portion of the support member 77. The other two of the four projection pieces 715 protrude rearward from the body 711. The two rear projection pieces 715 are respectively in contact with left and right vertically-extending edges of the rear wall portion of the support member 77. Thus, the spring receiving part 71 is slidable in the up-down direction relative to the support member 77 between upper and lower (horizontally-extending) stops (not numbered) defined on the support member 77 (see FIG. 5), while being prevented from rotating (moving) around the driving axis A1 relative to the support member 77.

The two pins 717 are arranged diametrically opposite to each other in the left-right direction across the driving axis A1, and respectively protrude to the left and right from the body 711. The pins 717 are disposed above the side wall portions of the support member 77. The pins 717 are configured to actuate (change the configuration of) the force-amplifying mechanism 73 when the tool accessory 91 is clamped, as will be described in detail below.

The force-amplifying mechanism 73 is configured to amplify (multiply, increase) the biasing force (spring force) generated by the clamp spring 70 and to transmit the increased biasing force to the clamping shaft 60. In this embodiment, the force-amplifying mechanism 73 includes two link mechanisms 730 (more specifically, two link mechanisms 730 each including a toggle joint mechanism or toggle mechanism) arranged symmetrically on the left and right sides of the clamping shaft 60 and a slider 76. Each of the link mechanisms 730 includes a set of a fixed link (pivotably attached link or first link) 74 and two movable links (second links) 75. The link mechanisms 730 are both operably connected to the slider 76, as will be further described below.

Each of the fixed links 74 includes a linearly extending body (straight portion) 741 and a hook-like actuating part (hook) 743 that projects, e.g., perpendicularly or substantially perpendicular, from one end portion (a first longitudinal end portion) of the linearly extending body 741. The other end portion (a second longitudinal end portion) of the body 741 on the side opposite to the actuating part 743 is disposed within the recess (slot) of one of the side wall portions of the support member 77, and is pivotally supported by (on, with respect to) the support member 77 via a pin 745. The actuating part 743 and the first longitudinal end portion of the body 741 that is contiguous with the actuating part 743 protrude upward from the side wall portion of the support member 77. Each of the fixed links 74 is pivotable about an axis defined by the respective pins 745, which axis extends in the horizontal (left-right) direction, relative to the support member 77.

Figure 11:
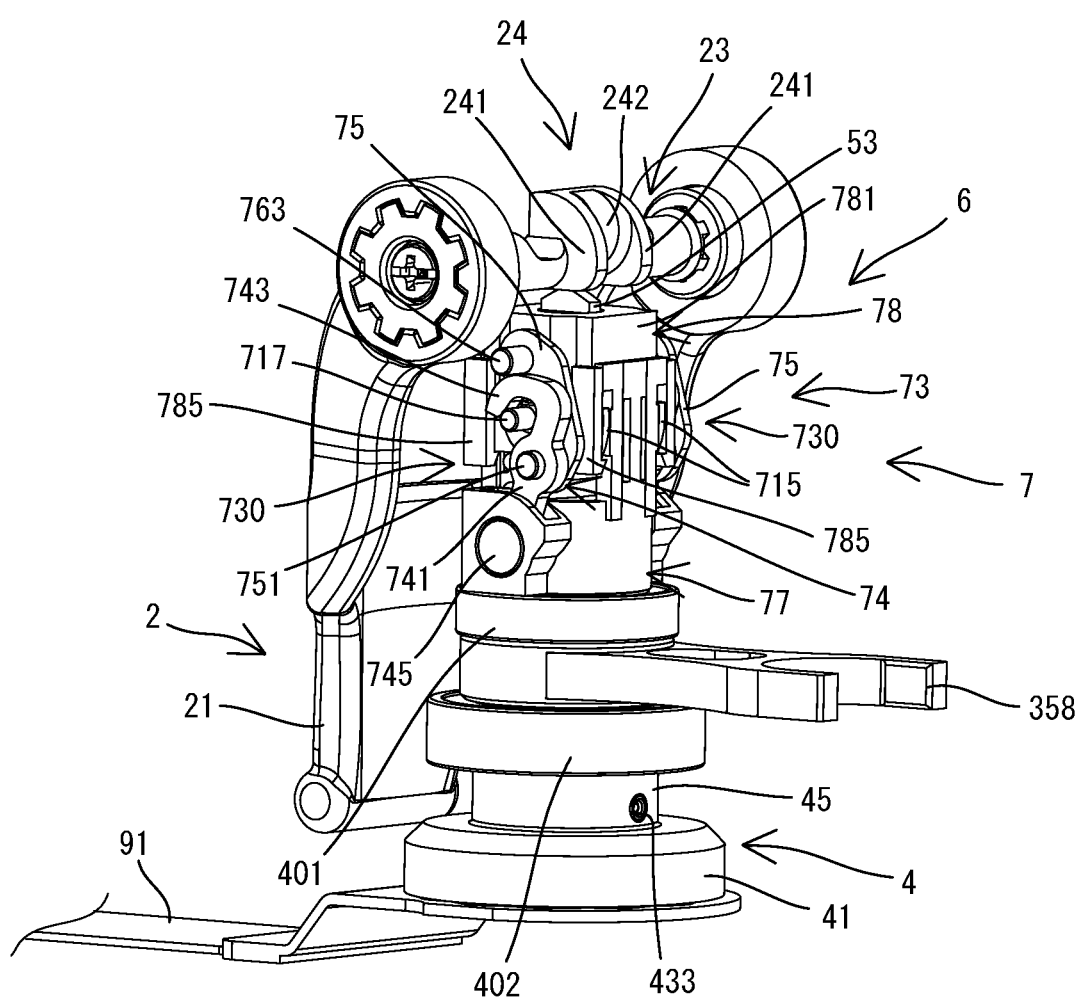
FIG. 11 is a perspective view showing the lever, a spindle and a clamping mechanism, wherein the lever is in the initial position.
Figure 12:
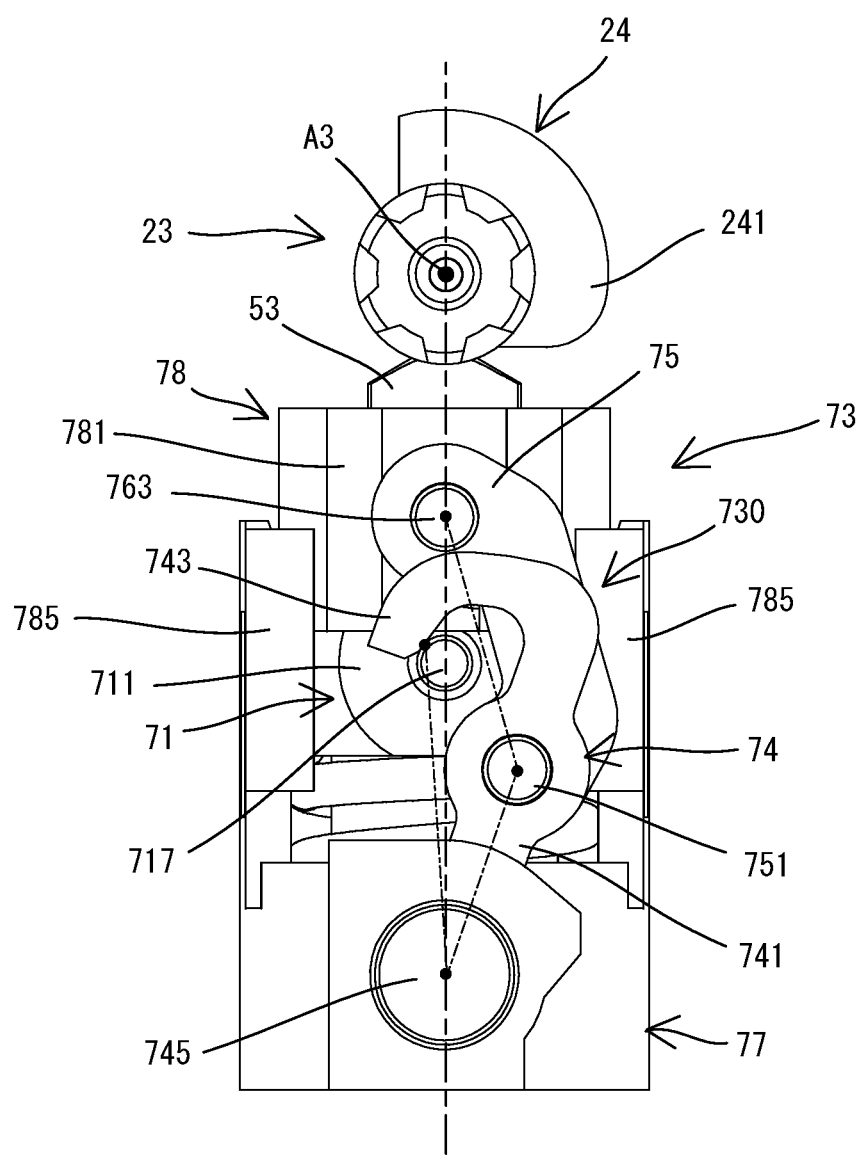
FIG. 12 is a side view of a force-amplifying mechanism, wherein the lever is in the initial position.

The two movable links 75 are arranged on the left and right sides of each of the fixed links 74, and are pivotally connected to the fixed link 74. More specifically, one end portion (a first end portion) of each movable link 75 is pivotally connected via a pin 751 to the first longitudinal end portion of the linearly extending body (straight portion) 741 that is contiguous with the actuating part 743. The movable links 75 are pivotable about an axis defined by the pin 751, which axis extends in the horizontal (left-right) direction, relative to the fixed link 74. In FIGS. 11 and 12 and some of the other drawings described in the following, one of the movable links 75 (i.e. the one that is disposed outward of the other one) is not shown for the sake of clarity. However, it is noted that, in a modification of the present embodiment, one of the movable links 75 may be omitted, as long as one movable link 75 transmits force from the fixed link 74 to the slider 76.

The slider 76 is disposed to be movable (slidable) in the up-down direction relative to the spindle 4 (and relative to the spring receiving part 71 and to the housing 10). The slider 76 includes an annular member (i.e. it includes portion defining a circular through hole, although the exterior may be polygonal), and is fitted around (surrounds) the shaft part 61 of the clamping shaft 60 above the spring receiving part 71, such that the shaft part 61 is rotatable (pivotable) relative to the slider 76. As will be further explained below, the slider 76 is not pivotable (rotatable) relative to the housing 10. The slider 76 includes an annular body (collar) 761 and a pair of (i.e. two) pins 763 protruding from the body 761. The body 761 has an inner diameter that is substantially equal to (slightly larger than) the outer diameter of the shaft part 61 and is slidable in the up-down direction along an outer peripheral surface of the clamping shaft 60. The two pins 763 are diametrically opposite of each other in the left-right direction across the driving axis A1, and respectively protrude (project, extend) to the left and right from the body 761. Each of the pins 763 is connected to the other end portion (a second longitudinal end portion) of each of the movable links 75 on the side opposite to the first end portion of the movable links 75 that is connected to the fixed link 74, so that the movable links 75 are pivotable relative to the slider 76.

Further, a biasing spring 765 is disposed between the spindle 4 (specifically, the upper end of the small-diameter part 45) and the slider 76. The biasing spring 765 always biases the slider 76 upward relative to the spindle 4 to hold the slider 76 in (at) a position in (at) which the slider 76 abuts on a retaining ring 68 that is fixed around an upper end portion of the shaft part 61, as will be further discussed below. However, it is noted that, in a modification of the present embodiment, the retaining ring 68 may be omitted and the slider 76 may directly abut on a portion of the shaft part 61 (e.g., on a flange or cantilever portion provided on (at) the upper end portion of the shaft part 61). The biasing spring 765 is also preferably a compression coil spring that has a smaller (preferably considerably smaller) spring constant than the spring constant of the clamp spring 70.

In this embodiment, the force-amplifying mechanism 73 is configured to be actuated by the left and right pins 717 of the spring receiving part 71 to amplify (multiply, increase) the biasing force generated by the clamp spring 70 and to transmit the amplified (increased) biasing force to the clamping shaft 60 via the retaining ring 68 that is disposed between the upper end of the clamping shaft 60 and the slider 76. When the clamping shaft 60 is biased (pressed) upward by the amplified (increased) biasing force, the clamping head 64 presses the tool accessory 91 against the tool mounting part 41 and thereby clamps the tool accessory 91 in cooperation with the tool mounting part 41.

To simplify the explanation, operation of the above-described force-amplifying mechanism 73 will be described in the following with respect to one set of one fixed link 74 and two movable links 75, although the same operation takes place in both sets of fixed links 74 and movable links 75.

The force-amplifying mechanism 73 of this embodiment is configured to amplify (increase) the biasing force generated by the clamp spring 70 in the following three steps.

Firstly, owing to the fact that the spring receiving part 71 receives (is subjected to) the upward biasing force of the clamp spring 70, the pin 717 presses the actuating part 743 upward while abutting on an inside surface (abutment surface) of the hook-shaped actuating part 743. The abutment surface of the actuating part 743 is inclined (oblique) with respect to the up-down direction, with an inclination angle of less than 45° (45 degrees). Therefore, the upward force of the pin 717 is applied to the fixed link 74 as a force that causes the fixed link 74 to rotate (pivot) about the pin 745. Moreover, as the pin 717 moves upward and the fixed link 74 is pivoted about the pin 745 counterclockwise (in the view shown in FIG. 12) relative to the support member 77, the inclination angle of the abutment surface of the actuating part 743 (relative to the up-down direction) becomes smaller. This decrease of inclination angle leads to an increase in the amount of force amplification by the force-amplifying mechanism 73.

Secondly, the fixed link 74 acts as a lever. Specifically, the distance from the axis of the pin 745 (i.e., pivot axis, fulcrum) to the axis of the pin 751 (joint) is shorter than the distance from the axis of the pin 745 to the point of contact between the pin 717 and the abutment surface of the actuating part 743. Therefore, due to a lever effect, the force that acts on the point of contact between the pin 717 and the abutment surface of the actuating part 743 is amplified and is applied in a tangential direction to the pin 751 (joint).

Third, the body (straight portion) 741 of the fixed link 74 and the movable links 75 form a toggle joint mechanism (or toggle mechanism). Therefore, the tangential force applied to the pin 751 (joint) is amplified and acts on the pin 751, which connects the movable links 75 and the slider 76, as an upward biasing force. As the linearly extending body 741 (straight portion) and the movable links 75 move closer to their respective positions in (at) which the body 741 and the movable links 75 become more aligned (i.e. they form a larger obtuse angle relative to each other), the amount of force amplification increases. As described above, the force-amplifying mechanism 73 as a whole can amplify (multiply, increase) the biasing force generated by the clamp spring 70 and transmit the amplified (increased) biasing force to the clamping shaft 60.

In this embodiment, the slider 76 is held by the cover member 78 that is mounted (sits) on the spring receiving part 71, such that the slider 76 is movable only in the up-down direction (i.e. the slider 76 is not rotatable or pivotable around the driving axis A1). The cover member 78 includes a rectangular box-like body 781 having an open bottom, and four legs 785 respectively protruding downward from the four corners of the body 781.

The body 781 is configured to cover (surround) the slider 76. A through hole 782 is formed in the center of an upper wall of the body 781. The diameter of the through hole 782 is set to allow an abutment part 53 of the actuating shaft 50, which will be described below, to pass through the through hole 782. Further, a guide groove 783 is formed in each of the two side wall portions (left and right wall portions) of the body 781. The guide grooves 783 extend linearly upward from lower ends of the side wall portions, respectively. The pins 763 of the slider 76 respectively protrude to the left and right through the two guide grooves 783. The cover member 78 and the slider 76 are movable in the up-down direction relative to each other owing to the fact that the pins 763 of the slider 76 can slide up and down within the respective guide grooves 783 relative to the cover member 78. A locking claw (hook) is provided on a lower end portion of each of the legs 785. The cover member 78 is mounted (sits) on the spring receiving part 71, in a state in which: (i) a lower end surface of the body 781 is in abutment with an upper end surface of the body 711 of the spring receiving part 71, (ii) the legs 785 are in abutment with an outer peripheral surface of the body 711, and (iii) the four locking claws are respectively engaged with lower ends (lower edges or surfaces) of the four projection pieces 715.

Owing to this design, the cover member 78 is movable together (integrally) with the spring receiving part 71 in the up-down direction relative to the spindle 4. When a force is not being applied to the cover member 78 from above (by the lever 2 as will be described below), the cover member 78 is biased upward by the clamp spring 70 via the spring receiving part 71, whereby the cover member 78 moves to its uppermost position together with the spring receiving part 71. At this time, the pins 763 of the slider 76 are located below the upper ends of the guide grooves 783. The cover member 78 is configured to be moved downward together (integrally) with the spring receiving part 71 in response to an unclamping operation being performed by the user on the manipulation part 21 of the lever 2, which will have the effect of releasing (interrupting) the application of the biasing force generated by the clamp spring 70 to the clamping shaft 60, as will be further described below with reference to FIGS. 21 and 22.

The oscillating multi-tool 1 of this embodiment is configured, in response to the unclamping operation being performed on the lever 2, to: (i) release the clamping of the tool accessory 91 by the clamping mechanism 6, (ii) push down the tool accessory 91 relative to (away from) the tool mounting part 41 and then (iii) separate the clamping head 64 from the shaft part 61. Furthermore, the oscillating multi-tool 1 is configured, in response to the user fitting (mounting) the clamping head 64 onto the shaft part 61, to (automatically) actuate the clamping mechanism 6 and lock the clamping head 64 to the shaft part 61. In order to realize these functions, the oscillating multi-tool 1 is provided with the above-mentioned clamping mechanism 6, actuating shaft 50 and motion converting mechanism 80, as well as a push-down sleeve 87. The lever 2 and these mechanisms are now described in further detail.

First, the lever 2 is described in further detail. In this embodiment, as shown in FIGS. 1 and 4, the lever 2 includes the above-described Y-shaped manipulation part 21 and a rotary shaft 23. The rotary shaft 23 extends in the left-right direction within the housing 10, and is supported by (in) the housing 10 so as to be rotatable (pivotable) around a rotational axis (pivot axis) A3. The rotational axis A3 orthogonally intersects the driving axis A1, and the rotary shaft 23 is disposed directly above the cover member 78. Two axial end portions of the rotary shaft 23 are respectively connected to the two end portions of the manipulation part 21, so that the rotary shaft 23 rotates together (integrally) with the manipulation part 21 in response to pivoting of the manipulation part 21.

As shown in FIGS. 8 and 11, a cam part 24 is provided on (at) a central portion of the rotary shaft 23. In this embodiment, the cam part 24 includes a pair of (i.e. two) first cams 241 and a second cam 242. The second cam 242 is located on (intersected by) the driving axis A1, and the two first cams 241 are disposed on the left and right sides of the second cam 242, respectively. The first cams 241 are configured to selectively abut on an upper wall of the cover member 78, and the second cam 242 is configured to selectively abut on the actuating shaft 50. The first and second cams 241, 242 are configured such that when the lever 2 is pivoted in the unclamping direction, the first cams 241 first abut on the cover member 78 and then the second cam 242 subsequently abuts on the actuating shaft 50.

The actuating shaft 50 is now described. The actuating shaft 50 is configured to separate the clamping head 64 from the shaft part 61 by moving downward relative to the clamping shaft 60 (i.e. relative to the shaft part 61). Further, the actuating shaft 50 is configured to move upward in response to the clamping head 64 being fitted (mounted) onto the shaft part 61, thereby actuating the clamping mechanism 6.

More specifically, as shown in FIGS. 5, 7 and 8, the actuating shaft 50 is a round rod-like elongate member as a whole. The actuating shaft 50 includes a shaft part 51 and an abutment part 53.

The shaft part 51 has a diameter slightly smaller than the inner diameter of the clamping shaft 60. The actuating shaft 50 is coaxially inserted through the clamping shaft 60 to be movable in the up-down direction relative to the spindle 4.

An annular engagement groove 511 is formed in (at, around) a generally central portion of the shaft part 51 in the up-down direction. The balls 62 that are held in the ball-holding holes 614 of the clamping shaft 60 are engageable with the engagement groove 511. The depth of the engagement groove 511 is set such that when the balls 62 engage with (are disposed in) the engagement groove 511, the balls 62 do not protrude radially outward from the outer peripheral surface of the clamping shaft 60. When the actuating shaft 50 is engaged with the clamping shaft 60 via the balls 62, the actuating shaft 50 is movable together with the clamping shaft 60 in the up-down direction relative to the spindle 4. On the other hand, when the balls 62 are located radially outward of the engagement groove 511, the actuating shaft 50 is movable independently from the clamping shaft 60 in the up-down direction relative to the spindle 4.

A guide hole (slotted hole) 513 is formed in a lower end portion of the shaft part 51. The guide hole 513 is formed (extends) through the shaft part 51 and is elongated in the up-down direction such that it has a racetrack shape (i.e. a parallel intermediate portion with two semi-circular ends). The pin 81 that is rotatably (pivotably) supported by the spindle 4 is inserted through the guide hole 513. The width of the parallel portion of the guide hole 513 is substantially equal to (slightly larger than) the diameter of the pin 81. The actuating shaft 50 is movable in the up-down direction relative to the spindle 4 within a range in which the pin 81 is movable within the guide hole 513, as will be described in detail below. The length of the guide hole 513 in the up-down direction is longer than the length of the guide hole 615 of the clamping shaft 60 in the up-down direction. Therefore, the range of the movement of the actuating shaft 50 in the up-down direction relative to the spindle 4 is longer than the range of the movement of the clamping shaft 60 in the up-down direction relative to the spindle 4.

An annular elastic member (elastic O-ring) 515 is fitted in an annular groove formed in (on, around) an outer periphery of the lower end portion of the shaft part 51. The elastic member 515 serves to generate a sliding resistance when the actuating shaft 50 moves in the up-down direction relative to the clamping shaft 60.

The abutment part 53 is formed contiguously with an upper end of the shaft part 51 and forms an upper end portion of the actuating shaft 50. The abutment part 53 is disposed above the clamping shaft 60, and selectively receives a pressing force (downward pressing force) applied by the lever 2 (specifically, by the second cam 242). The abutment part 53 is configured to protrude radially outward of the shaft part 51 in order to prevent the actuating shaft 50 from slipping down into (immersing in) the clamping shaft 60.

The motion converting mechanism 80 is now described. As shown in FIGS. 7 and 8, the motion converting mechanism (linear-to-rotary motion converting mechanism) 80 is configured to convert linear motion (e.g., of the actuating shaft 50 and/or the clamping shaft 60) in the up-down direction into rotary (pivotal) motion (e.g., of the rotary sleeve 83) around the driving axis A1. The motion converting mechanism 80 basically includes the above-described pin 81, a rotary sleeve 83 and a biasing spring 84.

As described above, the pin 81 is inserted through the pin-holding holes 433 above the tool mounting part 41 and is thereby supported by the spindle 4.

As shown in FIGS. 6 to 8 and 13, the rotary sleeve 83 is a hollow cylindrical member as a whole. The rotary sleeve 83 has an inner diameter that is substantially equal to (slightly smaller than) the outer diameter of the shaft part 61 of the clamping shaft 60. The rotary sleeve 83 has two guide holes 831 that oppose each other across the driving axis A1. Each of the guide holes 831 is a through hole that is formed to extend radially through a wall that forms (defines) the rotary sleeve 83 and that is configured such that the pin 81 is slidable within (relative to) the guide holes 831.

Each of the guide holes 831 has two end portions located at different positions in the up-down direction and an inclined portion (oblique or diagonal portion) connecting the two end portions when viewed from a radially outward opposing position (i.e. when viewed from the outside of the rotary sleeve 83 and in a direction that is perpendicular to the driving axis A1). The length of the guide hole 831 in the up-down direction is substantially equal to the length of the guide hole 615 of the clamping shaft 60 in the up-down direction. In this embodiment, the left end portion of the guide hole 831 is formed below the right end portion when the guide hole 831 is viewed from the radially outward opposing position. In other words, the inclined portion of the guide hole 831 is inclined downward in a clockwise direction as viewed from above. The lower and upper end portions of the guide hole 831 are hereinafter referred to as a lower end part 832 and an upper end part 833.

The rotary sleeve 83 is fitted around (surrounds) the shaft part 61 and is connected to the shaft part 61 via the biasing spring 84, with the pin 81 being inserted through the guide holes 831. The rotary sleeve 83 is movable in the up-down direction relative to the spindle 4 and is rotatable (pivotable) around the driving axis A1 relative to the spindle 4 and the shaft part 61, within a range in which the pin 81 is movable within the guide holes 831.

A plurality of projections 835 are formed on a lower end of the rotary sleeve 83. The projections 835 are disposed at equal intervals in the circumferential direction and protrude downward. The thickness of the wall that forms (defines) the rotary sleeve 83 is substantially equal to the protruding length (radial length) of the projections 612 of the head mounting part 611. Each of the projections 835 has a shape that conforms to (matches) the shape of the projections 612. Further, the distance between adjacent ones of the projections 835 in the circumferential direction is substantially equal to the distance between adjacent ones of the projections 612 in the circumferential direction. In other words, like the head mounting part 611, a lower end portion of the rotary sleeve 83 is configured to conform to (match) the lock hole 671 of the clamping head 64. Further, the protruding height (the dimension in the up-down direction) of the projections 835 is slightly larger than the thickness (the dimension in the up-down direction) of the projections 673 of the clamping head 64. The rotary sleeve 83 is always held in a position relative to the shaft part 61 in the up-down direction such that a lower end surface of the projections 835 at least partially abuts on an upper end surface of the respective projections 612 of the head mounting part 611.

The biasing spring 84 is configured to bias the rotary sleeve 83 in the circumferential direction around the driving axis A1 relative to the clamping shaft 60. In this embodiment, the biasing spring 84 is a torsion coil spring. One end portion of the biasing spring 84 is locked (affixed) to the shaft part 61, and the other end portion is locked (affixed) to an upper end portion of the rotary sleeve 83. The biasing spring 84 is mounted to bias the rotary sleeve 83 relative to the shaft part 61 in a clockwise direction as viewed from above.

With such a structure, as the rotary sleeve 83 moves together with the clamping shaft 60 in the up-down direction relative to the spindle 4 while the pin 81 moves within the guide holes 831, the rotary sleeve 83 rotates around the driving axis A1 relative to the spindle 4 and the shaft part 61.

Figure 13:
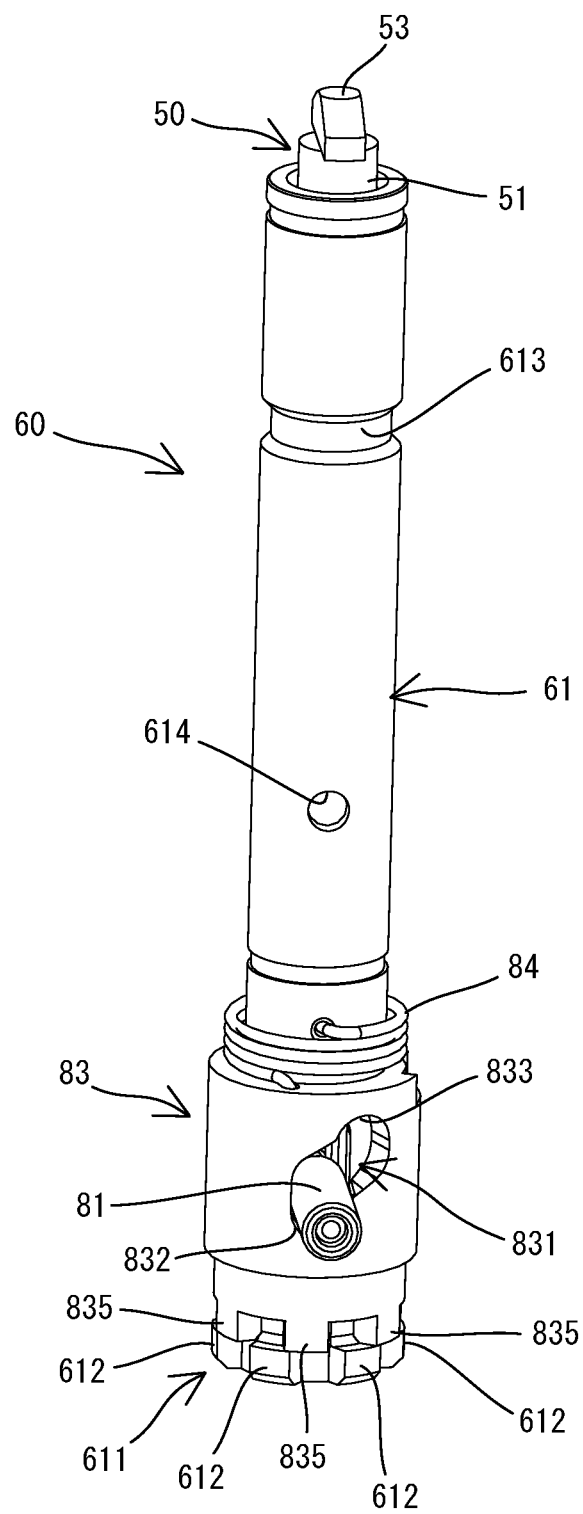
FIG. 13 is a perspective view showing a shaft part and a rotary sleeve, wherein the rotary sleeve is located in an offset position.

More specifically, when the rotary sleeve 83 moves upward relative to the spindle 4, the pin 81 moves downward relative to the rotary sleeve 83 with its end portions being in abutment with the inclined portions (oblique portion) of the guide holes 831 and causes the rotary sleeve 83 to rotate (pivot) in the counterclockwise direction as viewed from above. As shown in FIG. 13, when the two end portions of the pin 81 are located in the respective lower end parts 832 of the guide holes 831, the projections 835 on the lower end of the rotary sleeve 83 are respectively displaced (offset) from the projections 612 of the head mounting part 611 in the circumferential direction. More specifically, a portion of each of the projections 835 of the rotary sleeve 83 is located directly above a space formed between two adjacent projections 612 of the head mounting part 611. At this time, the position of the rotary sleeve 83 (the projections 835) relative to the head mounting part 611 (the projections 612) is hereinafter referred to as an offset position.

Figure 14:
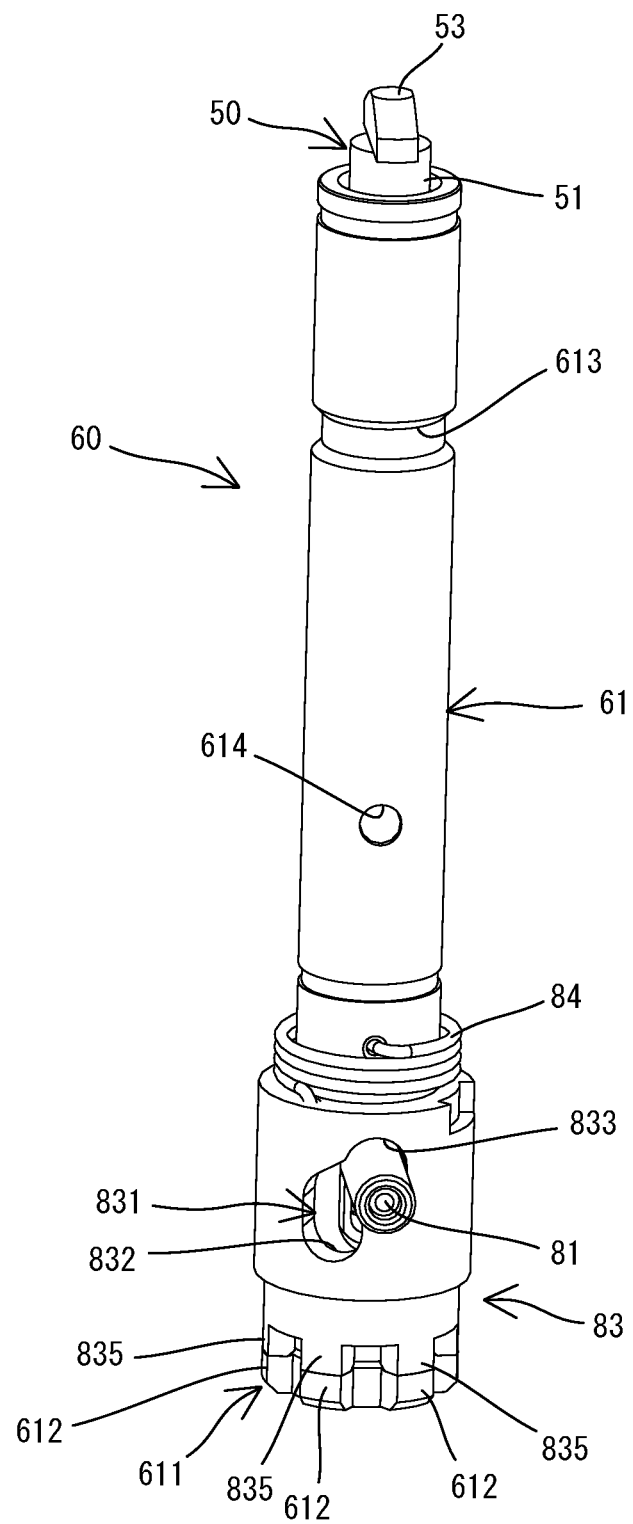
FIG. 14 is a perspective view showing the shaft part and the rotary sleeve, wherein the rotary sleeve is located in an alignment position.
Figure 15:
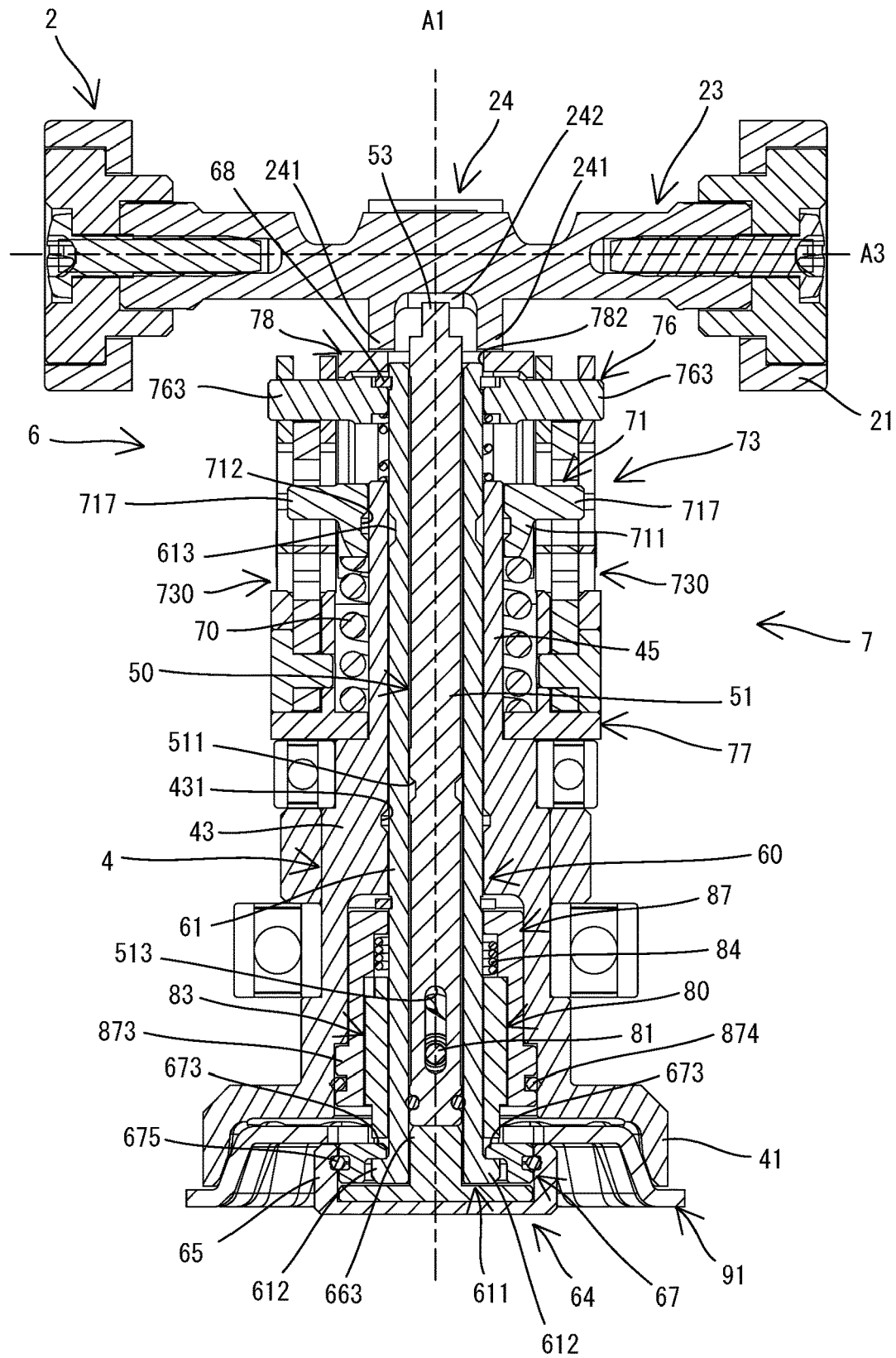
FIG. 15 is a sectional view corresponding to FIG. 7, for illustrating the state in which a biasing force that has been applied to a clamping shaft is released (interrupted).

On the other hand, when the rotary sleeve 83 moves downward relative to the spindle 4, the pin 81 moves upward relative to the rotary sleeve 83 with its end portions being in abutment with the respective inclined portions (oblique portion) of the guide holes 831, and causes the rotary sleeve 83 to rotate (pivot) in the clockwise direction as viewed from above. As shown in FIG. 14, when the end portions of the pin 81 are located in the respective upper end parts 833 of the guide holes 831, the projections 835 of the rotary sleeve 83 are respectively located in the same positions as the projections 612 of the head mounting part 611 in the circumferential direction. In other words, the projections 835 are located directly above the respective projections 612 (i.e. in alignment with respective the projections 612 in the up-down direction), and the spaces between the adjacent projections 612 communicate with the spaces between the adjacent projections 835 in the up-down direction. The position at this time of the rotary sleeve 83 (the projections 835) relative to the head mounting part 611 (the projections 612) is hereinafter referred to as an alignment position.

When the rotary sleeve 83 is located in (at) the alignment position and the lock ring 67 is located in (at) the unlocking position (see FIG. 9) relative to the head mounting part 611, the projections 612 and the projections 835, which are aligned in the up-down direction, are allowed to pass through the lock hole 671 of the clamping head 64. Each of the projections 673 of the lock ring 67 is placed between adjacent two of the projections 835 of the rotary sleeve 83 above the projections 612 of the head mounting part 611. Thereafter, when the rotary sleeve 83 rotates (pivots) to the offset position (see FIG. 13), the projections 835 cause the lock ring 67 to rotate (pivot) relative to the head mounting part 611 and place the lock ring 67 in the locking position (see FIG. 10). In (at) the locking position, as described above, at least portions of the projections 673 of the lock ring 67 are respectively located on the projections 612 of the head mounting part 611, which disables removal (disconnection, detachment) of the clamping head 64 from the shaft part 61.

In this manner, the rotary sleeve 83 is capable of changing (switching, rotating) the circumferential position of the lock ring 67 relative to the head mounting part 611 between the unlocking position and the locking position by rotating (pivoting) between the alignment position and the offset position.

The push-down sleeve 87 is now described. The push-down sleeve 87 is configured to move downward relative to the spindle 4 in response to the unclamping operation being performed on the lever 2 and thereby push down the tool accessory 91. In this embodiment, the push-down sleeve 87 is configured to move together with the clamping shaft 60 in the up-down direction.

As shown in FIGS. 6 to 8, the push-down sleeve 87 as a whole has a hollow cylindrical shape. The push-down sleeve 87 has a circular upper wall and a circular cylindrical peripheral wall protruding downward from an outer edge of the upper wall. A through hole is formed in the center of the upper wall that allows the clamping shaft 60 to be inserted therethrough. A lower end portion of the peripheral wall forms a flange part 873 that protrudes radially outward. The flange part 873 is configured to abut on the upper surface of the tool accessory 91 and push down the tool accessory 91 away from the tool mounting part 41. The flange part 873 has a flat lower end surface that is substantially orthogonal to the driving axis A1.

Further, in the peripheral wall of the push-down sleeve 87, two guide holes 875 are formed at positions diametrically opposite to each other across the driving axis A1. Each of the guide holes 875 is a slot (slotted hole) that is formed to extend radially through the peripheral wall and that is elongated in the up-down direction. The length and width of each of the guide holes 875 are substantially equal to the length and width of each of the guide holes 615 of the clamping shaft 60. The inner diameter of the push-down sleeve 87 is substantially equal to (slightly larger than) the outer diameter of the rotary sleeve 83, except that only an upper end portion of the push-down sleeve 87 has a smaller inner diameter. In other words, a shoulder portion (stepped portion) is formed on the inner periphery of the push-down sleeve 87.

The push-down sleeve 87 is fitted around the clamping shaft 60 in a state in which the rotary sleeve 83 and the biasing spring 84 are housed inside the push-down sleeve 87 and the pin 81 is inserted through the guide holes 83. Inside the push-down sleeve 87, an upper end of the rotary sleeve 83 abuts on the shoulder portion and the biasing spring 84 is disposed within the upper end portion of the push-down sleeve 87. A retaining ring 88 is fixed around the shaft part 61 of the clamping shaft 60 and abuts on the upper surface of the push-down sleeve 87, thereby preventing upward movement of the push-down sleeve 87. With such a structure, the push-down sleeve 87 is held in position in the up-down direction relative to the clamping shaft 60.

The push-down sleeve 87 is movable in the up-down direction relative to the spindle 4 within a range in which the pin 81 is movable within the guide holes 875, while being prevented from rotating (pivoting) relative to the spindle 4 and the clamping shaft 60. Further, the push-down sleeve 87 is configured to be slidable along an inner peripheral surface of the lower portion of the large-diameter part 43 of the spindle 4. An annular seal member (seal ring, gasket) 874, which is formed of an elastomer, is fitted around the flange part 873 in order to prevent leakage of lubricant (such as grease).

The respective operations of the lever 2, the clamping mechanism 6, the actuating shaft 50, the motion converting mechanism 80 and the push-down sleeve 87 are now described.

First, the state in which the tool accessory 91 is clamped is described.

As shown in FIGS. 7, 8, 11 and 12, when the tool accessory 91 is clamped, the lever 2 is located in the (its) initial position, i.e. in its downward pivoted position as shown, e.g., in FIGS. 8 and 11, such that the manipulation part 21 of the lever 2 contacts or is proximal to the front end of the oscillating multi-tool 1. At this time, the first and second cams 241, 242 of the cam part 24 are spaced apart upward from the cover member 78 and the abutment part 53 of the actuating shaft 50, respectively.

Furthermore, at this time, the balls 47, which are respectively held in the ball-holding holes 451 of the spindle 4, partially protrude radially inward from the spindle 4 and are engaged with (disposed in) the engagement groove 613 of the clamping shaft 60 with play (a clearance) existing below the balls 47. The engagement groove 712 of the spring receiving part 71 is located above the ball-holding holes 451. Therefore, the spring receiving part 71 is biased upward by the clamp spring 70 without interference by (from) the balls 47. Further, the balls 62, which are respectively held in the ball-holding holes 614 of the clamping shaft 60, are located above the engagement groove 431 of the spindle 4. These balls 62 partially protrude radially inward from the clamping shaft 60 and are engaged with (disposed in) the engagement groove 511 of the actuating shaft 50. Therefore, in this state, the clamping shaft 60 and the actuating shaft 50 are integrated (linked, coupled) to be movable together in the up-down direction.

As shown in FIGS. 11 and 12, the two pins 717 of the spring receiving part 71 respectively abut on the abutment surface of the hook-shaped actuating parts 743 of the left and right fixed links 74 from the inside of the actuating parts 743 and press the actuating parts 743 upward, owing to the biasing force of the clamp spring 70, whereby the force-amplifying mechanism 73 applies an upward biasing force to the pins 763 of the slider 76. As described above, the clamping shaft 60 is thereby biased upward owing to the upward biasing force that the slider 76 applies to the retaining ring 68 and is held in (at) a position (hereinafter referred to as a clamping position) in (at) which the clamping head 64 forcibly presses the tool accessory 91 against the lower surface of the tool mounting part 41 (specifically, against the lower surface of the protruding part 911) and clamps the tool accessory 91 in cooperation with the tool mounting part 41.

When the clamping shaft 60 is located in the clamping position, the pin 81 that is held by the spindle 4 is located substantially in the (at its) lowermost position within the guide holes 615 of the clamping shaft 60 and the guide hole 513 of the actuating shaft 50. Similarly, the pin 81 is also located substantially in the (at its) lowermost position within the guide holes 875 of the push-down sleeve 87. Further, as shown in FIG. 13, the pin 81 is located in the lower end parts 832 of the guide holes 831 of the rotary sleeve 83, and the rotary sleeve 83 is located in the offset position relative to the clamping shaft 60. Therefore, as described above, the clamping head 64 is connected to the shaft part 61 to be unremovable (undetachable) from the shaft part 61, and the lock ring 67 is pressed against the lower surface of the tool accessory 91 by the head mounting part 611. As shown in FIGS. 7 and 8, because the projection 663 of the pressing part 66 is disposed (inserted) inside the shaft part 61, an upper end surface of the projection 663 abuts on (against) a lower end surface of the actuating shaft 50.

The operation for removing (detaching) the tool accessory 91 from the tool mounting part 41 is now described.

Figure 16:
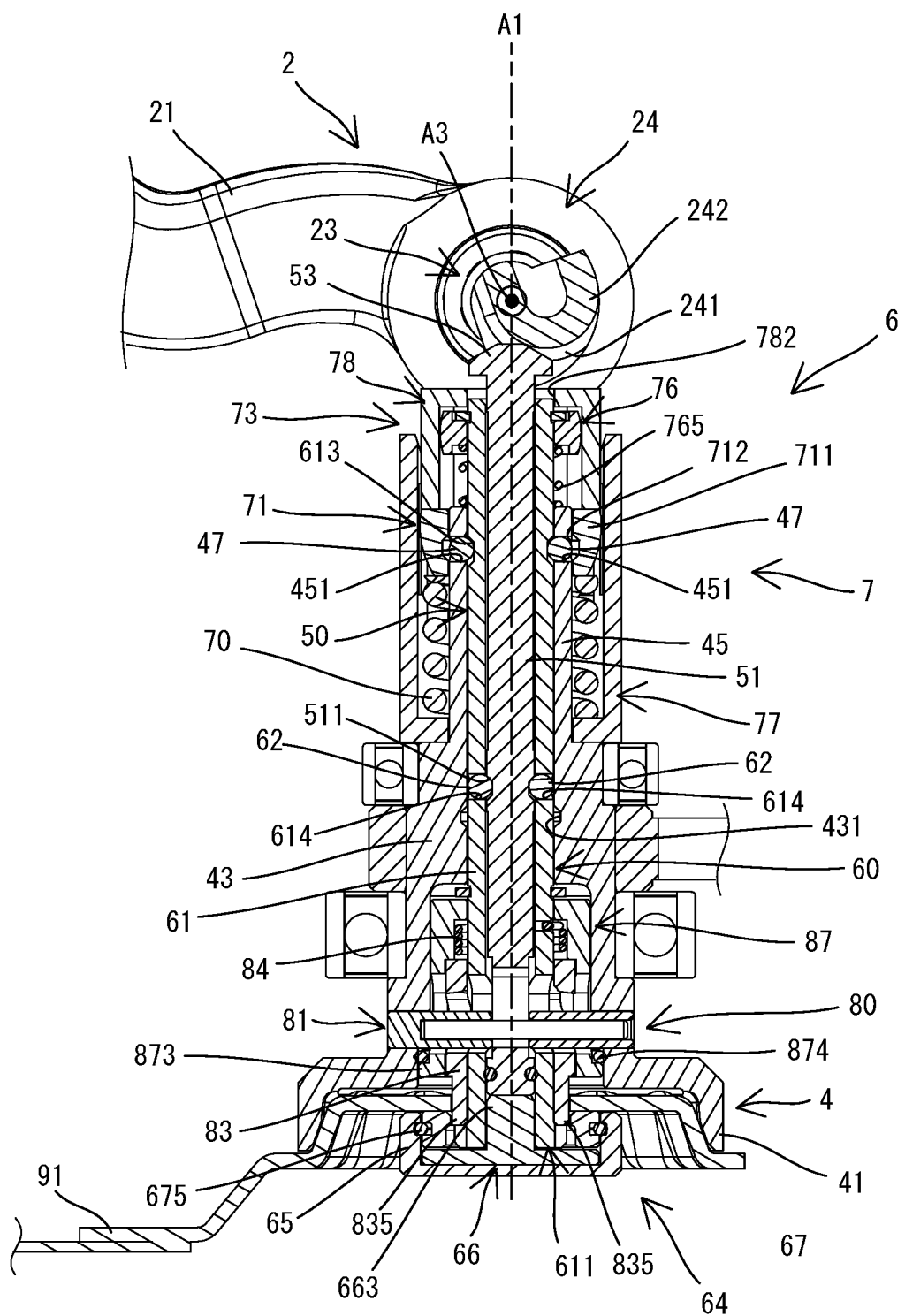
FIG. 16 is a sectional view corresponding to FIG. 8, for illustrating the state in which the biasing force that has been applied to the clamping shaft is released.
Figure 17:
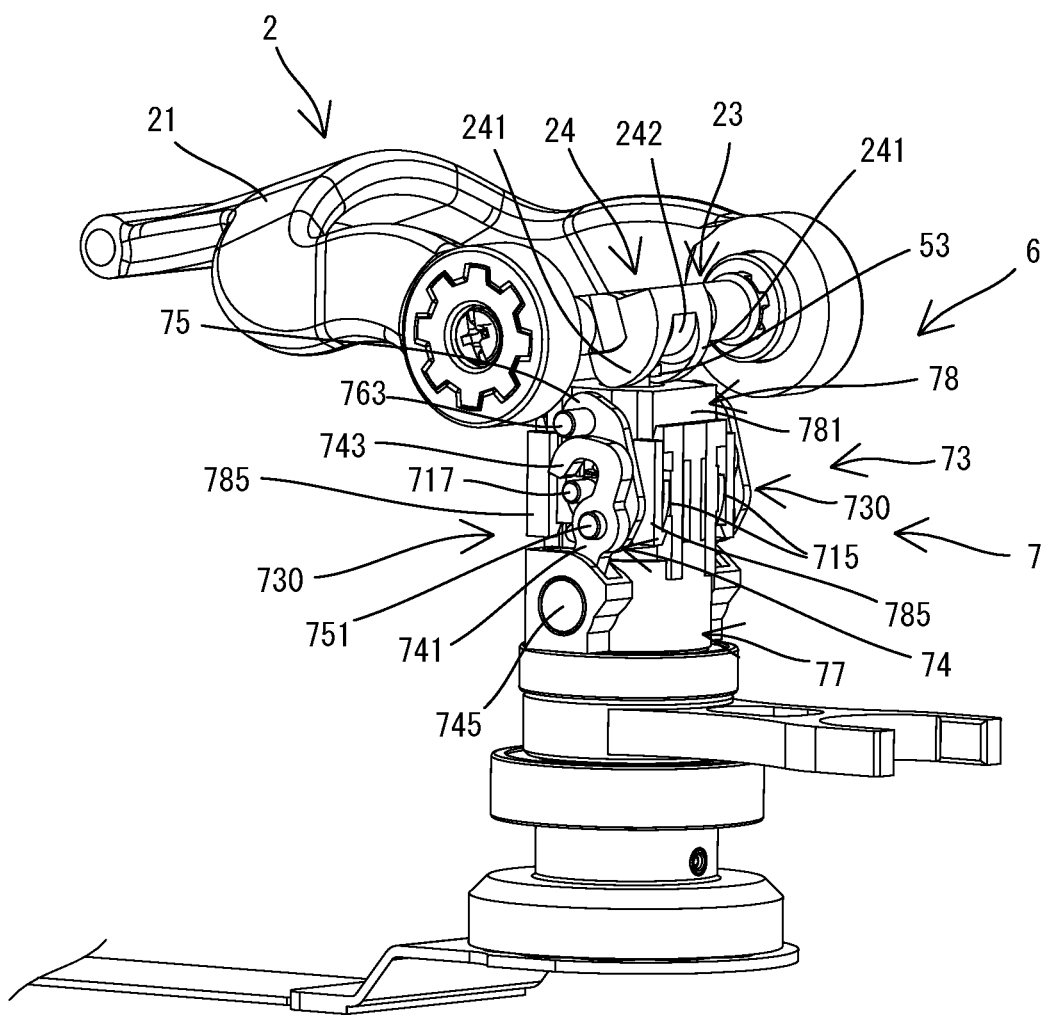
FIG. 17 is a perspective view corresponding to FIG. 11, for illustrating the state in which a biasing force that has been applied to a force-amplifying mechanism is released (interrupted).

In order to remove (detach) the tool accessory 91, the user performs the unclamping operation on the manipulation part 21 (i.e. the user manually pivots the lever 2 in the unclamping direction towards its upper pivoted position (see e.g., FIGS. 16-17) in which the handle portion of the lever 2 is moved upwardly away from the front end of the oscillating multi-tool 2). During the initial phase of the unclamping operation, the first cams 241 of the lever 2 abut on an upper surface of the cover member 78 and press the cover member 78 to thereby start pushing down the cover member 78 and the spring receiving part 71 (which are integrally connected together so that they move together). Thus, because the lever 2 starts to receive (absorb) the biasing force of the clamp spring 70, the biasing force that is transmitted to the clamping shaft 60 via the pins 717 of the spring receiving part 71 and the force-amplifying mechanism 73 decreases as the spring receiving part 71 moves downward. During this initial phase of the unclamping operation, the second cam 242 has not yet begun to abut on the abutment part 53 of the actuating shaft 50. Furthermore, the clamping shaft 60 remains engaged with the spindle 4 via the balls 47 and does not move downward. The slider 76 is held in (at) the position in (at) which the slider 76 abuts on the retaining ring 68, which is fixed around (at) the upper end portion of the shaft part 61, owing to the biasing force of the biasing spring 765. Therefore, even though the pins 717 of the spring receiving part 71 move downward relative to the fixed link 74 (and thus relative to the support member 77), the positions of the pins 751 in the up-down direction do not change, and the fixed links 74 and the movable links 75 remain held substantially in the same attitudes (postures) as can be seen, e.g., by comparing FIG. 12 (the lever 2 is in its initial position) and FIG. 18 (the lever 2 is pivoted upward such that the first cams 241 press down the cover member 78 but the second cam 242 does not yet abut the actuating shaft 50).

Figure 18:
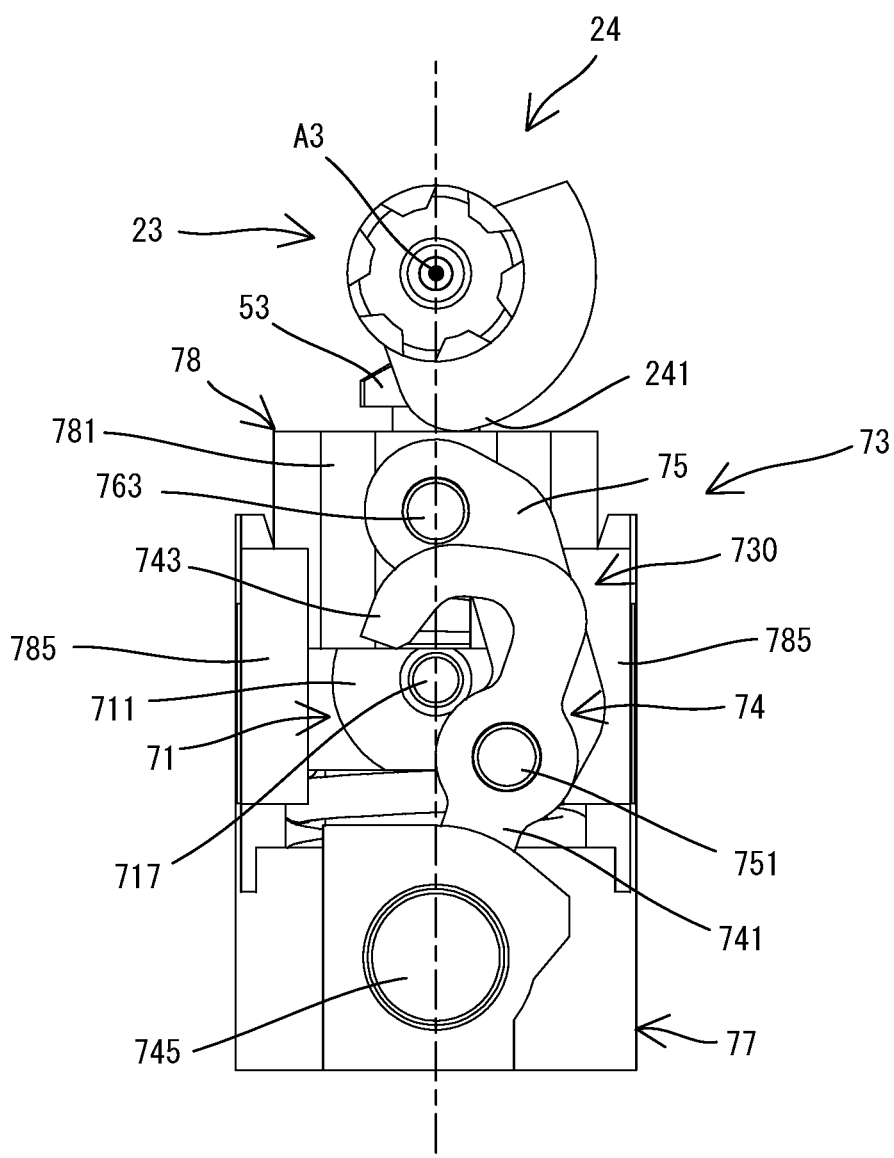
FIG. 18 is a side view corresponding to FIG. 12, for illustrating the state in which the biasing force that has been applied to the force-amplifying mechanism is released.

Thus, as shown in FIGS. 15 to 18, as the lever 2 is being pivoted during the initial phase of the unclamping operation, the cover member 78 and the spring receiving part 71 are pushed down (relative to the spindle 4) by the first cams 241 to a position in (at) which the engagement groove 712 of the spring receiving part 71 faces (opposes) the ball-holding holes 451 of the spindle 4 (see FIG. 16) and in (at) which the pins 717 of the spring receiving part 71 move away (separate) from the respective actuating parts 743 of the fixed links 74 (see FIG. 18). As a result, the force that has been applied to the fixed links 74 via the pins 717 is released (interrupted), and thus transmission of the upward biasing force to the clamping shaft 60 via the force-amplifying mechanism 73 is interrupted. Further, the balls 47 are now allowed to disengage from (move out of) the engagement groove 613 of the clamping shaft 60 and to partially move into the engagement groove 712 of the spring receiving part 71.

Figure 20:
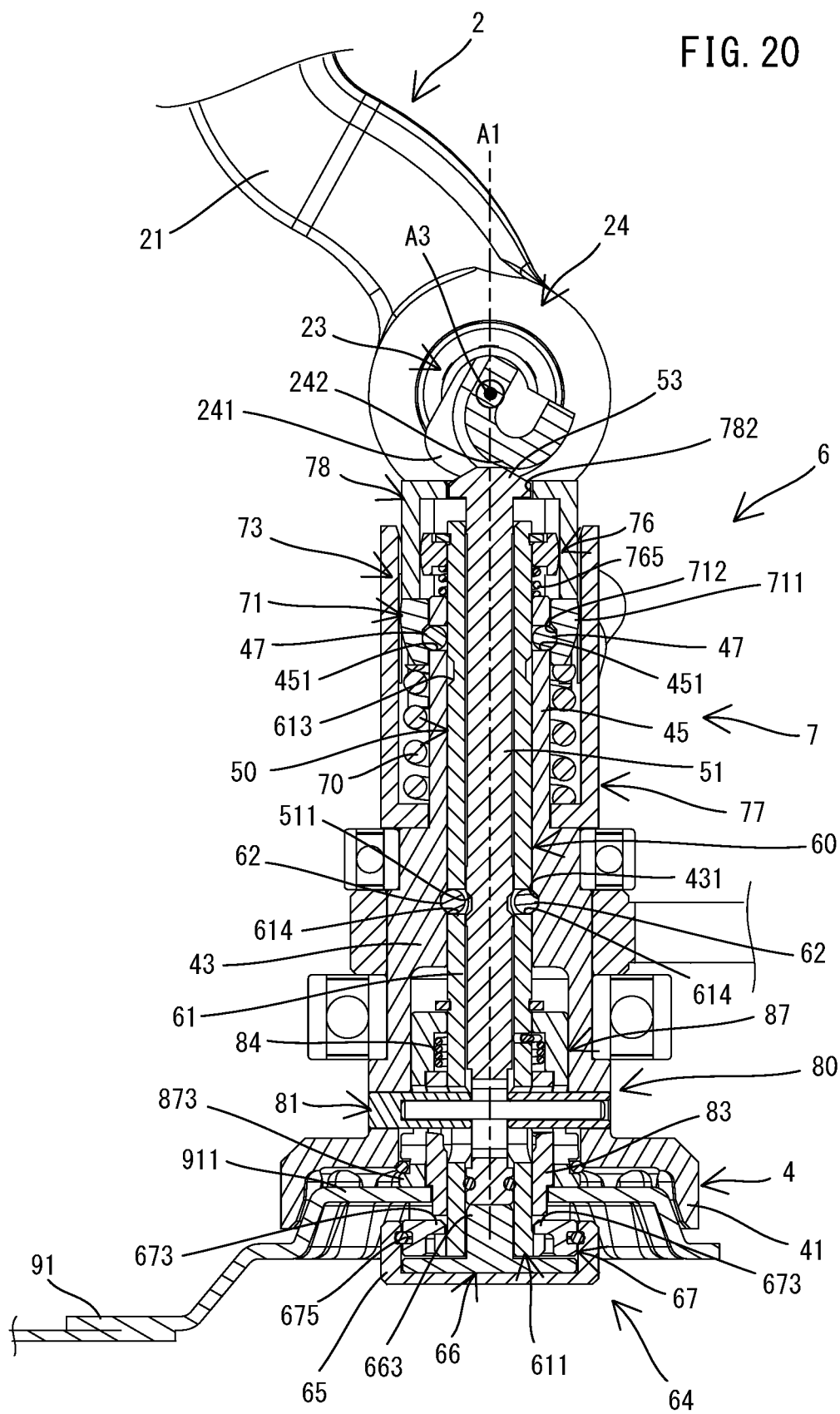
FIG. 20 is a sectional view corresponding to FIG. 8, for illustrating the state in which the tool accessory is being pushed down.

Substantially at the same time when the engagement groove 712 faces (opposes) the ball-holding holes 451, the second cam 242 begins to abut on and press the abutment part 53 of the actuating shaft 50 to thereby start pushing down the actuating shaft 50. Therefore, the clamping shaft 60, which is connected to the actuating shaft 50 via the balls 62 (see FIG. 16), starts to move downward together with the actuating shaft 50. In this embodiment, the engagement groove 613 defined on the clamping shaft 60 has a trapezoidal cross-section. Therefore, when the clamping shaft 60 starts to move downward, the balls 47 are pushed radially outward and promptly engage with (move into) the engagement groove 712 of the spring receiving part 71, and an outer peripheral surface of the shaft part 61 abuts on and prevents the balls 47 from moving radially inward, as can be seen in FIG. 20. Thus, the spring receiving part 71 becomes locked (linked, integrally coupled) to the spindle 4 via the balls 47. The position in (at) which the spring receiving part 71 is enabled to be locked to the spindle 4 (i.e. the position in (at) which the engagement groove 712 faces the ball-holding holes 451) in the up-down direction is hereinafter referred to as a locked position. The first cams 241 are configured (shaped) to not to push down the cover member 78 and the spring receiving part 71 any farther after the spring receiving part 71 reaches the locked position, even if the lever 2 is further pivoted.

As the actuating shaft 50 and the clamping shaft 60 move together downward (owing to the second cam 242 pressing down the abutment part 53), the rotary sleeve 83 moves downward while rotating (pivoting) from the offset position (see FIG. 13) toward the alignment position (see FIG. 14) as described above. In response to this movement of the rotary sleeve 83, the clamping head 64 rotates (pivots) from the locking position (see FIG. 10) toward the unlocking position (see FIG. 9).

Figure 19:
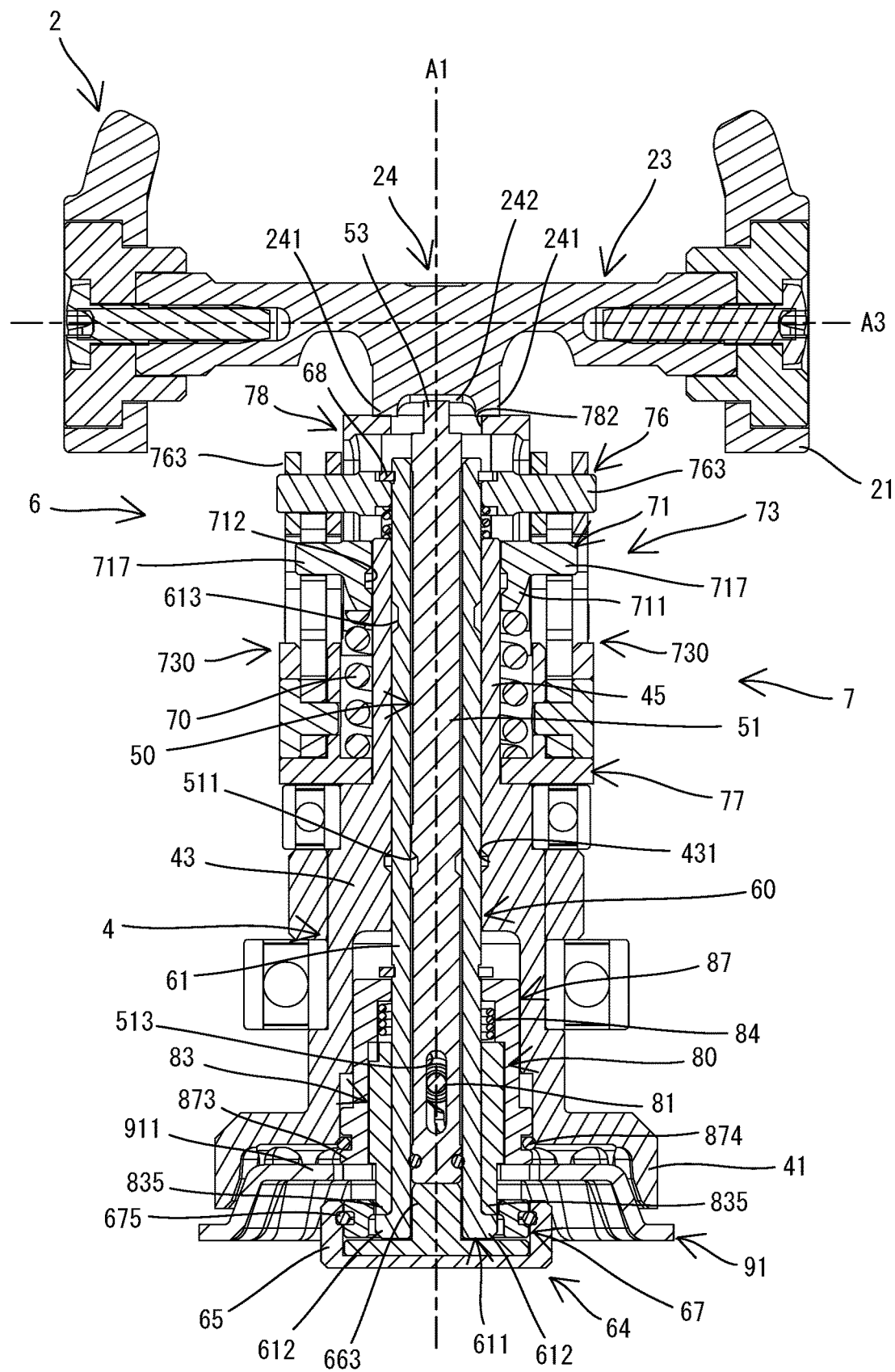
FIG. 19 is a sectional view corresponding to FIG. 7, for illustrating the state in which a tool accessory is being pushed down.

The push-down sleeve 87 also moves downward together with the clamping shaft 60 and the rotary sleeve 83 to separate the tool accessary 91 from the tool mounting part 41. More specifically, it is noted that, during operation (i.e. while the tool accessory 91 is being pivotally oscillated) the tool accessory 91 is pressed firmly (clamped strongly) against the tool mounting part 41 from below by the clamping head 64 with the inclined surface 913 in abutment with the inclined surface 413 (see FIG. 4). Therefore, it is possible that the tool accessory 91 will be caused to stick (adhere) to the tool mounting part 41 due to the upward pressure applied to the tool accessory 91. However, owing to this aspect of the present teachings, even if the tool accessory 91 were to stick to the tool mounting part 41, when the push-down sleeve 87 is moved downward as shown in FIGS. 19 and 20, the flange part 873 of the push-down sleeve 87 will abut on the tool accessory 91 from above and push the tool accessory 91 downward relative to the tool mounting part 41, thereby forcibly separating the tool accessory 91 from the tool mounting part 41 and eliminating (breaking) any sticking (adhesion) of the tool accessory 91 to the tool mounting part 41. In this embodiment, a lower end surface of the flange part 873 comes into contact (e.g., plane/surface contact and/or annular contact) with the upper surface of the tool accessory 91 around the clamping shaft 60 and pushes down the tool accessory 91 in an evenly-balanced (annular) manner, so that any sticking of the tool accessory 91 to the tool mounting part 41 can be reliably broken.

Figure 21:
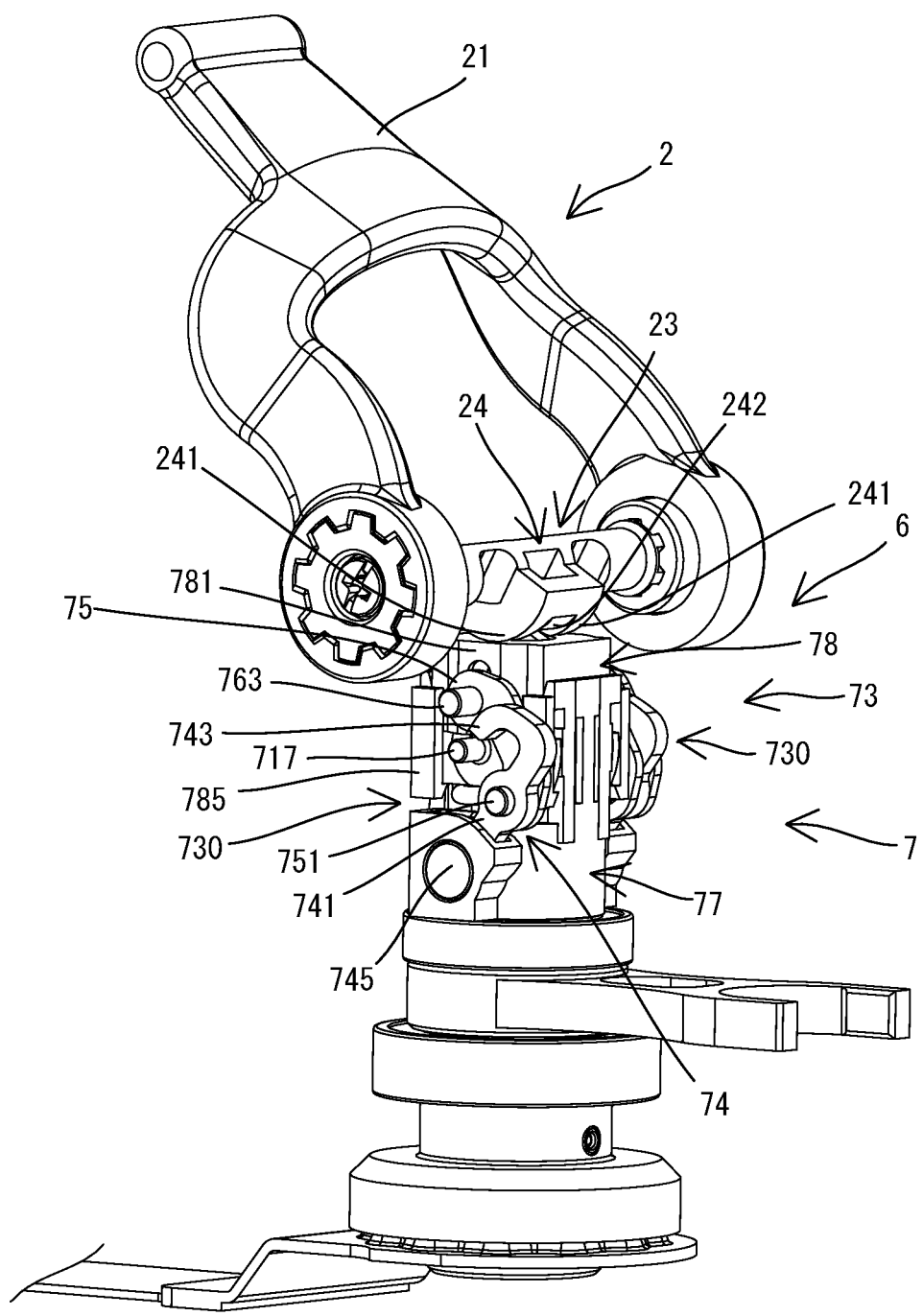
FIG. 21 is a perspective view corresponding to FIG. 11, for illustrating the state in which the tool accessory is being pushed down.
Figure 22:
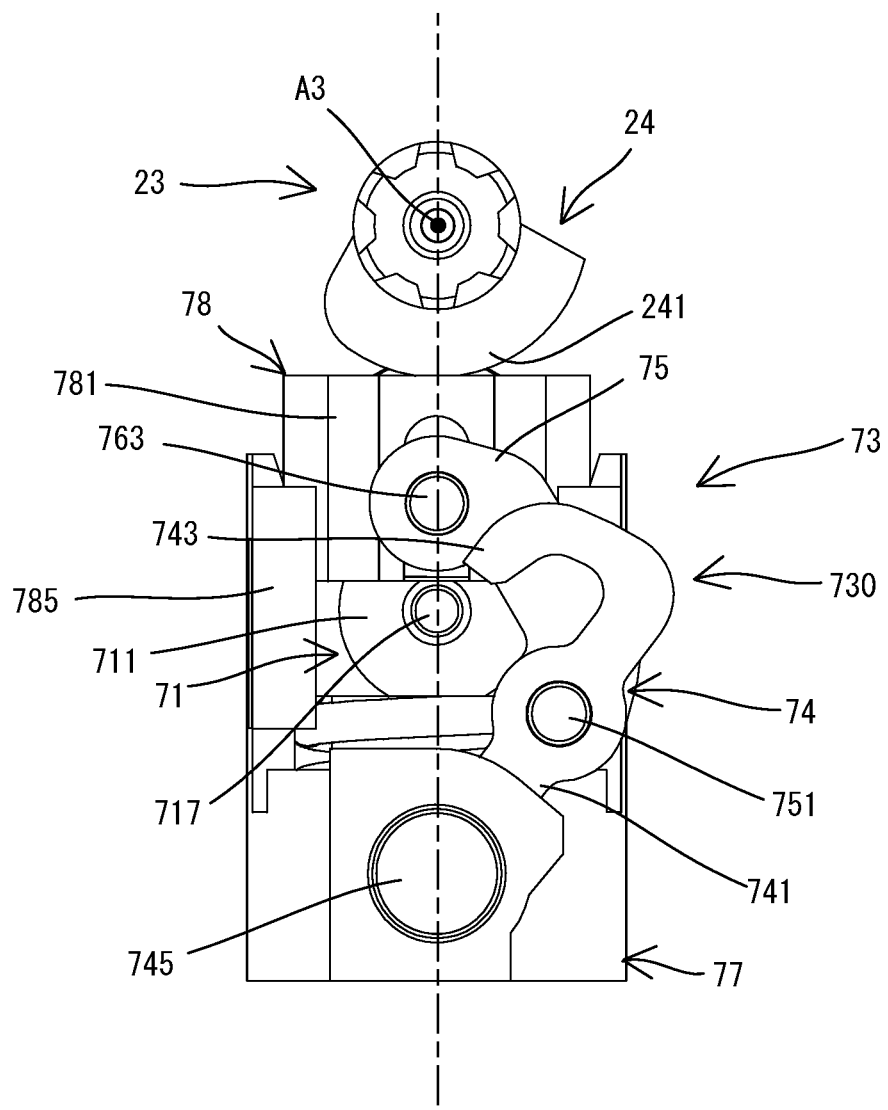
FIG. 22 is a side view corresponding to FIG. 12, for illustrating the state in which the tool accessory is being pushed down.

At the same time (or substantially the same time), the downward movement of the clamping shaft 60 causes the slider 76 to also move downward together with the clamping shaft 60 (owing to the the retaining ring 68, which is affixed to the clamping shaft 60, pressing down the slider 76), thereby compressing the biasing spring 765. In response to the downward movement of the slider 76, the pins 763, which are connected to the movable links 75 of the left and right link mechanisms 730, also move downward. As was noted above, the lower ends of the fixed links 74 are pivotally connected to the support member 77, which is not movable in the up-down direction, via the pins 745. As a result, as shown in FIGS. 21 and 22, the relative positions of the fixed link 74 and the movable links 75 in each link mechanism 730 change, such that the fixed link 74 and the movable links 75 become arranged at an angle that is more sharply bent at the pin 751 (i.e. such that the fixed link 74 and the movable links 75 form a less obtuse angle with respect to the vertex (i.e. the pin 751)).

Figure 24:
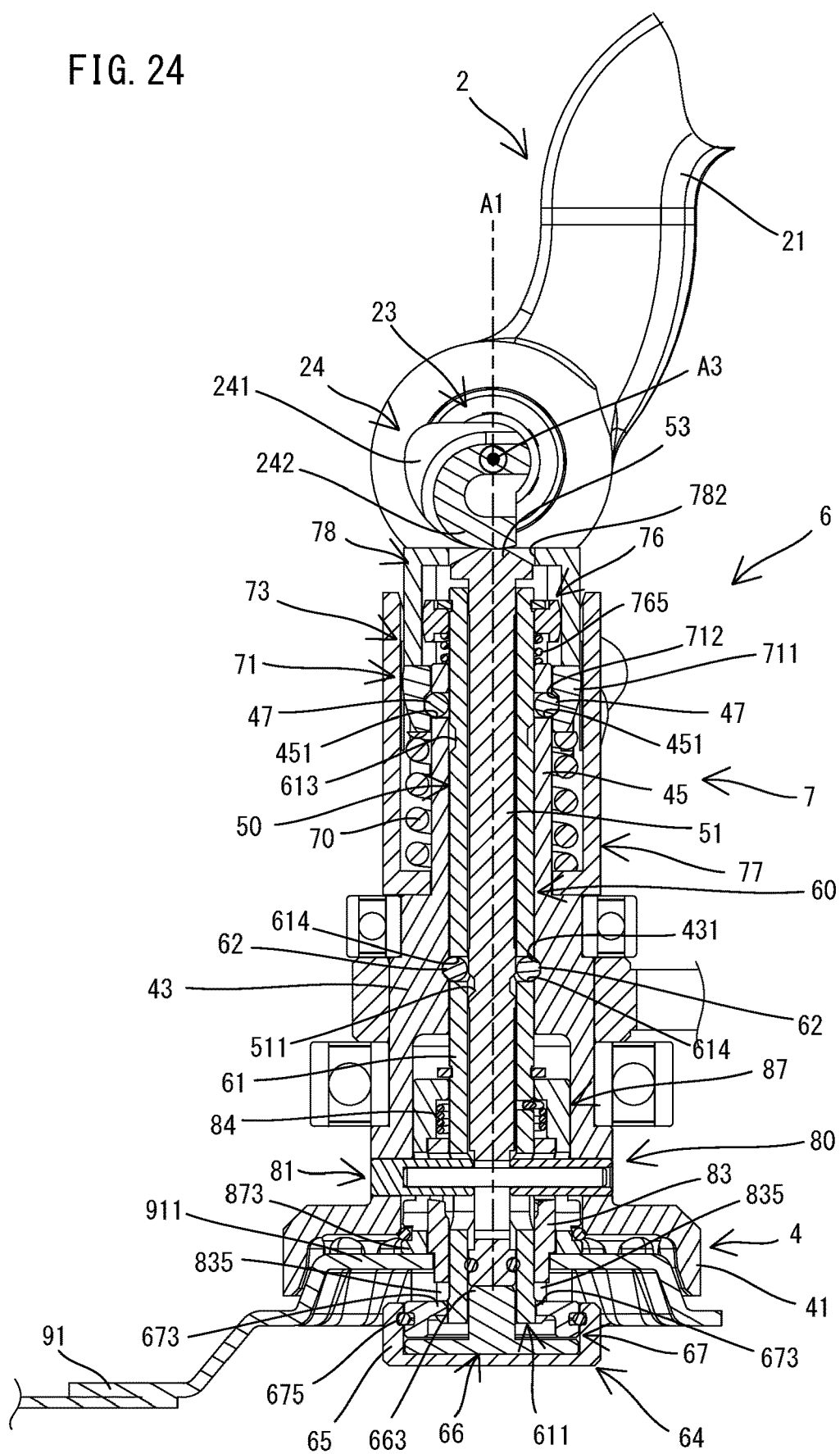
FIG. 24 is a sectional view corresponding to FIG. 8, for illustrating the state in which the clamping head is being pushed down.

As shown in FIGS. 19 and 20, when the actuating shaft 50 and the clamping shaft 60 are pushed down by the second cam 242 to a position in (at) which the ball-holding holes 614 face (oppose) the engagement groove 431, the balls 62 are now allowed to disengage from (move out of) the engagement groove 511 of the actuating shaft 50 and to partially move into the engagement groove 431 of the spindle 4. In other words, the actuating shaft 50 is enabled to disengage (de-couple, unlock) from the clamping shaft 60 and to move downward independently from the clamping shaft 60. In this embodiment, like the engagement groove 613, the engagement groove 511 also has a trapezoidal cross-section. Therefore, when the actuating shaft 50 further moves downward from this position, the balls 62 are pushed radially outward and promptly engage with (move into) the engagement groove 431, and an outer peripheral surface of the actuating shaft 50 abuts on and prevents the balls 62 from moving radially inward, as can be seen in FIG. 24. Thus, the clamping shaft 60 becomes locked to the spindle 4 via the balls 62.

Further, substantially at the same time when the engagement groove 431 faces the ball-holding holes 614, as shown in FIG. 14, the rotary sleeve 83 is placed in the alignment position relative to the clamping shaft 60. Thus, as described above, the lock ring 67 is placed in the unlocking position (see FIG. 9) and thus becomes removable (detachable, disconnectable) from the head mounting part 611 of the clamping head 64.

Figure 23:
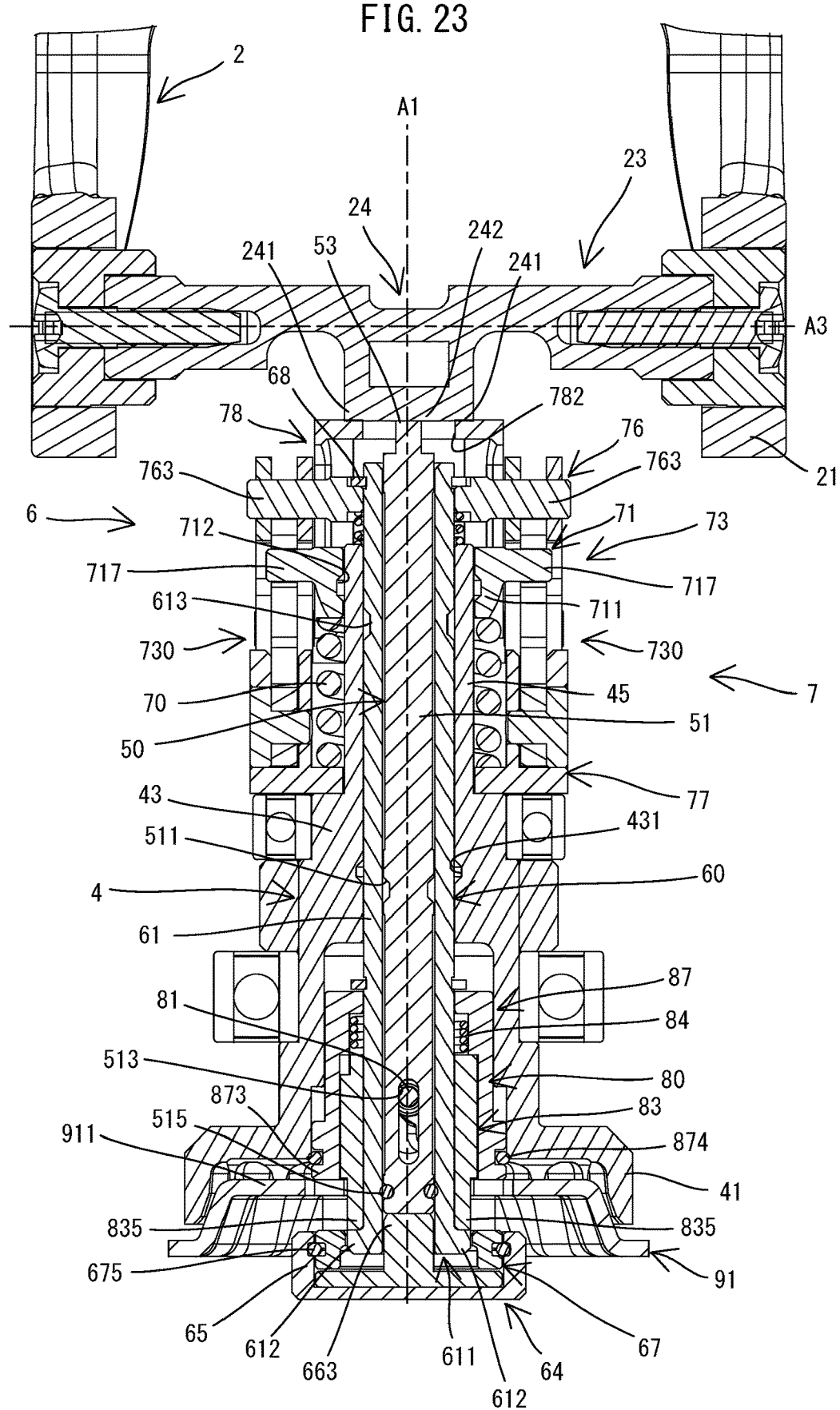
FIG. 23 is a sectional view corresponding to FIG. 7, for illustrating the state in which a clamping head is being pushed down.

As shown in FIGS. 23 and 24, when the lever 2 is pivoted in the unclamping direction up to the upward maximum limit in this state, only the actuating shaft 50 is pushed down to the (its) lowermost position, in (at) which the pin 81 is disposed in the upper end portions of the guide holes 513. Because the clamping head 64 is already in the unlocking position as described above, the actuating shaft 50 can cause the clamping head 64 to separate from the shaft part 61 by moving downward with the lower end surface of the actuating shaft 50 in abutment with the upper end surface of the projection 663 of the clamping head 64. Further, after the tool accessory 91 has been separated from the tool mounting part 41 and pushed downward by the push-down sleeve 87, the tool accessory 91 will also slip off (fall off) the shaft part 61 together with the clamping head 64 due to its own weight.

In this final phase of the unclamping operation, the slider 76 is held in the same position in the up-down direction together with the clamping shaft 60, while only the actuating shaft 50 moves downward. Therefore, during this time, the positions of the fixed link 74 and the movable links 75 in each link mechanism 730 remain the same as the positions shown in FIGS. 21 and 22.

Thus, the operation for removing (detaching) the tool accessory 91 can be completed in accordance with the above-described procedures.

The operation for attaching (mounting) the tool accessory 91 is now described.

Figure 25:
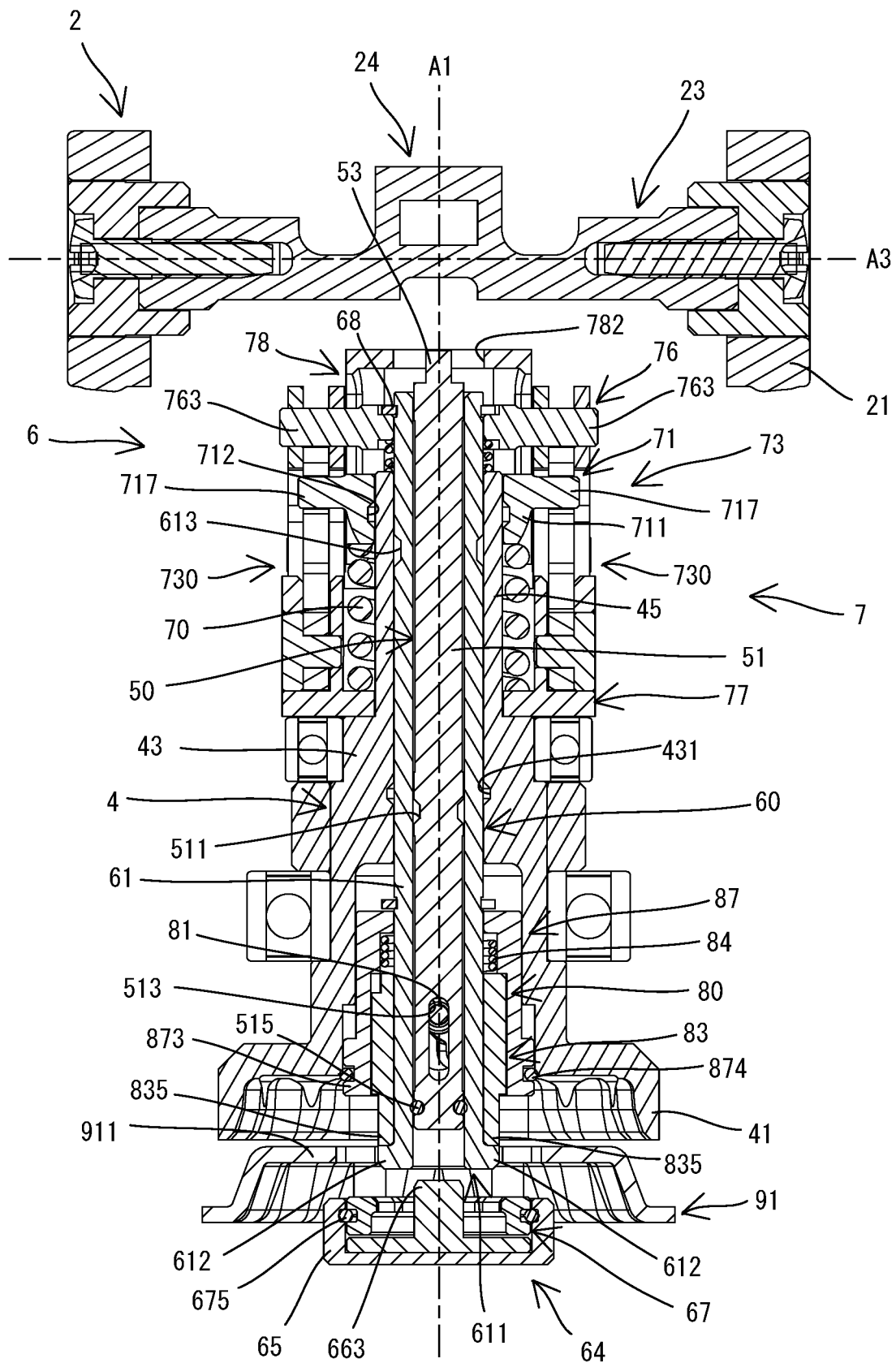
FIG. 25 is a sectional view corresponding to FIG. 7, for illustrating the state in which the clamping head is not yet attached.
Figure 26:
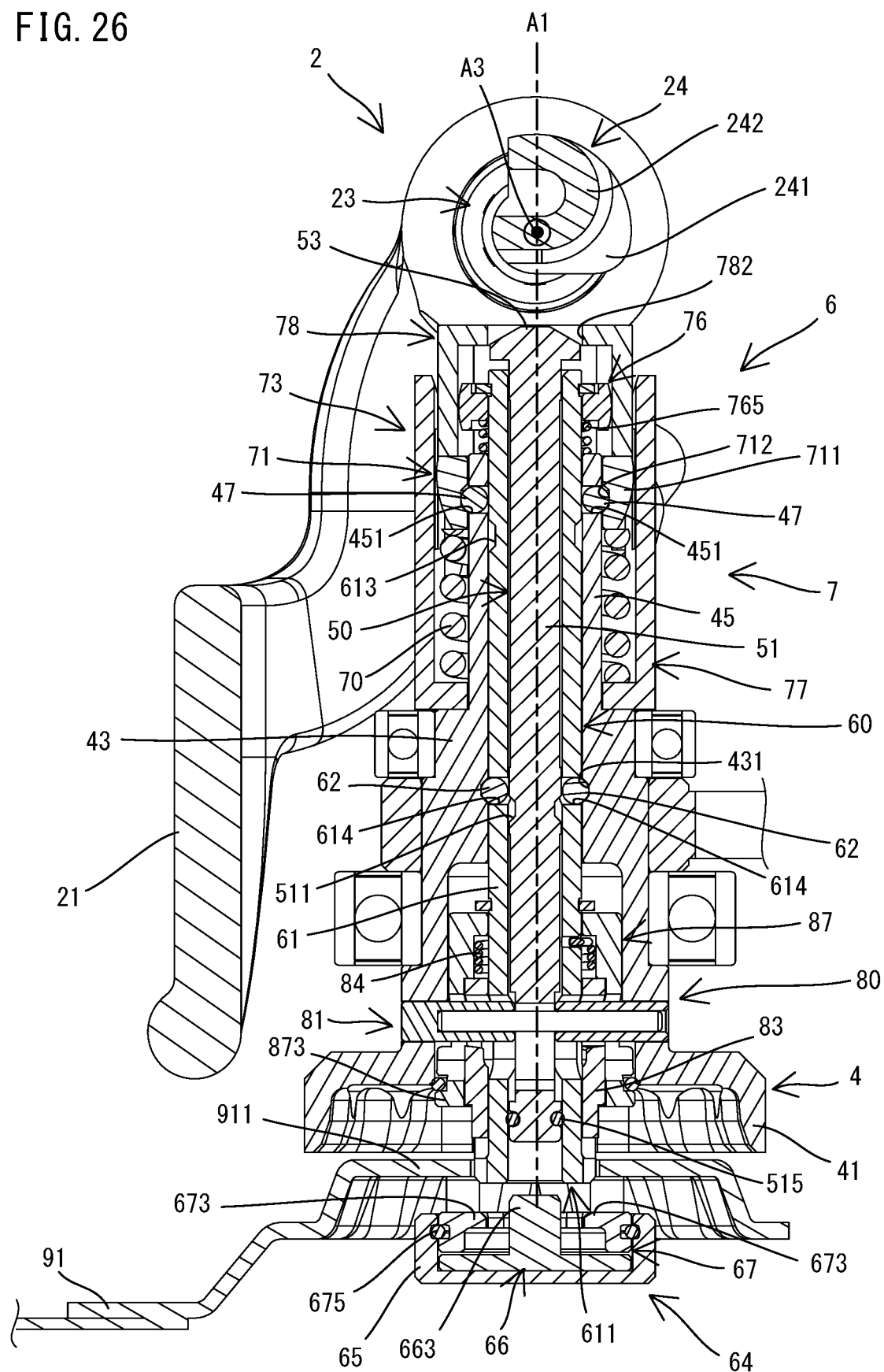
FIG. 26 is a sectional view corresponding to FIG. 8, for illustrating the state in which the clamping head is not yet attached.

As described above, in this embodiment, when the spring receiving part 71 is locked (linked, integrally coupled) to the spindle 4 in the locked position, the force-amplifying mechanism 73 does not transmit an upward force to the slider 76 even if the pressing force of the first cams 241 is released. Therefore, in this state (i.e. the spring receiving part 71 is locked to the spindle 4), the biasing force originating from the clamp spring 70 is not applied to the clamping shaft 60. Therefore, after removing (detaching) the tool accessory 91 as described above, the user can return the lever 2 to the (its) initial position as shown in FIGS. 25 and 26 and attach the tool accessory 91. In this state, the clamping shaft 60 remains locked (linked, integrally coupled) to the spindle 4 via the balls 62, and the actuating shaft 50 is held in the (at its) lowermost position by the frictional force of the elastic member 515.

To attach another tool accessory 91, the user first inserts the head mounting part 611 and the lower end portion of the rotary sleeve 83, which is in the alignment position, through the through hole of the protruding part 911 of the tool accessory 91. At this time, it is possible that the user might inadvertently press the head mounting part 611 or the push-down sleeve 87 upward with the tool accessory 91. However, even in such a situation, the clamping shaft 60 is prevented from moving upward because the clamping shaft 60 is (remains) locked to the spindle 4 as described above.

The user then places the clamping head 64 under the tool accessory 91 and inserts the projection 663 into the shaft part 61 from below. In this embodiment, a peripheral edge of a lower end surface of the head mounting part 611 and a peripheral edge of the lock hole 671 on the upper surface of the lock ring 67 have respective inclined (oblique) surfaces. Therefore, even if the lock ring 67 is not accurately placed in the unlocking position (see FIG. 9) relative to the head mounting part 611, when pressed by the projections 612, the lock ring 67 will rotate (pivot) relative to the case 65 owing to the interaction of these inclined surfaces and thus will be automatically placed in the unlocking position. Thus, the user does not need to accurately position the lock ring 67 relative to the head mounting part 611 at this time.

When the user pushes up the clamping head 64, the actuating shaft 50 is pressed by the projection 663 and moves upward from the (its) lowermost position relative to the clamping shaft 60 and the spindle 4. During this time, because the slider 76 is held in the same position in the up-down direction together with the clamping shaft 60, the positions of the fixed link 74 and the movable links 75 in each link mechanism 730 remain the same as shown in FIGS. 21 and 22, i.e. the biasing force from the clamp spring 70 is still not applied (transmitted) to the slider 76.

Figure 27:
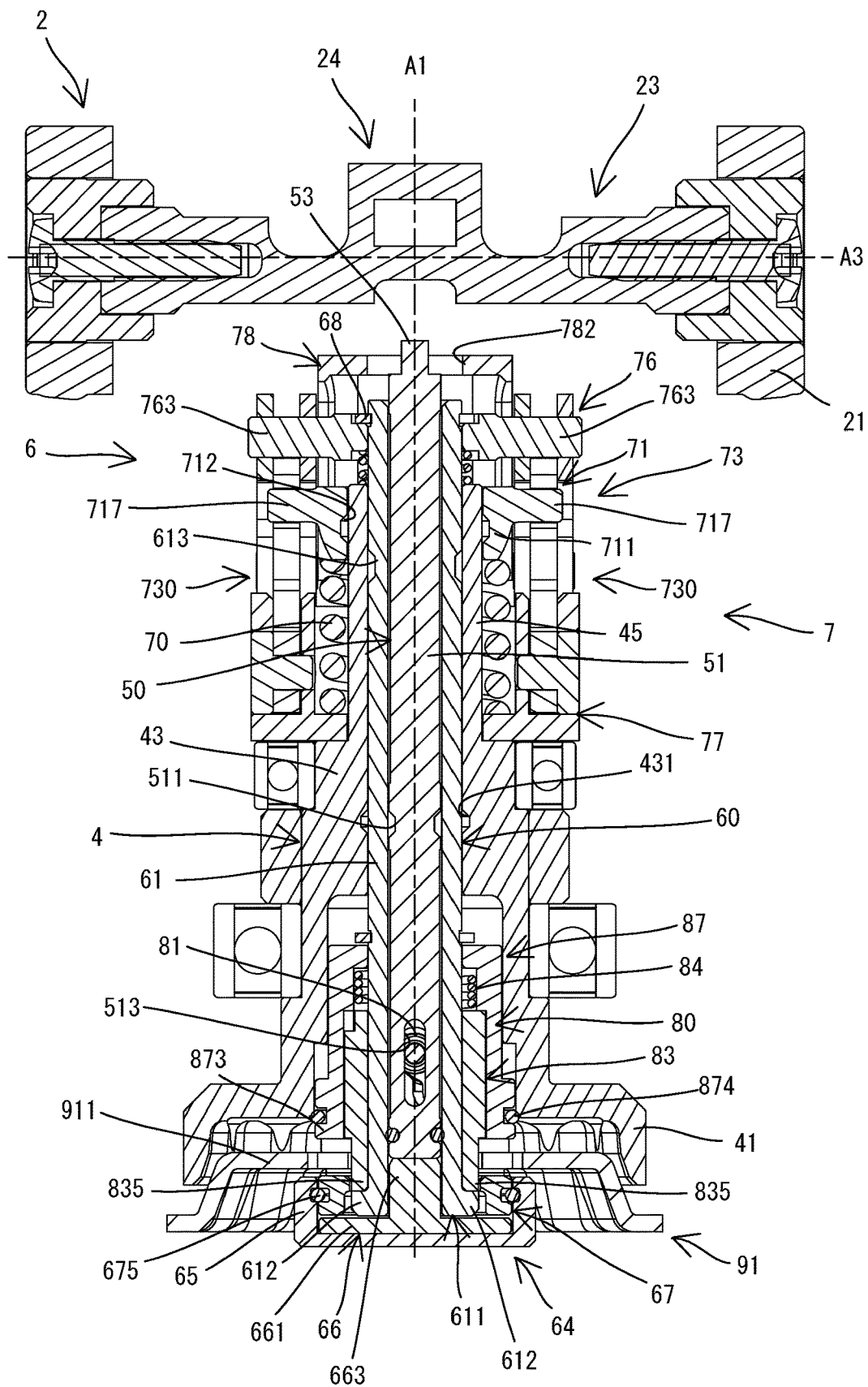
FIG. 27 is a sectional view corresponding to FIG. 7, for illustrating the state in which the clamping shaft is made movable relative to the spindle.
Figure 28:
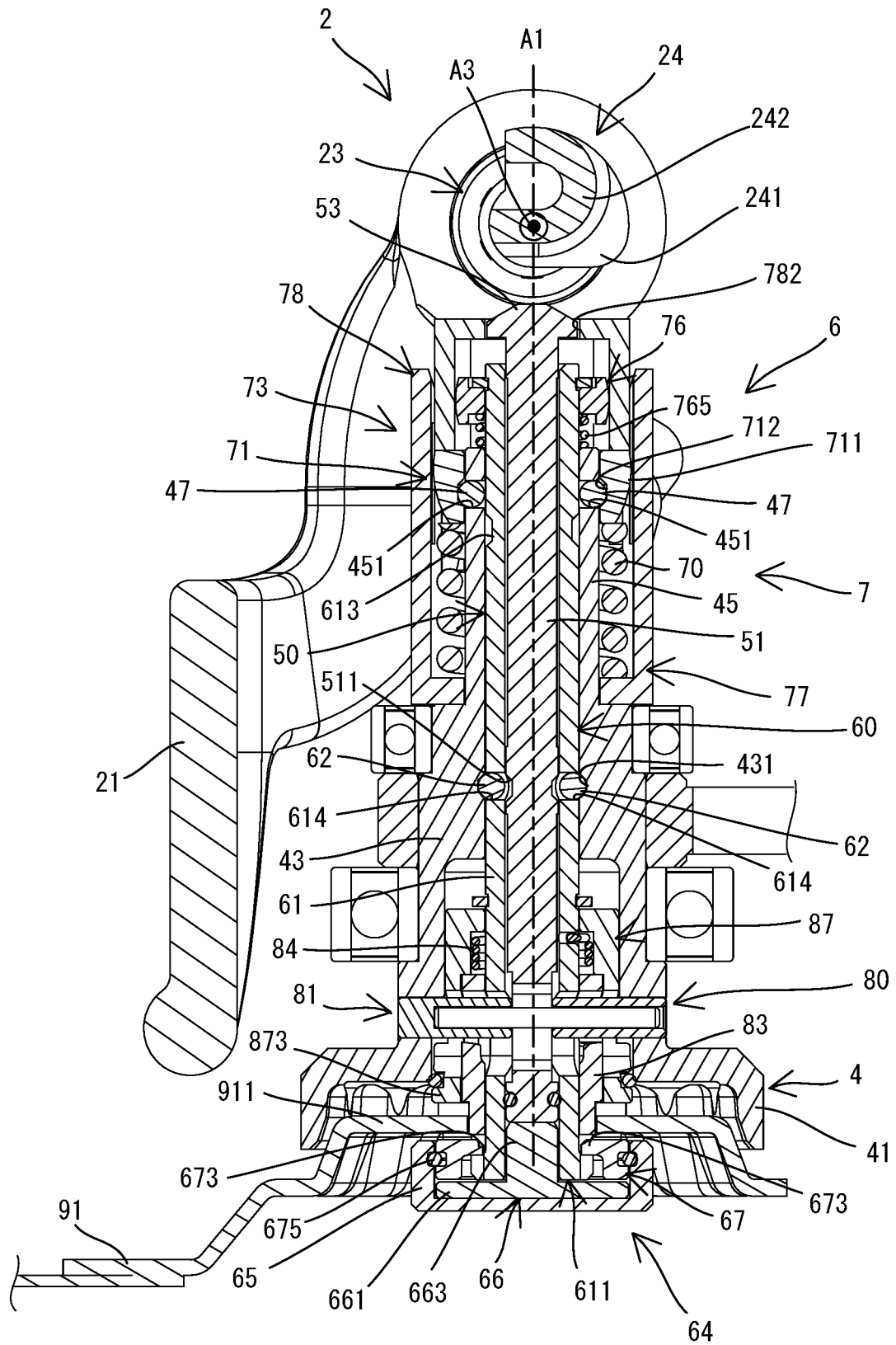
FIG. 28 is a sectional view corresponding to FIG. 8, for illustrating the state in which the clamping shaft is made movable relative to the spindle.

As shown in FIGS. 27 and 28, when the clamping head 64 and the actuating shaft 50 are pushed up to a position in (at) which the head mounting part 611 of the clamping shaft 60 abuts on the upper surface of the base plate 661 of the pressing part 66, the engagement groove 511 of the actuating shaft 50 faces the ball-holding holes 614 of the clamping shaft 60. Thus, the balls 62 are now allowed to disengage from (move out of) the engagement groove 431 of the spindle 4 and to partially move into the engagement groove 511 of the actuating shaft 50. In other words, the clamping shaft 60 can disengage (unlock) from the spindle 4 and engage with (become locked to) the actuating shaft 50. In this embodiment, the engagement groove 431 also has a trapezoidal cross-section. Therefore, when the actuating shaft 50 and the clamping shaft 60 are pushed up while they are respectively in abutment with the projection 663 and the base plate 661, the balls 62 are pushed radially inward and promptly engage with (move into) the engagement groove 511 of the actuating shaft 50. Thus, the actuating shaft 50 and the clamping shaft 60 move upward while being engaged (linked, integrally coupled) with each other via the balls 62.

As the actuating shaft 50 and the clamping shaft 60 move upward, the rotary sleeve 83 moves upward while rotating (pivoting) from the alignment position (see FIG. 14) toward the offset position (see FIG. 13). Along with this movement of the rotary sleeve 83, the clamping head 64 rotates (pivots) from the unlocking position (see FIG. 9) toward the locking position (see FIG. 10). The push-down sleeve 87 also moves upward together with the clamping shaft 60 and the rotary sleeve 83.

Figure 29:
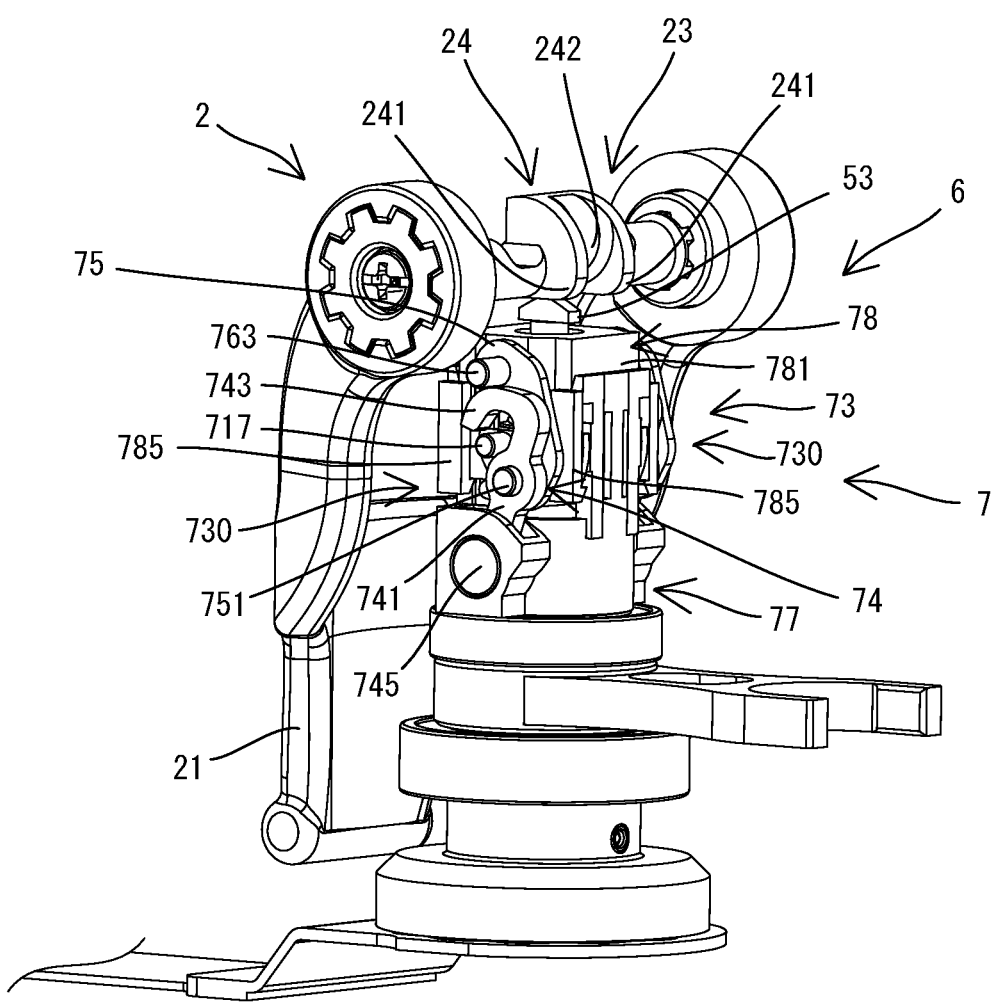
FIG. 29 is a perspective view corresponding to FIG. 11, for illustrating the state of the force-amplifying mechanism immediately before it is actuated.
Figure 30:
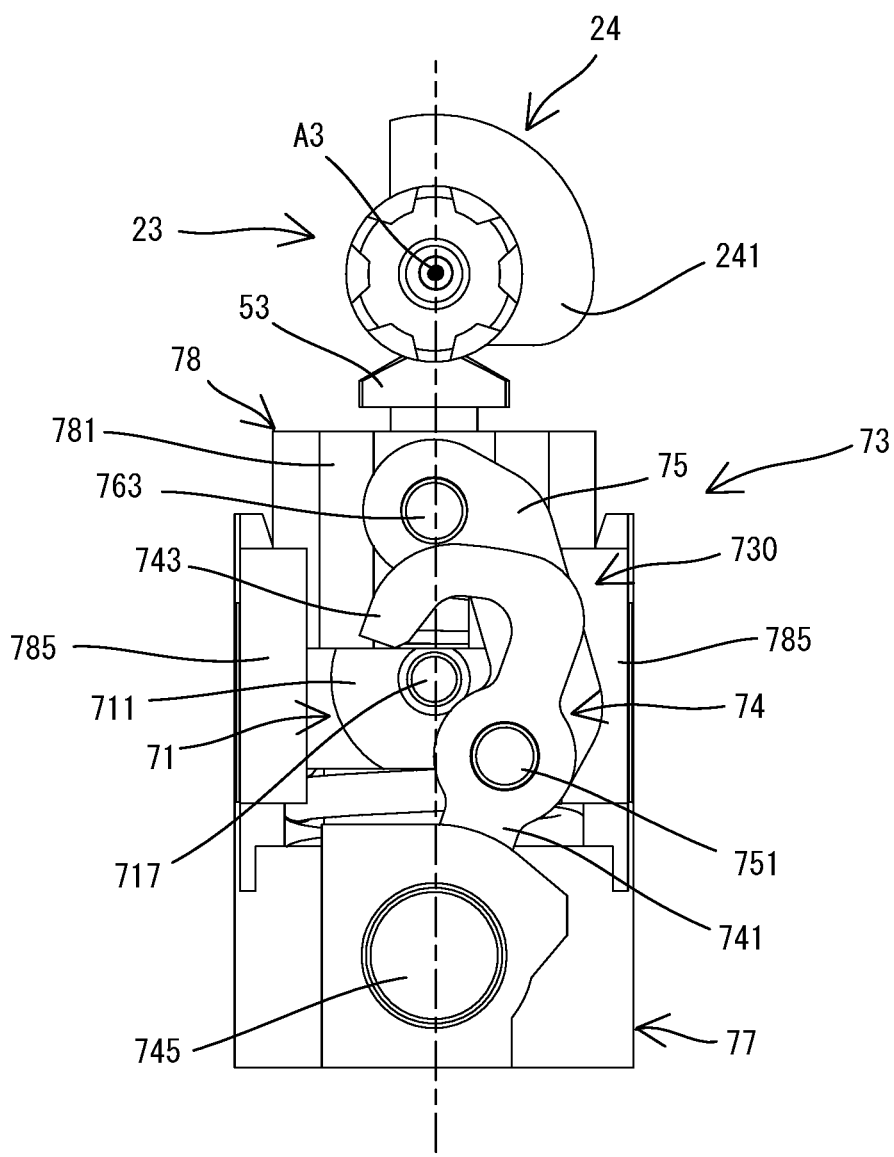
FIG. 30 is a side view corresponding to FIG. 12, for illustrating the state of the force-amplifying mechanism immediately before it is actuated.

At the same time or substantially the same time, the slider 76 is moved upward together with the clamping shaft 60 owing to the biasing force of the biasing spring 765. Therefore, the pins 763, which are connected to the movable links 75 of the left and right link mechanisms 730, also move upward. As a result, as shown in FIGS. 29 and 30, the fixed link 74 and the movable links 75 move closer to their respective relative positions in (at) which the fixed link 74 and the movable links 75 form a larger obtuse angle, as shown in FIG. 18. As each of the fixed links 74 pivots, its actuating part 743 moves toward the pin 717 of the spring receiving part 71.

Figure 31:
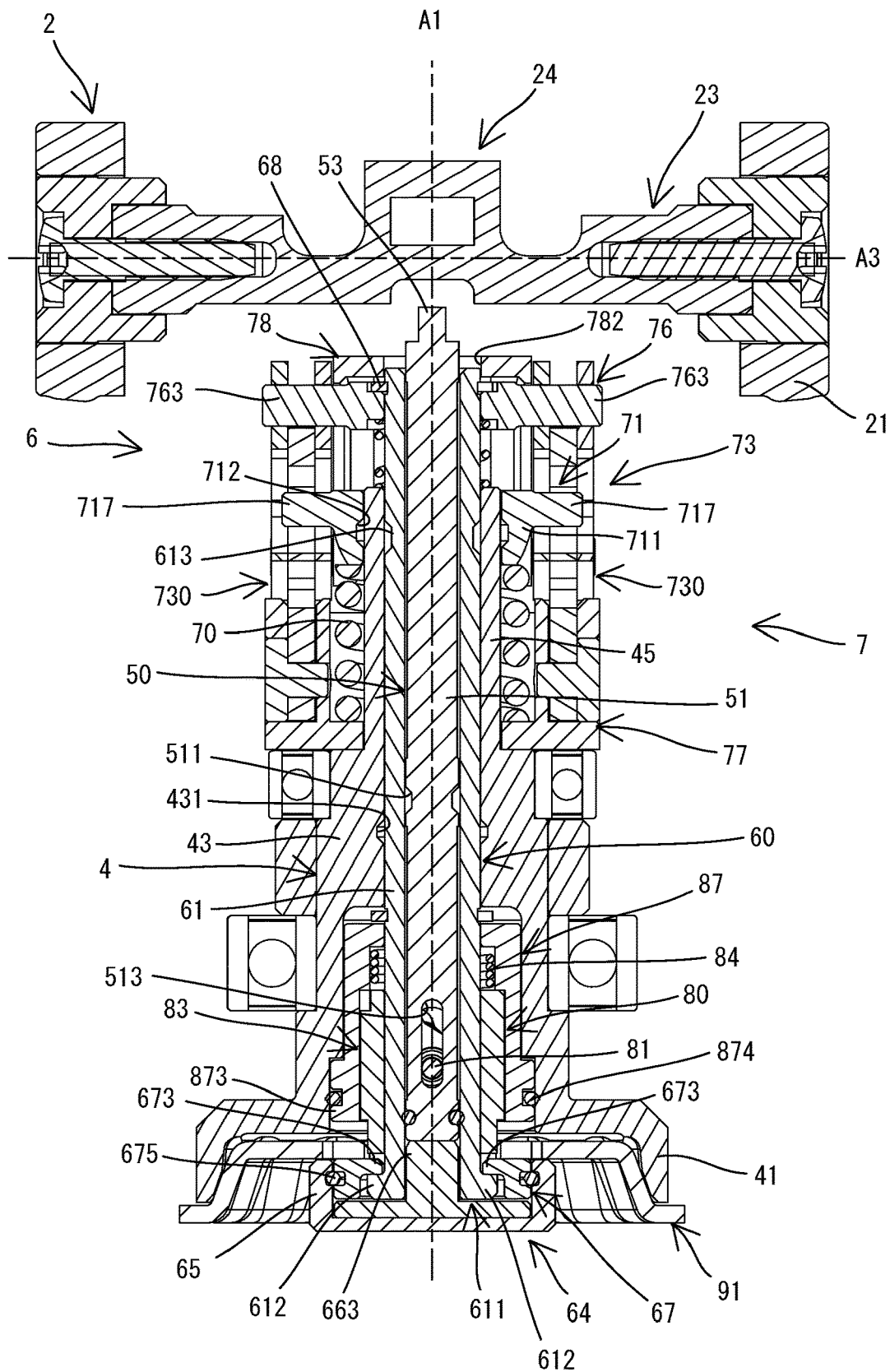
FIG. 31 is a sectional view corresponding to FIG. 7, for illustrating the clamping mechanism immediately before the force-amplifying mechanism is actuated.
Figure 32:
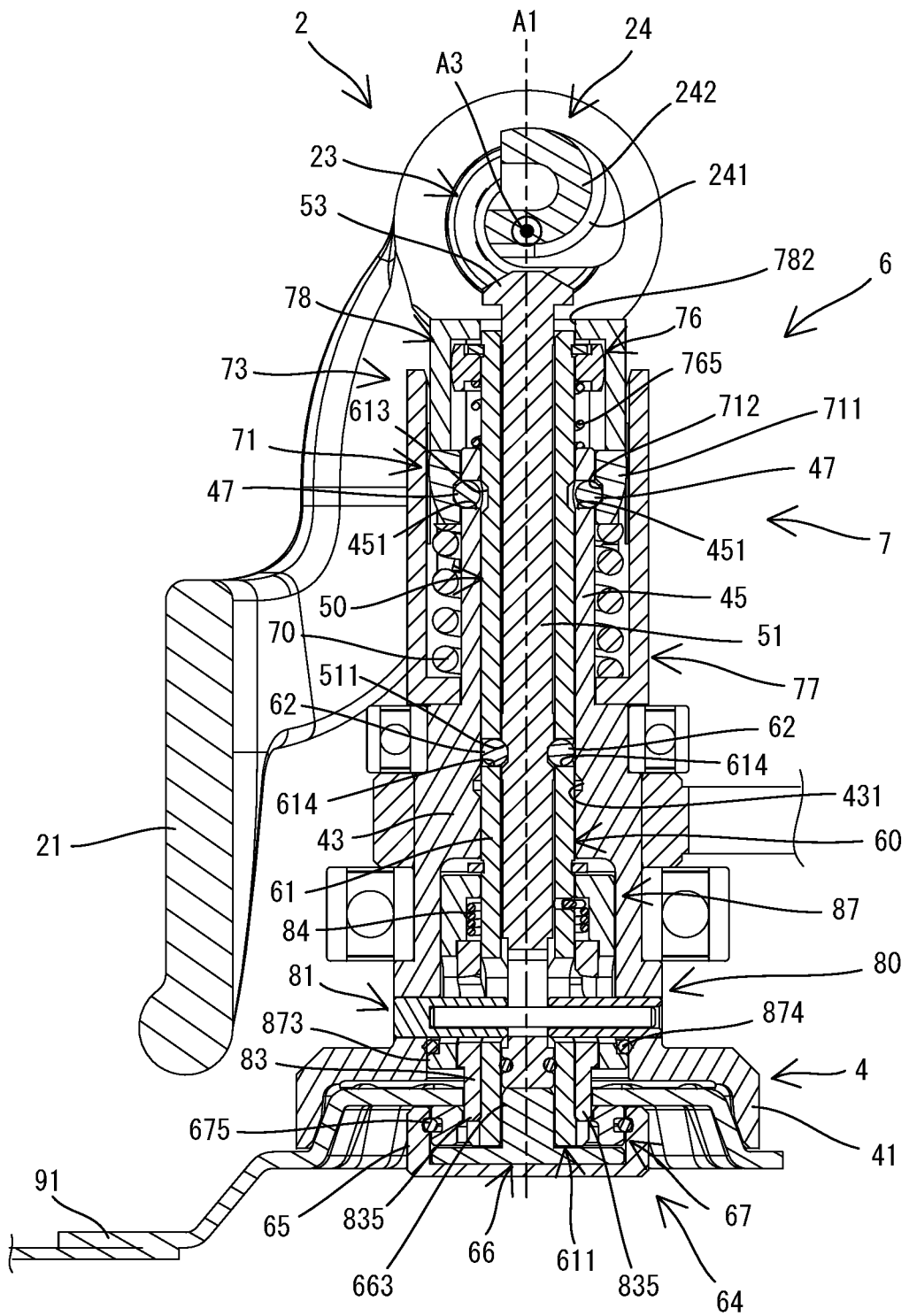
FIG. 32 is a sectional view corresponding to FIG. 8, for illustrating the clamping mechanism immediately before the force-amplifying mechanism is actuated.

When the user further pushes up the actuating shaft 50 and the clamping shaft 60 by pressing the clamping head 64, the engagement groove 613 of the clamping shaft 60 will come to face the ball-holding holes 451 of the spindle 4 as shown in FIGS. 31 and 32. At this time, the balls 47 are now allowed to disengage from (move out of) the engagement groove 712 of the spring receiving part 71 and to partially move into the engagement groove 613 of the clamping shaft 60. In this embodiment, the engagement groove 712 also has a trapezoidal cross-section. Therefore, the balls 47 are pressed radially inward due to the biasing force of the clamp spring 70 that is applied to the spring receiving part 71, and partially move into the engagement groove 613. Thus, the spring receiving part 71 is disengaged (unlocked) from the spindle 4.

In response to disengagement (unlocking) of the spring receiving part 71 from the spindle 4, the spring receiving part 71 and the cover member 78 are moved upward relative to the spindle 4 and the clamping shaft 60 owing to the biasing force of the clamp spring 70. As a result, the pins 717 of the spring receiving part 71 abut on the respective actuating parts 743 of the fixed links 74 and actuate the force-amplifying mechanism 73 (see FIGS. 11 and 12). As described above, the force-amplifying mechanism 73 biases the clamping shaft 60 upward with the amplified (increased) biasing force.

Further, substantially at the same time when the engagement groove 613 faces the ball-holding holes 451, the rotary sleeve 83 is placed in the offset position (see FIG. 13) and the lock ring 67 is placed in the locking position (see FIG. 10). Therefore, when the spring receiving part 71 is disengaged (unlocked) from the spindle 4 and the clamping shaft 60 is biased upward, the tool accessory 91 is strongly (forcibly) pressed against the tool mounting part 41 by the clamping head 64 (the lock ring 67) and becomes clamped between the clamping head 64 and the tool mounting part 41 (see FIGS. 7 and 8).

As described above, the oscillating multi-tool 1 of this embodiment is configured such that the tool accessory 91 is clamped between the tool mounting part 41 and the clamping head 64 that is biased upward by the clamp spring 70. The oscillating multi-tool 1 includes the spring receiving part 71 that is selectively movable in the up-down direction relative to the spindle 4. The spring receiving part 71 is configured to be moved to the (its) locked position in response to an unclamping operation being performed on the lever 2 and to be locked to the spindle 4 while releasing (interrupting) the biasing force of the clamp spring 70 (i.e. preventing (blocking, interrupting) the biasing force of the clamp spring 70 from being applied to the clamping shaft 60). Further, the oscillating multi-tool 1 includes the actuating shaft 50 that is movable in the up-down direction relative to the spindle 4. The actuating shaft 50 is configured to move upward and disengage the spring receiving part 71 from the spindle 4 in response to upward pressing by the clamping head 64.

In the oscillating multi-tool 1, when the spring receiving part 71 is released (disengaged, unlocked) from the spindle 4 by the actuating shaft 50, the spring receiving part 71 no longer prevents the biasing force originating from the clamp spring 70 from being applied (transmitted) to the clamping shaft 60. Thus, the biasing force originating from the clamp spring 70 on the clamping shaft 60 is restored (i.e. the clamping mechanism 6 is actuated). With such structures, the user can cause the tool accessory 91 to be clamped between the tool mounting part 41 and the clamping head 64 by simply pressing the actuating shaft 50 upward via the clamping head 64 (i.e. with a single manual action/movement).

Further, to release (disengage, unlock) the spring receiving part 71 from the spindle 4 in the oscillating multi-tool 1, the user is only required to apply upward pressure to the actuating shaft 50, which is separate (discrete) from the clamping shaft 60. In other words, only when the actuating shaft 50 receives (is subjected to) an upward pressing force applied by the clamping head 64 (via the projection 663), the biasing force on the clamping shaft 60 can be restored. Therefore, it is possible to reduce the risk that the clamping mechanism 6 will be inadvertently actuated in response to an unintentional pressing of the clamping shaft 60, as compared with a hypothetical embodiment in which pressing the clamping shaft 60 causes disengagement of the spring receiving part 71 (i.e. actuation of the clamping mechanism 6). More particularly, in this embodiment, the lower end of the actuating shaft 50, which is always disposed inside the hollow cylindrical shaft part 61 (i.e. upward of the lower end of the shaft part 61), needs to be pressed to actuate (move) the actuating shaft 50. Thus, the risk of inappropriate actuation of the clamping mechanism 6 can be more reliably reduced, because pressing only the lower end of the shaft part 61 will not actuate the clamping mechanism 6.

Further, the clamping head 64 is configured to be removable (detachable) from the shaft part 61. Therefore, the user can remove (detach) the clamping head 64 from the shaft part 61 when replacing of the tool accessory 91. As a result, the user does not have to pull the entire clamping shaft 60 out of the spindle 4, which is required in some known oscillating multi-tools. Therefore, this structure can reduce the possibility of ingress of foreign matter into the housing 10 through (via) the hollow cylindrical spindle 4.

Further, the clamping head 64 includes the lock ring 67 that is rotatable (pivotable) around the driving axis A1 relative to the shaft part 61 between the locking position and the unlocking position. This structure can reduce or minimize the space required in the radial direction, as compared with a hypothetical embodiment in which one or more radially movable members are employed to connect the shaft part 61 and the clamping head 64. Further, the lock ring 67 is configured to (automatically) rotate (pivot) relative to the shaft part 61 in response to the movement of the clamping shaft 60 in the up-down direction. More specifically, the motion converting mechanism 80 changes (switches, rotates) the position of the lock ring 67 by causing the lock ring 67 to rotate (pivot) in response to the movement of the clamping shaft 60 in the up-down direction. With this structure, clamping and unclamping of the tool accessory 91 by the clamping head 64 can be efficiently associated with changing (switching) of the position of the clamping head 64.

Further, the actuating shaft 50 is selectively movable in the up-down direction relative to the clamping shaft 60. The actuating shaft 50 is configured, in response to the upward pressing by the clamping head 64, to move upward to a specific position (i.e. where the engagement groove 511 opposes the ball holding holes 614) relative to the clamping shaft 60 and to the spindle 4, and to move further upward together with the clamping shaft 60 relative to the spindle 4, thereby disengaging (unlocking) the spring receiving part 71 from the spindle 4 via the clamping shaft 60. Therefore, by simply continuing to press the clamping head 64 upward, the user can efficiently cause the clamping shaft 60 to move upward to be biased by the clamp spring 70 to thereby clamp the tool accessory 91. Moreover, because the clamping shaft 60 does not move unless the actuating shaft 50 is pushed up to the specific position, the risk of inappropriate actuation of the clamping mechanism 6 can be more reliably reduced.

Further, the lever 2 is configured such that, in response to the user performing the unclamping operation on the lever 2, the first cams 241 cause the spring receiving part 71 to move to the locked position (via the intervening cover member 78), and then the second cam 242 moves the actuating shaft 50 and the clamping shaft 60 downward. Thus, with the single lever 2, the biasing force on the clamping shaft 60 is released and then the actuating shaft 50 and the clamping shaft 60 are efficiently moved. Further, the second cam 242 is configured to further move the actuating shaft 50 downward relative to the clamping shaft 60 after the clamping shaft 60 and the actuating shaft 50 reach the specific position (i.e. where the engagement groove 511 opposes the ball holding holes 614). Thus, only the actuating shaft 50 is moved downward independently from the clamping shaft 60, which facilitates subsequent upward pressing of the actuating shaft 50 via the clamping head 64.

Further, the oscillating multi-tool 1 includes the force-amplifying mechanism 73 that is configured to amplify (increase) the biasing force of the clamp spring 70 and transmit the increased biasing force to the clamping shaft 60. Therefore, even if the clamp spring 70 itself is small in size and has a relatively small biasing force (force constant), the clamp spring 70 can still impart a sufficient clamping force to the clamping shaft 60. In this embodiment, the force-amplifying mechanism 73 includes link mechanisms 730 of a toggle-joint type (i.e. toggle joint mechanisms or simply "toggle mechanisms"). Therefore, the force-amplifying mechanism 73 can effectively amplify (increase) the biasing force of the clamp spring 70 that is transmitted to the clamping shaft 60. Further, in this embodiment, the lever 2 is configured to cause the spring receiving part 71 to move in response to the unclamping operation, and a force (downward force) from the lever 2 directly acts upon the clamp spring 70 via the spring receiving part 71. Thus, the lever 2 can directly receive (absorb) the biasing force of the clamp spring 70 via the spring receiving part 71 and thereby release (interrupt) the biasing force on (applied to) the force-amplifying mechanism 73. With such a structure, the biasing force on the clamping shaft 60 can be easily released (interrupted).

Correspondences between the features of the above-described embodiment and the features of the disclosure are as follows. The features of the above-described embodiment are merely exemplary and do not limit the features of the present disclosure or the present invention. The oscillating multi-tool 1 is an example of the "power tool". The housing 10 is an example of the "housing". The spindle 4 and the tool mounting part 41 are examples of the "spindle" and the "tool mounting part", respectively. The driving axis A1 is an example of the "driving axis". The clamping shaft 60, the shaft part 61 and the clamping head 64 are examples of the "clamping shaft", the "shaft part" and the "clamping part (clamping head)", respectively. The clamp spring 70 is an example of the "biasing member" or the "spring". The spring receiving part 71 is an example of the "release member" or the "spring seat". The actuating shaft 50 is an example of the "actuating member" or the "actuator". The lock ring 67 is an example of the "rotation part". The lever 2, the first cams 241 and the second cam 242 are examples of the "manually operable member", the "first cam" and the "second cam", respectively. The force-amplifying mechanism 73 is an example of the "force transmitting mechanism". The ball holding holes 451 and the balls 47 are examples of the "first holding hole" and the "first ball", respectively. The engagement groove 613 is an example of the "first annular groove". The ball holding holes 614 and the balls 62 are examples of the "second holding hole" and the "second ball", respectively. The engagement groove 511 is an example of the "second annular groove". The engagement groove 431 is an example of the "third annular groove".

The above-described embodiment is merely an exemplary embodiment of the present disclosure, and power tools according to the present disclosure are not limited to the oscillating multi-tool 1 of the above-described embodiment. For example, the following modifications may be made. Furthermore, one or more of these modifications may be employed in combination with the oscillating multi-tool 1 of the above-described embodiment or any one of the claimed features.

For example, in one modification of the above-described embodiment, the power tool according to the present disclosure may instead be embodied as a rotary tool (e.g., a grinder, a sander, a polisher, etc.) that is configured to rotationally drive the tool accessory 91. That is, the rotational output of the motor 31 is used to rotate the spindle 4, rather than pivotally oscillate it.

As another example of a modification of the present teachings, the structures of the clamping mechanism 6 (for example, the shape, arrangement and support structure of the clamping shaft 60, and the elements (components) of the biasing mechanism 7 and their shapes, arrangements and support structures) may be appropriately changed. Examples of non-limiting modifications that may be utilized with the present teachings are as follows.

For example, the clamping shaft 60 need not have the shaft part 61 and the clamping head 64 that are separable from each other. Specifically, the clamping shaft 60 may be a single (integral) member having a shaft part and a flange-like clamping head that is integrally (inseparably) formed on one end of the shaft part. In this modification, the clamping shaft 60 may be entirely removable from the spindle 4 and may be biased upward while being held by at least one engagement member (e.g., clamping pieces (one or more chuck jaws), one or more balls, etc.) provided in the housing 10.

In a modified embodiment in which the shaft part 61 and the clamping head 64 are separable from each other, the structure of engagement between the head mounting part 611 and the clamping head 64 may be appropriately modified. For example, the head mounting part 611 and the lock hole 671 may be appropriately changed in shape, provided that they can be changed (switched, rotated) by rotating (pivoting) in the circumferential direction relative to each other between a first position where the head mounting part 611 is allowed to pass through the lock hole 671 and a second position where the head mounting part 611 is engaged with the lock ring 67 and is prohibited from passing through the lock hole 671. Further, the structure for rotating (pivoting) the lock ring 67 relative to the shaft part 61 is not limited to the motion converting mechanism 80 that includes the rotary sleeve 83. Any motion converting mechanism may be employed that is capable of converting linear motion of the shaft part 61 in the up-down direction relative to the spindle 4 into rotary motion of one or more other members around the driving axis A1. Further, in the clamping head 64 of the above-described embodiment, only the lock ring 67 is rotatable relative to the shaft part 61, but the entire the clamping head 64 may be rotatable. Further, the clamping head 64 may be configured to be detachably mounted to the shaft part 61 via at least one engagement member (e.g., clamping pieces (one or more chuck jaws, etc.), one or more balls, etc.) that are movable in the radial direction of the shaft part 61 between a first position where the at least one engagement member is engageable with the shaft part 61 and a second position where the at least one engagement member is not engageable with the shaft part 61.

It is not necessary that the clamp spring 70 is configured to bias the clamping shaft 60 via the force-amplifying mechanism 73. For example, the force-amplifying mechanism 73 may be omitted and the spring receiving part 71 may directly bias the clamping shaft 60. Alternatively, a force transmitting mechanism of another type may be employed to transmit the biasing force generated by the clamp spring 70 to the clamping shaft 60. For example, the force transmitting mechanism need not amplify the biasing force of the clamp spring 70 and/or may transmit less than the total biasing force of the clamp spring 70 to the clamping shaft 60. The shapes of the fixed link 74 and the movable links 75, the arrangement and connecting position between the fixed link 74 and the movable links 75, the number of the movable links 75, etc., may be appropriately changed, as long as the link mechanism operates to transmit force originating from the clamp spring 70 to the clamping shaft 60, such as (but not limited to) a force-amplifying mechanism. The clamp spring 70 is not limited to being a compression coil spring, but it may instead be, for example, a tension coil spring, a torsion spring, a disc spring or a rubber spring.

The number of the balls 47 that are configured to lock the spring receiving part 71 to the spindle 4 is not limited to two, but may be one or three or more. Further, any other member(s) (e.g., clamping pieces (one or more chuck jaws), one or more balls, etc.) may be employed, in place of the balls 47. The same is true for the balls 62 that enable engagement (connection, linkage, locking) between the clamping shaft 60 and the spindle 4 or between the clamping shaft 60 and the actuating shaft 50.

The structure (for example, the shape, arrangement and support structure) of the actuating shaft 50 may also be appropriately changed. For example, the actuating shaft 50 may be disposed within the clamping shaft 60 in its entirety without protruding upward from the clamping shaft 60. The lower end of the actuating shaft 50 optionally may protrude downward from the clamping shaft 60. Alternatively, the actuating shaft 50 may be disposed outside (e.g., around or coaxially around) the clamping shaft 60. In such an embodiment, for example, the actuating shaft 50 may be a hollow cylinder that is disposed around (surrounding) the clamp shaft 60. Further, in the above-described embodiment, the clamping shaft 60 having the removable (detachable) clamping head 64 is employed, and therefore, the actuating shaft 50 is configured to detect (receive, be subjected to) upward pressing by a portion of the clamping head 64 (specifically, the projection 663 that is inserted into the shaft part 61). However, the actuating shaft 50 may be configured to be actuated (moved) in response to detecting (receiving, being subjected to) upward pressing by a different portion of the clamping head 64 (e.g., by the case 65). The projection 663 that presses the actuating shaft 50 may directly protrude from the bottom wall of the case 65. Further, the actuating shaft 50 may be actuated (moved) in response to detecting (receiving, being subjected to) upward pressing by the tool accessory 91.

The push-down sleeve 87, which moves downward together with the clamping shaft 60 relative to the spindle 4 and pushes down the tool accessory 91, may be omitted. Alternatively, in place of the push-down sleeve 87, for example, a flange part may be formed on the lower end portion of the clamping shaft 60 or the rotary sleeve 83 and the flange part may be configured to push down the tool accessory 91 while moving downward.

The structure of the lever 2 may also be appropriately changed. For example, the shapes and arrangements of the first and second cams 241, 242 and the structures to be pressed by the first and second cams 241, 242 are not limited to those of the above-described embodiment. For example, only one first cam 241 may be provided. The first cam(s) 241 may directly abut on and push down the spring receiving part 71. The second cam 242 may push down the actuating shaft 50 via another (intervening) member disposed above the actuating shaft 50. Further, the lever 2 may be configured to pivot (rotate), not around the rotational axis A3 orthogonal to the driving axis A1, but around the driving axis A1. In such a modification, a motion converting mechanism may be provided that is configured to convert rotary motion around the driving axis A1 into linear motion in the up-down direction and to push down the spring receiving part 71 and the actuating shaft 50 in response to the lever 2 being pivoted in an unclamping direction.

The structure (for example, the shape and support structure) of the spindle 4 is not limited to the structure of the above-described embodiment, but may be appropriately changed. For example, in the above-described embodiment, the tool mounting part 41 has the recess 411 that conforms (is complementary) to (matches) the protruding part 911 of the tool accessory 91, and the tool accessory 91 is fixed to the tool mounting part 41 with the inclined surface 913 of the tool accessory 91 in abutment with (seated in or on) the inclined surface 413 of the tool mounting part 41. However, the tool mounting part 41 may have a planar (flat) lower surface, to (on) which a tool accessory having a planar (flat) upper surface is secured (fixed, attached). In such an embodiment, in order to position the tool accessory relative to the tool mounting part 41, the tool mounting part 41 and the tool accessory may have projections and fitting holes, respectively. In such a modified embodiment, like the inclined surfaces 413, 913, the projections and the fitting holes may have respective inclined surfaces that are inclined (oblique) relative to the driving axis A1 and that conform (are complementary) to each other, like the inclined surfaces 413, 913 of the above-described embodiment. In the alternative, the tool mounting part 41 may define a recess having a rounded star-shaped configuration, into which a tool accessory having a protrusion with a complementary (corresponding) rounded star-shaped configuration is insertable so that the rounded star-shaped structures interlock (engage, fit) with each other in a form-fit (shape-fit) manner.

The structures (for example, the shapes, structures (elements, components) disposed therein and arrangements) of the housing 10, the motor 31 and the transmitting mechanism 35 may also be appropriately changed. For example, the housing 10 need not include the outer housing 101 and the inner housing 103 that are elastically connected to each other, but may be a housing having a single-layer (single shell) structure. Further, for example, the DC brushless motor 31 may instead be an AC motor or a brushed motor. The motor 31 may be housed within the grip part 15 of the housing 10 such that the rotational axis A2 of the output shaft 315 is orthogonal to the driving axis A1.

Further, in view of the nature of the present disclosure, the above-described embodiment and the modifications thereof, the following Aspects 1 to 20 are provided. Any one of the following Aspects 1 to 20 can be employed alone or in combination with any one of the oscillating multi-tool 1 of the above-described embodiment, the above-described modifications and the claimed features.

(Aspect 1)
The clamping shaft is configured to be unremovable (undetachable, inseparable) from the spindle.

(Aspect 2)
The power tool further comprises a manually operable member that is configured to be externally manipulated by a user, and
the release member is configured to move (or to be moved) to the locked position in response to an unclamping operation being performed on the manually operable member.

(Aspect 3)
The release member is or includes an annular member (e.g., a collar) that is disposed around the shaft part.

(Aspect 4)
The power tool further comprises at least one first engagement member configured to engage with the release member and the spindle when the release member is located in the locked position,
wherein the release member is configured to be locked to (engaged with, integrally coupled to) the spindle via the at least one first engagement member.

The balls 47 are an example of the "first engagement member" in Aspect 4.

(Aspect 5)
In a more detailed embodiment of Aspect 4, the at least one first engagement member is held by the spindle so as to be movable in a radial direction of the spindle between a first position in (at) which the at least one first engagement member is engageable with the release member and a second position in (at) which the first engagement member is not engageable with the release member.

(Aspect 6)
In a more detailed embodiment of Aspect 5, the at least one first engagement member is configured to be placed in the second position and disengaged from the release member when the clamping shaft moves upward from below and reaches a position in (at) which the clamping part and the tool mounting part are capable of clamping the tool accessory therebetween.

(Aspect 7)
In a more detailed embodiment of Aspect 5 or 6, the at least one first engagement member is configured to engage with the clamping shaft in the second position.

(Aspect 8)
The clamping part includes a housing member (case) in which the rotation part (rotatable part) is housed such that the rotation part is rotatable around the driving axis.

The case 65 is an example of the "housing member" in Aspect 8. The lock ring 67 is an example of the "rotation part" in Aspect 8.

(Aspect 9)
The clamping part includes a pressing part (projection) configured to press the actuating member.

The pressing part 66 (e.g., projection 663) is an example of the "pressing part" in Aspect 9.

(Aspect 10)
In a more detailed embodiment of Aspect 9, a lower end portion of the actuating member is disposed within the shaft part when the actuating member is located in a (at its) lowermost position within a movable range of the actuating member, and
the pressing part is configured to be inserted into the shaft part, i.e. into a hollow cylindrical interior of the shaft part.

(Aspect 11)
The power tool further comprises a motion converting mechanism configured to convert linear motion of the shaft part in the up-down direction into rotary motion and thereby cause the rotation part to rotate relative to the shaft part.

The motion converting mechanism 80 is an example of the "motion converting mechanism" in Aspect 11.

(Aspect 12)
In a more detailed embodiment of Aspect 11, the motion converting mechanism includes a driver that is engageable with the rotation part and that is configured to rotate around the driving axis in response to movement of the shaft part in the up-down direction.

The rotary sleeve 83 is an example of the "driver" in Aspect 12.

(Aspect 13)
In a more detailed embodiment of Aspect 12,
the driver comprises a sleeve that is mounted to (around) the shaft part to be rotatable around the driving axis relative to the shaft part and that is movable together with the shaft part in the up-down direction,
the driver has a slot including an inclined (oblique) part that is inclined with respect to a circumferential direction, and
the motion converting mechanism includes a protruding part that is supported by the spindle and is inserted into the slot.

The guide holes 831 are an example of the "slot" in Aspect 13. The pin 81 is an example of the "protruding part" in Aspect 13.

(Aspect 14)
The rotation part (e.g., a lock ring 67) is configured to be placed in the unlocking position when the clamping shaft moves downward relative to the spindle and reaches the first position, and
the actuating member is configured to move the clamping part downward relative to the shaft part while moving downward from the first position relative to the spindle and the clamping shaft.

(Aspect 15)
The second cam is configured to abut on the actuating member and move the actuating member downward.

(Aspect 16)

The clamping shaft is configured to be locked to the spindle in the first position relative to the spindle in response to movement of the clamping shaft and the actuating member to the first position from above.

(Aspect 17)

The power tool further comprises at least one second engagement member that is held by the clamping shaft so as to be movable in a radial direction of the clamping shaft between a third position in (at) which the at least one second engagement member is engageable with the actuating member and a fourth position in (at) which the at least one second engagement member is not engageable with the spindle, wherein the at least one second engagement member is configured to be held in the third position and engage with the actuating member when the clamping shaft and the actuating member are located above the first position relative to the spindle, and to be placed in the fourth position and engage with the spindle in response to the clamping shaft and the actuating member reaching the first position.

The balls 62 are an example of the "second engagement member" in Aspect 17.

(Aspect 18)

The force transmitting mechanism includes a fixed link and a movable link, one end portion of the fixed link is connected to a first shaft so as to be rotatable around the first shaft, the first shaft being immovable in the up-down direction relative to the spindle, one end portion of the movable link is connected to the other end portion of the fixed link via a joint, while the other end portion of the movable link is connected to a second shaft so as to be rotatable (pivotable) around the second shaft, the second shaft being connected to the clamping shaft, and the release member is configured to be moved upward from the locked position by a biasing force of the biasing member and to apply a force to the joint such that the fixed link and the movable link are moved closer to their respective positions in which the fixed link and the movable link are closer to being aligned on a straight line (e.g., form a relatively large obtuse angle, e.g., in the range of 140-180°).

The fixed links 74, the movable links 75, the pins 745, the pins 751 and the pins 763 are examples of the "fixed link", the "movable link", the "first shaft", the "joint" and the "second shaft" in Aspect 18, respectively.

(Aspect 19)

The biasing member is a compression coil spring, the release member comprises a spring receiving part (spring seat) that abuts on one end portion of the compression coil spring, and the force transmitting mechanism is configured to multiply (increase) the biasing force received via the spring receiving part.

(Aspect 20)

The power tool further comprises a push-down member that is movable together with the clamping shaft in the up-down direction relative to the spindle and is configured to abut on the tool accessory from above and push the tool accessory downward while moving downward relative to the spindle.

The push-down sleeve 87 is an example of the "push-down member" in Aspect 20.

The following Aspects 21 to 23 are described with the aim of providing improvements, alternate embodiments, modifications, etc. of the clamping mechanism that includes a biasing member configured to bias the clamping shaft upward. Each one of the following Aspects 21 to 23 may be employed alone or in combination with any one of the oscillating multi-tool 1 of the above-described embodiment, the above-described modifications and aspects, and the claimed features.

(Aspect 21)

A power tool configured to perform a processing operation on a workpiece by driving a tool accessory, the power tool comprising:

a housing;

a spindle supported by the housing so to be rotatable or pivotable around a driving axis that defines an up-down direction of the power tool, a tool mounting part to which the tool accessory is removably attachable being defined at a lower end portion of the spindle;

a clamping shaft that is movable in the up-down direction relative to the spindle, the clamping shaft having a shaft part extending coaxially with the spindle in the up-down direction and a clamping part connected to the shaft part under (below) the tool mounting part;

a biasing member configured to upwardly bias (or to generate a biasing force that is transmitted to upwardly move) the clamping shaft relative to the spindle so as to impart a clamping force for clamping the tool accessory between the clamping part and the tool mounting part; and a force transmitting mechanism configured to amplify (multiply, increase) a biasing force of the biasing member and to transmit the amplified (multiplied, increased) biasing force to the clamping shaft.

According to Aspect 21, a sufficient clamping force can be imparted to the clamping shaft even if the biasing member is relatively small in size.

(Aspect 22)

The force transmitting mechanism preferably comprises a toggle joint mechanism.

According to Aspect 22, the biasing force to be transmitted to the clamping shaft can be effectively multiplied (increased).

(Aspect 23)

The force transmitting mechanism includes a fixed link and a movable link, one end portion of the fixed link is connected to a first shaft so as to be rotatable (pivotable) around the first shaft, the first shaft being immovable in the up-down direction relative to the spindle, and one end portion of the movable link is connected to the other end portion of the fixed link via a joint, while the other end portion of the movable link is connected to a second shaft so as to be rotatable (pivotable) around the second shaft, the second shaft being connected to the clamping shaft.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved power tools that drive a tool accessory with a pivotal oscillating motion or that rotate a tool accessory.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

DESCRIPTION OF THE REFERENCE NUMERALS

1: oscillating multi-tool, 10: housing, 101: outer housing, 103: inner housing, 105: cover member, 11: front part, 13: rear part, 131: battery mounting part, 15: grip part, 2: lever, 21: manipulation part, 23: rotary shaft, 24: cam part, 241: first cam, 242: second cam, 30: controller, 31: motor, 315: output shaft, 35: transmitting mechanism, 351: eccentric shaft, 354: eccentric part, 356: drive bearing, 358: oscillating arm, 37: switch, 39: manipulation part, 4: spindle, 401: bearing, 402: bearing, 41: tool mounting part, 411: recess, 413: inclined surface, 43: large-diameter part, 431: engagement groove, 433: pin-holding hole, 45: small-diameter part, 451: ball-holding hole, 47: ball, 50: actuating shaft, 51: shaft part, 511: engagement groove, 513: guide hole, 515: elastic member, 53: abutment part, 6: clamping mechanism, 60: clamping shaft, 61: shaft part, 611: head mounting part, 612: projection, 613: engagement groove, 614: ball-holding hole, 615: guide hole, 62: ball, 64: clamping head, 65: case, 66: pressing part, 661: base plate, 663: projection, 67: lock ring, 671: lock hole, 673: projection, 675: elastic member, 7: biasing mechanism, 70: clamp spring, 71: spring receiving part, 711: body, 712: engagement groove, 715: projection piece, 717: pin, 73: force-amplifying mechanism, 730: link mechanism, 74: fixed link, 741: body, 743: actuation part, 745: pin, 75: movable link, 751: pin, 76: slider, 761: body, 763: pin, 765: biasing spring, 77: support member, 78: cover member, 781: body, 782: through hole, 783: guide groove, 785: leg, 80: motion converting mechanism, 81: pin, 83: rotary sleeve, 831: guide hole, 832: lower end part, 833: upper end part, 835: projection, 84: biasing spring, 87: push-down sleeve, 873: flange part, 874: seal member, 875: guide hole, 91: tool accessory, 911: protruding part, 913: inclined surface, 93: battery

What is claimed is:

1. A power tool configured to perform a processing operation on a workpiece by driving a tool accessory, the power tool comprising:
   a housing;
   a spindle supported in the housing to be pivotable or rotatable around a driving axis that defines an up-down direction of the power tool, a tool mounting part to which the tool accessory is removably attachable being defined at a lower end portion of the spindle;
   a clamping shaft that is selectively movable in the up-down direction relative to the spindle, the clamping shaft including a shaft part extending coaxially with the spindle in the up-down direction and a clamping part connected to the shaft part below the tool mounting part;
   a biasing member;
   a release member that is selectively movable in the up-down direction relative to the spindle and is configured to selectively interrupt transmission of biasing force generated by the biasing member to the clamping shaft, the release member being configured to be locked to the spindle in a locked position while the transmission of biasing force from the biasing member to the clamping shaft is being interrupted; and
   an actuating member that is movable in the up-down direction relative to the spindle and is configured to move upward in response to being pressed upward by the clamping part or by the tool accessory and thereby unlock the release member from the spindle;
   wherein:
   the shaft part is a tubular member, and
   at least a portion of the actuating member is disposed within the shaft part.

2. The power tool as defined in claim 1, wherein the clamping part is detachably attached to the shaft part.

3. The power tool as defined in claim 2, wherein:
   the clamping part includes a case and a lock ring supported by the case to be rotatable or pivotable around the driving axis relative to the shaft part between a locking position and an unlocking position,
   when the lock ring is in the locking position, the lock ring is engageable with the shaft part in a non-detachable manner, and
   when the lock ring is in the unlocking position, the rotation part is detachable from the shaft part.

4. The power tool as defined in claim 3, wherein the lock ring is configured to rotate relative to the shaft part in response to movement of the clamping shaft relative to the spindle in the up-down direction.

5. The power tool as defined in claim 3, wherein the clamping part further includes an axially-extending projection that directly contacts and presses the actuating member while the clamping part is attached to the shaft part.

6. The power tool as defined in claim 1, wherein the actuating member is selectively movable relative to the clamping shaft in the up-down direction.

7. The power tool as defined in claim 6, wherein the actuating shaft is configured to move upward to a first position relative to the spindle and the clamping shaft and to further move upward from the first position together with the clamping shaft relative to the spindle in response to being pressed upward by the clamping part or by the tool accessory and thereby unlock the release member from the spindle via the clamping shaft.

8. The power tool as defined claim 1, further comprising:
   a manually operable member configured to be externally manipulated by a user,
   wherein:
   the manually operable member is configured to cause the release member to move in response to an unclamping operation being performed on the manually operable member, and
   a force that is applied by the manually operable member during the unclamping operation directly acts on the biasing member via the release member.

9. The power tool as defined in claim 1, wherein the actuating member is an actuating shaft that extends coaxially within the tubular shaft part of the clamping shaft.

10. The power tool as defined in claim 1, wherein the clamping shaft is non-detachably coupled to the spindle.

11. A power tool comprising:

a housing;

a spindle supported in the housing to be pivotable or rotatable around a driving axis that defines an up-down direction of the power tool, a tool mounting part to which the tool accessory is removably attachable being defined at a lower end portion of the spindle;

a clamping shaft that is selectively movable in the up-down direction relative to the spindle, the clamping shaft including a shaft part extending coaxially with the spindle in the up-down direction and a clamping head connected to the shaft part below the tool mounting part;

a spring;

a spring seat abutting on an upper end of the spring and operably connected to the clamping shaft, the spring seat being selectively movable in the up-down direction relative to the spindle and being configured to interrupt transmission of biasing force originating from the spring to the clamping shaft while moving downward from its uppermost position relative to the spindle;

a force transmitting mechanism configured to amplify biasing force generated by the spring and to transmit the amplified biasing force to the clamping shaft; and an actuator that is movable in the up-down direction relative to the spindle;

wherein:

the spring seat is configured to be selectively lockable to the spindle at a locked position that is below its uppermost position in the up-down direction while transmission of the biasing force originating from the spring is being interrupted, and the actuator is configured to move upward from its lowermost position in response to being pressed upward to thereby unlock the spring seat from the spindle.

12. The power tool as defined in claim 11, wherein the force transmitting mechanism comprises a toggle joint mechanism.

13. The power tool as defined in claim 11, wherein:

the spindle includes an elongate hollow cylindrical shape having at least one first holding hole extending through the spindle in a radial direction, at least one first ball is at least partially disposed in the at least one first holding hole so as to be movable in the radial direction of the spindle, and the spring seat includes a circular through hole that surrounds the spindle, the spring seat being configured to be locked to the spindle at the locked position via the at least one first ball.

14. The power tool as defined in claim 13, wherein:

the shaft part of the clamping shaft has an elongate hollow cylindrical shape and is at least partially disposed inside the spindle, a first annular groove is formed around an outer peripheral surface of the shaft part, the actuator is an elongate shaft that is at least partially disposed inside the shaft part, and the actuator is configured to move upward from its lowermost position together with the clamping shaft such that the first annular groove opposes the at least one first holding hole and enables the at least one first ball to partially move into the first annular groove to thereby unlock spring seat from the spindle.

15. The power tool as defined in claim 14, wherein:

at least one second holding hole extends through the shaft part in the radial direction, at least one second ball is partially disposed in the at least one second holding hole and is movable in the radial direction, a second annular groove is formed around an outer peripheral surface of the actuator, a third annular groove is formed around an inner peripheral surface of the spindle, when the second annular groove of the actuator, the at least one second holding hole of the shaft part and the third annular groove of the spindle are in the same position in the up-down direction, the at least one second ball is movable between a first radial position and a second radial position, when the at least one second ball is in the first radial position, the at least one second ball engages with the at least one second holding hole and the second annular groove, when the at least one second ball is in the second radial position, the at least one second ball engages with the at least one second holding hole and the third annular groove, when the second annular groove of the actuator is located above the third annular groove of the spindle, the at least one second ball is pressed by an inner peripheral surface of the spindle and held in the first radial position and thereby connects the actuator and the shaft part to be integrally movable in the up-down direction, and when the second annular groove of the actuator is located below the third annular groove of the spindle, the at least one second ball is pressed by an outer peripheral surface of the actuator and held in the second radial position and thereby operably couples the spindle with the shaft part such that the actuator is movable independently from the spindle and the shaft part in the up-down direction.

16. A power tool comprising:

a housing;

a spindle supported in the housing to be pivotable or rotatable around a driving axis that defines an up-down direction of the power tool;

a tool mounting part provided at a lower end portion of the spindle in the up-down direction, the tool mounting part being configured to have a tool accessory removably mounted thereon;

a clamping shaft that is selectively movable in the up-down direction relative to the spindle;

a spring generating an upward biasing force in the up-down direction;

a spring seat radially surrounding the clamping shaft and abutting on an upper end of the spring, the spring seat being selectively movable relative to the spindle in the up-down direction between an unlocked position where the spindle is movable relative to the spring seat in the up-down direction and a locked position where the spring seat is immovable relative to the spindle in the up-down direction;

an actuator shaft that is selectively movable in the up-down direction relative to the spindle; and a manually operable member configured to be externally manipulated by a user, the manually operable member having a first cam and a second cam;

wherein:

the spring seat is disposed within a force transmission path that receives the upward biasing force originating from the spring and outputs an upward biasing force to the clamping shaft in the up-down direction, downward movement of the spring seat relative to the spindle in the up-down direction from the unlocked position to the locked position causes the transmission of biasing force along the force transmission path to the clamping shaft to be interrupted, upward movement of the actuator shaft relative to the spindle in the up-down direction causes the spring seat to move from the locked position to the unlocked position, and the manually operable member is configured such that, in response to an unclamping operation being performed on the manually operable member, the first cam causes the spring seat to move to the locked position relative to the spindle and then the second cam causes the clamping shaft and the actuating shaft to subsequently move downward relative to the spindle.

17. The power tool as defined in claim 16, wherein:

the actuating shaft is selectively movable in the up-down direction relative to the clamping shaft, and the second cam is configured to cause the actuating shaft to further move downward relative to the spindle and the clamping shaft after the clamping shaft and the actuating shaft reach a second position relative to the spindle.

18. The power tool as defined in claim 16, wherein the clamping shaft includes a shaft portion that is coaxial with the spindle and a clamping head detachably attached to the shaft portion below the tool mounting part in the up-down direction.

19. The power tool as defined in claim 18, wherein:

the spindle is pivotably or rotatably supported in the housing via one or more bearings, the clamping shaft is disposed at least partially inside the spindle, and the actuator shaft is disposed at least partially inside the clamping shaft.

20. The power tool as defined in claim 19, wherein the force transmission path further comprises:

a slider radially surrounding and being operably coupled to the clamping shaft; and a force transmission mechanism operably coupling the spring seat to the slider;

wherein downward movement of the spring seat relative to the spindle from the unlocked position to the locked position causes the force transmission mechanism to change from a first configuration that transmits upward biasing force from the spring seat to the slider to a second configuration that interrupts the transmission of the upward biasing force from the spring seat to the slider.

* * * * *